US011483467B2

(12) United States Patent
Kanbara et al.

(10) Patent No.: US 11,483,467 B2
(45) Date of Patent: *Oct. 25, 2022

(54) IMAGING DEVICE, IMAGE PROCESSING DEVICE, AND ELECTRONIC APPARATUS

(71) Applicant: NIKON CORPORATION, Tokyo (JP)

(72) Inventors: Toshiyuki Kanbara, Tokyo (JP); Takashi Shionoya, Koganei (JP); Naoki Sekiguchi, Yashio (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,906

(22) Filed: Dec. 3, 2020

(65) Prior Publication Data
US 2021/0118100 A1 Apr. 22, 2021

Related U.S. Application Data

(62) Division of application No. 16/082,877, filed as application No. PCT/JP2017/012980 on Mar. 29, 2017, now Pat. No. 10,885,610.

(30) Foreign Application Priority Data

Mar. 31, 2016 (JP) .............................. JP2016-071970

(51) Int. Cl.
G06T 5/50 (2006.01)
H04N 5/232 (2006.01)
(Continued)

(52) U.S. Cl.
CPC ......... H04N 5/23212 (2013.01); G06T 5/002 (2013.01); G06T 5/50 (2013.01);
(Continued)

(58) Field of Classification Search
CPC ... G06T 7/11; G06T 5/002; G06T 5/50; G06T 5/00; H04N 5/23212; H04N 9/04515;
(Continued)

(56) References Cited

U.S. PATENT DOCUMENTS 9,357,121 B2 * 5/2016 Hirose ................. H04N 5/3456
9,832,363 B2 * 11/2017 Kikuchi ............. H04N 5/36961
(Continued)

FOREIGN PATENT DOCUMENTS

EP 3 018 893 A1 5/2016
JP H07-079372 A 3/1995
(Continued)

OTHER PUBLICATIONS

May 11, 2021 Office Action issued in Japanese Patent Application No. 2018-509356.
(Continued)

Primary Examiner — Tuan H Nguyen
(74) Attorney, Agent, or Firm — Oliff PLC

(57) ABSTRACT

An electronic apparatus includes an imaging element having a plurality of image capture regions, each of the image capture regions having a plurality of pixels for generating an image signal; a setting unit that sets different image capture conditions for the plurality of image capture regions; and a control unit that corrects a portion of an image signal of a photographic subject captured under first image capture conditions in an image capture region among the plurality of image capture regions so that it is as if the portion of the image signal was captured under second image capture conditions.

18 Claims, 31 Drawing Sheets

(51) Int. Cl.
  *H04N 5/353* (2011.01)
  *H04N 5/351* (2011.01)
  *H04N 5/243* (2006.01)
  *H04N 9/04* (2006.01)
  *G06V 20/10* (2022.01)
  *G06T 7/11* (2017.01)
  *G06T 5/00* (2006.01)

(52) U.S. Cl.
  CPC ............... *G06T 7/11* (2017.01); *G06V 20/10* (2022.01); *H04N 5/243* (2013.01); *H04N 5/351* (2013.01); *H04N 5/353* (2013.01); *H04N 9/04515* (2018.08)

(58) Field of Classification Search
  CPC ........ H04N 5/243; H04N 5/353; H04N 5/351; G06K 9/00; G06K 9/00664
  See application file for complete search history.

(56) References Cited

U.S. PATENT DOCUMENTS

| | | |
|---|---|---|
| 10,142,563 B2 | 11/2018 | Shionoya et al. |
| 2002/0141002 A1 | 10/2002 | Takano et al. |
| 2008/0284871 A1 | 11/2008 | Kobayashi |
| 2010/0208099 A1 | 8/2010 | Nomura |
| 2011/0001841 A1 | 1/2011 | Shiraishi et al. |
| 2012/0069212 A1 | 3/2012 | Imai |
| 2014/0218594 A1 | 8/2014 | Hirose |
| 2016/0142645 A1 | 5/2016 | Shionoya et al. |
| 2016/0198115 A1 | 7/2016 | Tsuchiya |
| 2016/0337578 A1 | 11/2016 | Kikuchi |

FOREIGN PATENT DOCUMENTS

| | | |
|---|---|---|
| JP | 2002-290839 A | 10/2002 |
| JP | 2006-197192 A | 7/2006 |
| JP | 2009-089355 A | 4/2009 |
| JP | 2009-171599 A | 7/2009 |
| JP | 2010-073035 A | 4/2010 |
| JP | 2015-092660 A | 5/2015 |
| WO | 2015/001646 A1 | 1/2015 |
| WO | 2015/022900 A1 | 2/2015 |

OTHER PUBLICATIONS

May 19, 2021 Office Action issued in European Patent Application No. 17775257.3.
Jan. 29, 2021 Office Action issued in Chinese Patent Application No. 201780033480.3.
Jul. 4, 2017 International Search Report issued in International Patent Application No. PCT/JP2017/012980.
Mar. 3, 2020 Office Action issued in U.S. Appl. No. 16/082,877.
Feb. 21, 2020 Extended Search Report issued in European Patent Application No. 17775257.3.
May 8, 2020 Office Action issued in Chinese Patent Application No. 201780033480.3.
Sep. 3, 2020 Notice of Allowance issued in U.S. Appl. No. 16/082,877.
U.S. Appl. No. 16/082,906, filed Sep. 6, 2018 in the name of Sekiguchi et al.
Sep. 6, 2022 Decision of Dismissal of Amendment issued in Japanese Patent Application No. 2018-509356.

* cited by examiner

IMAGING DEVICE, IMAGE PROCESSING DEVICE, AND ELECTRONIC APPARATUS

This is a divisional of U.S. patent application Ser. No. 16/082,877 filed Sep. 6, 2018 (now U.S. Pat. No. 10,885, 610), which is a U.S. National Stage of International Application No. PCT/JP2017/012980 filed Mar. 29, 2017, which claims priority from Japanese Application No. 2016-071970 filed in Japan on Mar. 31, 2016. The disclosure of each of the prior applications is incorporated by reference herein in its entirety.

TECHNICAL FIELD

The present invention relates to an imaging device, to an image processing device, and to an electronic apparatus.

BACKGROUND ART

An imaging device equipped with image processing technology for generating an image based on a signal from an imaging element is per se known (refer to PTL1).

From the past, there have been demands for improvement of imaging quality.

CITATION LIST

Patent Literature

PTL1: Japanese Laid-Open Patent Publication No. 2006-197192.

SUMMARY OF INVENTION

According to a first aspect, an imaging device comprises: an image capture unit having a first image capture region that performs image capture under first image capture conditions, and a second image capture region that performs image capture under second image capture conditions that are different from the first image capture conditions; and a generation unit that generates an image of a photographic subject captured in the first image capture region according to image data for a photographic subject captured in the second image capture region.

According to a second aspect, an imaging device comprises: an image capture unit having a first image capture region that performs image capture under first image capture conditions, and a second image capture region that performs image capture under second image capture conditions that are different from the first image capture conditions; and a generation unit that generates image data for a photographic subject captured in the first image capture region according to image data for a photographic subject captured in the second image capture region.

According to a third aspect, an image processing device comprises: an input unit that receives image data for a photographic subject from an image capture unit having a first image capture region that performs image capture under first image capture conditions, and a second image capture region that performs image capture under second image capture conditions that are different from the first image capture conditions; and a generation unit that generates an image of a photographic subject captured in the first image capture region according to image data for a photographic subject captured in the second image capture region.

According to a fourth aspect, an image processing device comprises: an input unit that receives image data for a photographic subject from an image capture unit having a first image capture region that performs image capture under first image capture conditions, and a second image capture region that performs image capture under second image capture conditions that are different from the first image capture conditions; and a generation unit that generates image data for a photographic subject captured in the first image capture region according to image data for a photographic subject captured in the second image capture region.

According to a fifth aspect, an electronic apparatus comprises: an imaging element having a plurality of image capture regions; a setting unit that sets different image capture conditions for the plurality of image capture regions; and a generation unit that generates an image by correcting a portion of an image signal of a photographic subject captured under first image capture conditions in an image capture region among the plurality of image capture regions such that as if it was captured under second image capture conditions.

According to a sixth aspect, an electronic apparatus comprises: an imaging element having a plurality of image capture regions; a setting unit that sets for a first image capture region image capture conditions different from those for a second image capture region among the plurality of image capture regions; and a generation unit that generates an image by correcting an image signal of a photographic subject captured in the first image capture region such that as if it was captured according to first image capture conditions and second image capture conditions.

According to a seventh aspect, an electronic apparatus comprises: an imaging element having a first image capture region, in which a plurality of first pixels are arranged, that captures a photographic subject, and a second image capture region, in which a plurality of second pixels are arranged, that captures a photographic subject; a setting unit that sets image capture conditions for the first image capture region that are different from image capture conditions for the second image capture region; and a generation unit that generates an image of the photographic subject captured in the first image capture region by using a signal from the first pixel according to a signal from a pixel selected from the first pixel and the second pixel.

According to an eighth aspect, an electronic apparatus comprises: an imaging element having a first image capture region in which a first pixel and a second pixel are disposed, and a second image capture region in which a third pixel is disposed; a setting unit that sets image capture conditions for the first image capture region that are different from image capture conditions for the second image capture region; a correction unit that performs correction by smoothing a signal from the second pixel with respect to a signal of the third pixel; and a generation unit that generates an image of a photographic subject captured in the first image capture region, by employing a signal from the first pixel and the signal from the second pixel that has been corrected by the correction unit.

BRIEF DESCRIPTION OF DRAWINGS

FIG. 10A is a figure showing an example of an arrangement of photoelectrically converted signals outputted from pixels, FIG. 10B is a figure for explanation of interpolation of image data of the G color component, and FIG. 10C is a figure showing an example of image data of the G color component after interpolation;

DESCRIPTION OF EMBODIMENTS

First Embodiment

As one example of an electronic apparatus equipped with an image processing device according to a first embodiment of the present invention, a digital camera will now be explained by way of example. A camera 1 (refer to FIG. 1) is adapted to be capable of performing image capture under different conditions for each of various regions upon the imaging surface of an imaging element 32a. An image processing unit 33 performs appropriate image processing for each of these regions, for which the image capture conditions are different. The details of this type of camera 1 will now be explained with reference to the drawings.

Explanation of the Camera

Figure 1:
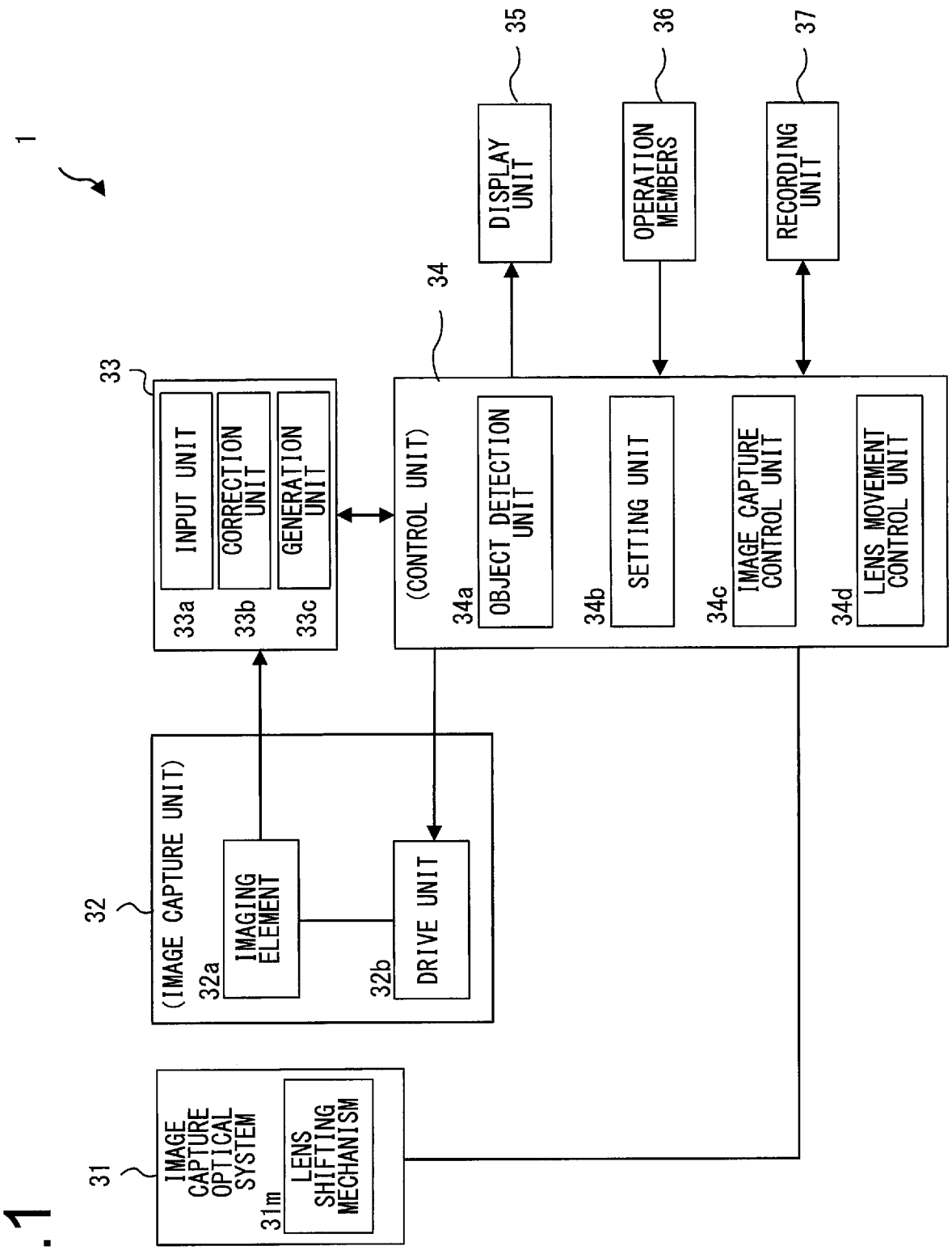
FIG. 1 is a block diagram showing an example of the structure of a camera according to a first embodiment.

FIG. 1 is a block diagram showing an example of the structure of this camera 1 according to the first embodiment of the present invention. As shown in FIG. 1, the camera 1 comprises an image capture optical system 31, an image capture unit 32, an image processing unit 33, a control unit 34, a display unit 35, operation members 36, and a recording unit 37.

The image capture optical system 31 conducts a light flux from the photographic field to the image capture unit 32. The image capture unit 32 includes an imaging element 32a and a drive unit 32b, and photoelectrically converts an image of the photographic subject formed by the image capture optical system 31. The image capture unit 32 is capable of performing image capturing under the same image capture conditions for the entire area of the imaging surface of the imaging element 32a, and is also capable of performing image capturing under different image capture conditions for each of various regions of the imaging surface of the imaging element 32a. The details of the image capture unit 32 will be described hereinafter. The drive unit 32b generates a drive signal that is required in order for the imaging element 32a to perform accumulation control. Image capture commands for the image capture unit 32, such as the time period for charge accumulation and so on, are transmitted from the control unit 34 to the drive unit 32b.

The image processing unit 33 comprises an input unit 33a, a correction unit 33b, and a generation unit 33c. Image data acquired by the image capture unit 32 is inputted to the input unit 33a. The correction unit 33b performs pre-processing in which correction is performed upon the image data that has been inputted as described above. The details of this pre-processing will be described hereinafter. The generation unit 33c performs image processing upon the above-described inputted image data and the image data after pre-processing, and generates an image. This image processing may include, for example, color interpolation processing, pixel defect correction processing, contour enhancement processing, noise reduction processing, white balance adjustment processing, gamma correction processing, display luminance adjustment processing, saturation adjustment processing, and so on. Furthermore, the generation unit 33c generates an image that is displayed by the display unit 35.

The control unit 34 may, for example, include a CPU, and controls the overall operation of the camera 1. For example, the control unit 34 performs predetermined exposure calculation on the basis of the photoelectrically converted signals acquired by the image capture unit 32, determines exposure conditions that are required for appropriate exposure, such as a charge accumulation time (i.e. an exposure time) for the imaging element 32a, an aperture value for the image capture optical system 31, an ISO sensitivity, and so on, and issues appropriate commands to the drive unit 32b. Moreover, the control unit 34 determines appropriate image processing conditions for adjustment of the saturation, the contrast, the sharpness and so on according to the scene imaging mode set for the camera 1 and the type of photographic subject elements that have been detected, and issues corresponding commands to the image processing unit 33. The detection of the elements of the photographic subject will be described hereinafter.

The control unit 34 comprises an object detection unit 34a, a setting unit 34b, an image capture control unit 34c, and a lens movement control unit 34d. While these are implemented in software by the control unit 34 executing programs stored in a non-volatile memory not shown in the figures, alternatively they may be implemented by providing ASICs or the like.

By performing per se known object recognition processing, from the image data acquired by the image capture unit 32, the object detection unit 34a is capable of detecting elements of the photographic subject such as people (i.e. people's faces), animals such as dogs or cats or the like (i.e. animals' faces), plants, transportation devices like bicycles, automobiles, trains and so on, buildings, stationary objects, scenery elements such as mountains, clouds and so on, and specified objects that have been determined in advance and the like. And the setting unit 34b subdivides the image data acquired by the image capture unit 32 into a plurality of regions which include elements of the photographic subject that have been detected as described above.

Furthermore, the setting unit 34b sets image capture conditions for the plurality of regions. These image capture conditions include the exposure conditions described above (i.e. the charge accumulation time, the gain, the ISO sensitivity, the frame rate, and so on) and the image processing conditions described above (for example, a parameter for white balance adjustment, a gamma correction curve, a parameter for display luminance adjustment, a saturation adjustment parameter, and so on). It should be noted that it would be possible for the same image capture conditions to be set for all of the plurality of regions, or it would also be possible for different image capture conditions to be set for each of the plurality of regions.

The image capture control unit 34c controls the image capture unit 32 (i.e. its imaging element 32a) and the image processing unit 33 by applying the image capture conditions that have been set by the setting unit 34b for each of the regions. Due to this, it is possible for the image capture unit 32 to perform image capture under different exposure conditions for each of the plurality of regions, and it is possible for the image processing unit 33 to perform image processing under different image processing conditions for each of the plurality of regions. The number of pixels making up each of the regions may be any desired number; for example, a thousand pixels would be acceptable, or one pixel would also be acceptable. Furthermore, the numbers of pixels in different regions may also be different.

The lens movement control unit 34d controls the automatic focus adjustment operation (auto focus: A/F) so as to set the focus at the photographic subject corresponding to a predetermined position upon the imaging screen (this point is referred to as the "point of focusing"). When the focus is adjusted, the sharpness of the image of the photographic subject is enhanced. In other words, the image formed by the image capture optical system 31 is adjusted by shifting a focusing lens of the image capture optical system 31 along the direction of the optical axis. On the basis of the result of calculation, the lens movement control unit 34d sends, to a lens shifting mechanism 31m of the image capture optical system 31, a drive signal for causing the focusing lens of the image capture optical system 31 to be shifted to a focusing position, for example a signal for adjusting the image of the photographic subject by the focusing lens of the image capture optical system 31. In this manner, the lens movement control unit 34d functions as a shifting unit that causes the focusing lens of the image capture optical system 31 to be shifted along the direction of the optical axis on the basis of the result of calculation. The processing for A/F operation performed by the lens movement control unit 34d is also referred to as focus detection processing. The details of this focus detection processing will be described hereinafter.

The display unit 35 reproduces and displays an image that has been generated or an image that has been image processed by the image processing unit 33, or an image read out by the recording unit 37 or the like. The display unit 35 also performs display of an operation menu screen, display of a setting screen for setting image capture conditions, and so on.

The operation members 36 include operation members of various types, such as a release button and a menu button and so on. Upon being operated, the operation members 36 send operation signals to the control unit 34. The operation members 36 also may include a touch operation member that is provided upon the display surface of the display unit 35.

According to commands from the control unit 34, the recording unit 37 records image data and so on upon a recording medium such as a memory card or the like, not shown in the figures. Moreover, according to commands from the control unit 34, the recording unit 37 reads out image data recorded upon the recording medium.

Explanation of a Laminated Type Imaging Element

Figure 2:
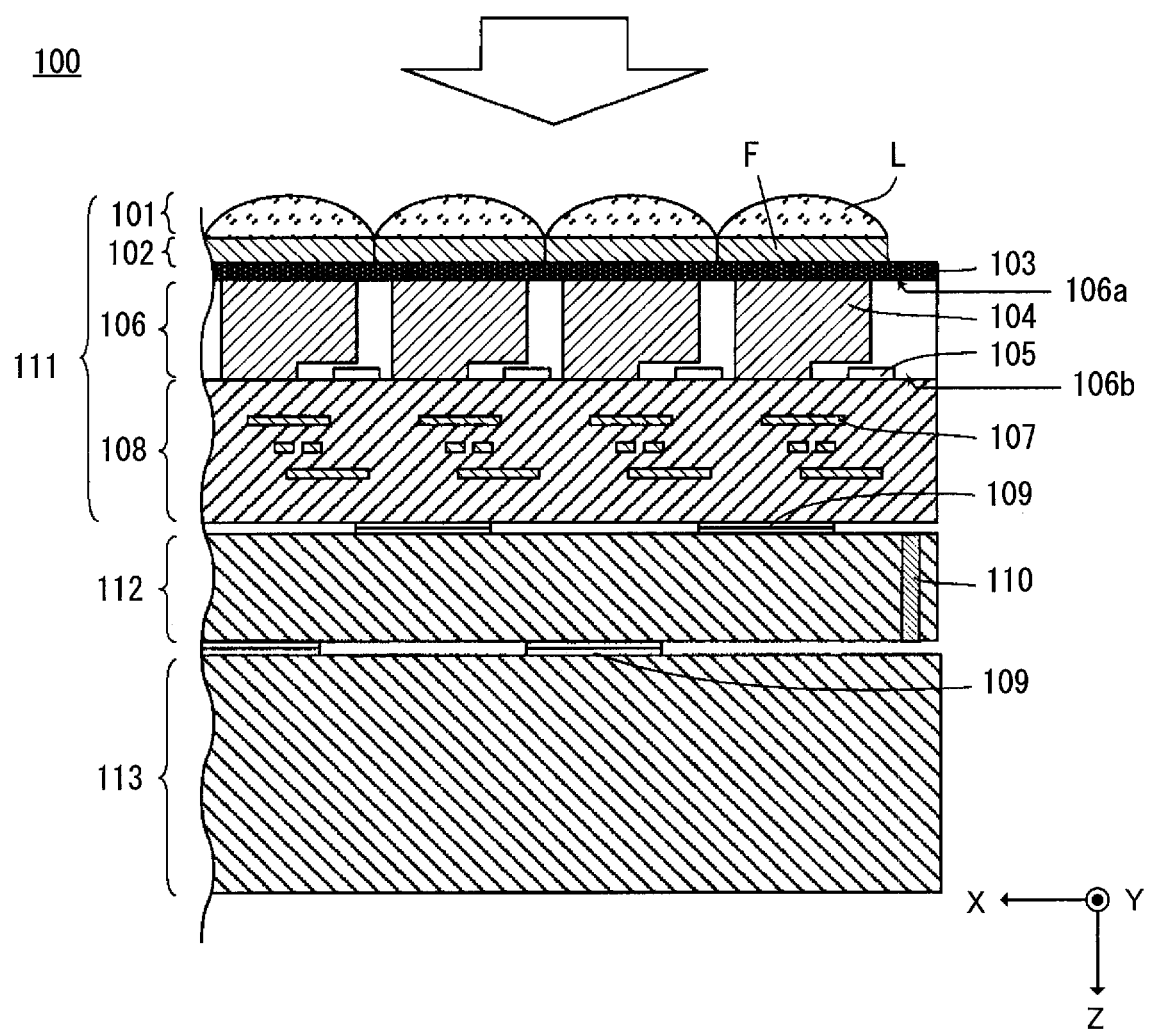
FIG. 2 is a sectional view of a laminated type imaging element.

As an example of the imaging element 32a described above, a laminated type imaging element 100 will now be explained. FIG. 2 is a sectional view of this imaging element 100. The imaging element 100 comprises an image capture chip 111, a signal processing chip 112, and a memory chip 113. The image capture chip 111 is laminated upon the signal processing chip 112. And the signal processing chip 112 is laminated upon the memory chip 113. The image capture chip 111 and the signal processing chip 112 are electrically connected together by connection portions 109, and so are the signal processing chip 112 and the memory chip 113. These connection portions 109 may, for example, be bumps or electrodes. The image capture chip 111 captures an optical image of the photographic subject and generates image data. The image capture chip 111 outputs the image data from the image capture chip 111 to the signal processing chip 112. And the signal processing chip 112 performs signal processing upon the image data outputted from the image capture chip 111. The memory chip 113 includes a plurality of memories, and stores the image data. It should be understood that it would also be acceptable for the imaging element 100 to be built from an image capture chip and a signal processing chip. If the imaging element 100 is built from an image capture chip and a signal processing chip, then it will be acceptable for a storage unit for storing the image data to be provided to the signal processing chip, or to be provided separately from the imaging element 100.

As shown in FIG. 2, incident light principally enters along the +Z axis direction, as shown by the outlined white arrow sign. Moreover, as shown on the coordinate axes, the leftward direction upon the drawing paper which is orthogonal to the Z axis is taken as being the +X axis direction, and the direction perpendicular to the Z axis from the drawing paper and toward the viewer is taken as being the +Y axis direction. In some of the subsequent figures coordinate axes are displayed so that, taking the coordinate axes shown in FIG. 2 as reference, the orientation of each figure can be understood.

The image capture chip 111 may, for example, be a CMOS image sensor. In concrete terms, the image capture chip 111 is a backside illuminated type CMOS image sensor. The image capture chip 111 comprises a micro-lens layer 101, a color filter layer 102, a passivation layer 103, a semiconductor layer 106, and a wiring layer 108. In this imaging chip 111, the micro-lens layer 101, the color filter layer 102, the passivation layer 103, the semiconductor layer 106, and the wiring layer 108 are arranged in that order in the +Z axis direction.

The micro-lens layer 101 includes a plurality of micro-lenses L. The micro-lense L condenses incident light onto a photoelectric conversion unit 104 that will be described hereinafter. The color filter layer 102 includes a plurality of color filters F. The color filter layer 102 includes color filters F of a plurality of types having different spectral characteristics. In concrete terms, the color filter layer 102 has first filters (R) having a spectral characteristic of principally passing light of red color component, second filters (Gb, Gr) having a spectral characteristic of principally passing light of green color component, and third filters (B) having a spectral characteristic of principally passing light of blue color component. For example, the first filters, the second filters, and the third filters may be arranged in the color filter layer 102 in a Bayer array configuration. The passivation layer 103 consists of a nitride layer or an oxide layer, and protects the semiconductor layer 106.

The semiconductor layer 106 comprises a photoelectric conversion unit 104 and a readout circuit 105. The semiconductor layer 106 includes a plurality of photoelectric conversion units 104 between a first surface 106a, which is its surface upon which light is incident, and a second surface 106b, which is on its side opposite to the first surface 106a. In the semiconductor layer 106, the plurality of photoelectric conversion units 104 are arrayed along the X axis direction and the Y axis direction. The photoelectric conversion units 104 have a photoelectric conversion function of converting light into electrical charge. Moreover, the photoelectric conversion units 104 accumulate the charges of these photoelectrically converted signals. These photoelectric conversion units 104 may, for example, be photodiodes. The semiconductor layer 106 is provided with the readout circuits 105 that are positioned closer to the second surface 106b than the photoelectric conversion units 104 are. In the semiconductor layer 106, the plurality of readout circuits 105 are arrayed along the X axis direction and the Y axis direction. Each of these readout circuits 105 comprises a plurality of transistors, and they read out image data generated based on the charges having been generated by photoelectric conversion by the photoelectric conversion units 104 and output this data to the wiring layer 108.

The wiring layer 108 includes a plurality of metallic layers. These metallic layers, for example, include A1 wiring, Cu wiring, or the like. The image data that has been read out by the readout circuits 105 is outputted to this wiring layer 108. The image data is outputted from the wiring layer 108 via the connection portions 109 to the signal processing chip 112.

It should be understood that each one of the connection portions 109 may be provided for one of the photoelectric conversion units 104. Alternatively, each one of the connection portions 109 may be provided for a plurality of the photoelectric conversion units 104. If each one of the connection portions 109 is provided for a plurality of the photoelectric conversion units 104, then the pitch of the connection portions 109 may be greater than the pitch of the photoelectric conversion units 104. Furthermore, the connection portions 109 may be provided in a region that is peripheral to the region in which the photoelectric conversion units 104 are disposed.

The signal processing chip 112 includes a plurality of signal processing circuits. These signal processing circuits perform signal processing upon the image data outputted from the image capture chip 111. The signal processing circuits may each, for example, include an amplification circuit that amplifies the value of the image data signal, a correlated double sampling circuit that performs noise reduction processing upon the image data, an analog/digital (A/D) conversion circuit that converts the analog signal into a digital signal, and so on. One such signal processing circuit may be provided for each of the photoelectric conversion units 104.

Alternatively, each one of the signal processing circuits may be provided for a plurality of the photoelectric conversion units 104. The signal processing chip 112 has a plurality of through electrodes or vias 110. These through electrodes 110 may, for example, be through-silicon vias. The through electrodes 110 mutually interconnect circuits (not shown in the figure) provided upon the signal processing chip 112. Such through electrodes 110 may also be provided upon the peripheral region of the image capture chip 111, or upon the memory chip 113. It should be understood that it would also be acceptable for some of the elements making up the signal processing circuitry to be provided upon the image capture chip 111. For example, in the case of the analog/digital circuit, it would be acceptable for a comparator that compares the input voltage and a reference voltage to be provided upon the image capture chip 111, and for circuitry such as a counter circuit and/or a latch circuit and the like to be provided upon the signal processing chip 112.

The memory chip 113 has a plurality of storage sections. These storage sections store image data upon which signal processing has been performed by the signal processing chip 112. The storage units may, for example, be volatile memories such as DRAMs or the like. Each one of the storage units may be provided for one of the photoelectric conversion units 104. Alternatively, each one of the storage units may be provided for a plurality of the photoelectric conversion units 104. The image data stored in these storage units is outputted to an image processing unit at a subsequent stage.

Figure 3:
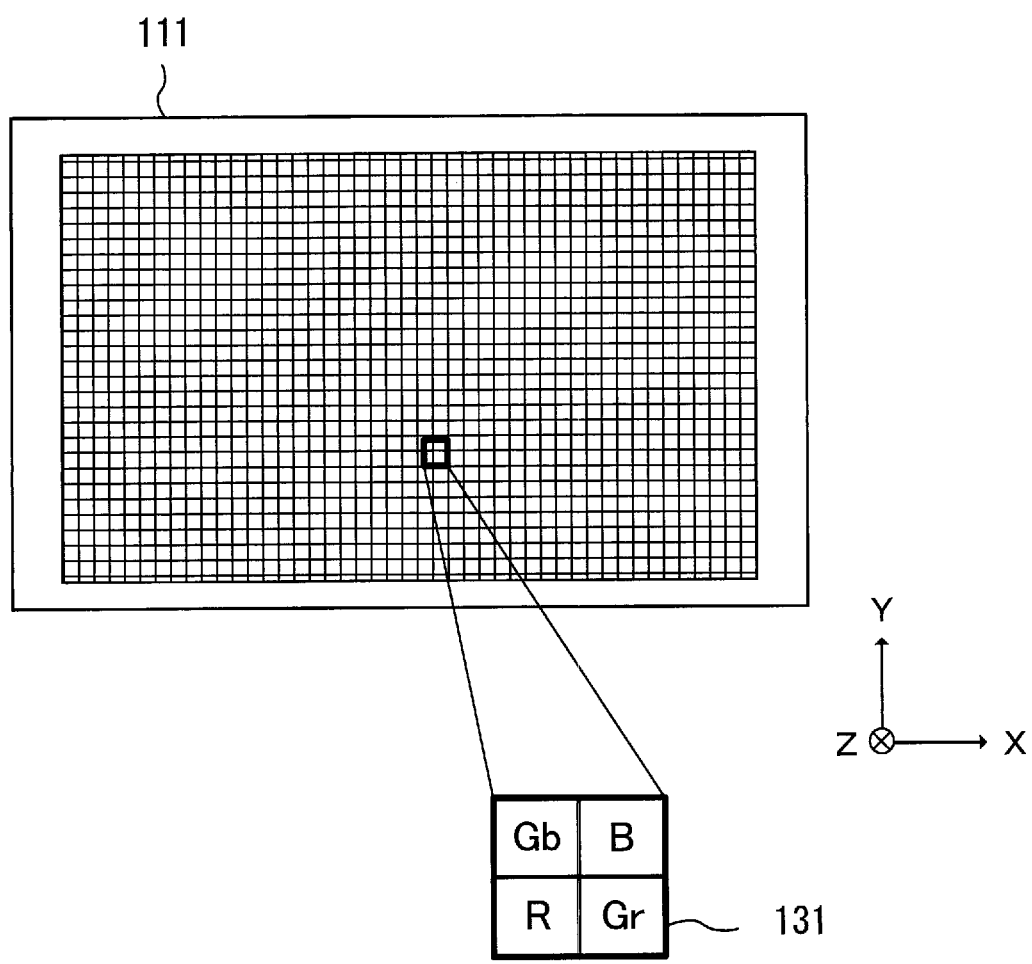
FIG. 3 is a figure for explanation of a pixel array upon an image capture chip and of unit regions.

FIG. 3 is a figure for explanation of the pixel array upon the image capture chip 111 and of unit regions 131. In particular, this figure shows a situation in which the image capture chip 111 is being viewed from its back surface side (i.e. from its imaging surface side). For example, 20 million pixels or more may be arrayed in the pixel area in the form of a matrix. In the FIG. 3 example, four adjacent pixels in a 2×2 arrangement constitute a single unit region 131. The grid lines in this figure show this concept of adjacent pixels being grouped together into the unit regions 131. The number of pixels constituting each of the unit regions 131 is not limited to the above; for example, 32×32 pixels would be acceptable, and more or fewer would be acceptable— indeed a single pixel would also be acceptable.

As shown in the enlarged partial view of the pixel area, a unit region 131 in FIG. 3 is configured as a so-called Bayer array, and includes four pixels: two green color pixels Gb and Gr, a blue color pixel B, and a red color pixel R. The green color pixels Gb and Gr are pixels that have green filters as their color filters F, and receive light in the green wavelength band in the incident light. In a similar manner, the blue color pixel B is a pixel that has a blue filter as its color filter F and receives light in the blue wavelength band in the incident light, and the red color pixel R is a pixel that has a red filter as its color filter F and receives light in the red wavelength band in the incident light.

In this embodiment of the present invention, a plurality of blocks are defined so as to include at least one of the unit regions 131 per each block. In other words, the minimum unit for one block is a single unit region 131. As described above, among the values that can be taken as the number of pixels constituting a single unit region 131, the smallest number of pixels is one pixel. Accordingly, when defining one block in pixel units, the minimum number of pixels among the pixels that can define one block is one pixel. Each block can control pixels included therein with the control parameters that are different from those set for another block. In each block, all of the unit regions 131 within that block, in other words all of the pixels in that block, are controlled according to the same image capture conditions. In other words, photoelectrically converted signals for which the image capture conditions are different can be acquired from a pixel group that is included in some block, and from a pixel group that is included in a different block. Examples of control parameters are frame rate, gain, decimation ratio, number of rows or number of columns whose photoelectrically converted signals are added together, charge accumulation time or number of times of accumulation, number of digitized bits (i.e. word length), and so on. The imaging element 100 can freely perform decimation, not only in the row direction (i.e. the X axis direction of the image capture chip 111), but also in the column direction (i.e. the Y axis direction of the image capture chip 111). Furthermore, the control parameter may also be a parameter that participates in the image processing.

Figure 4:
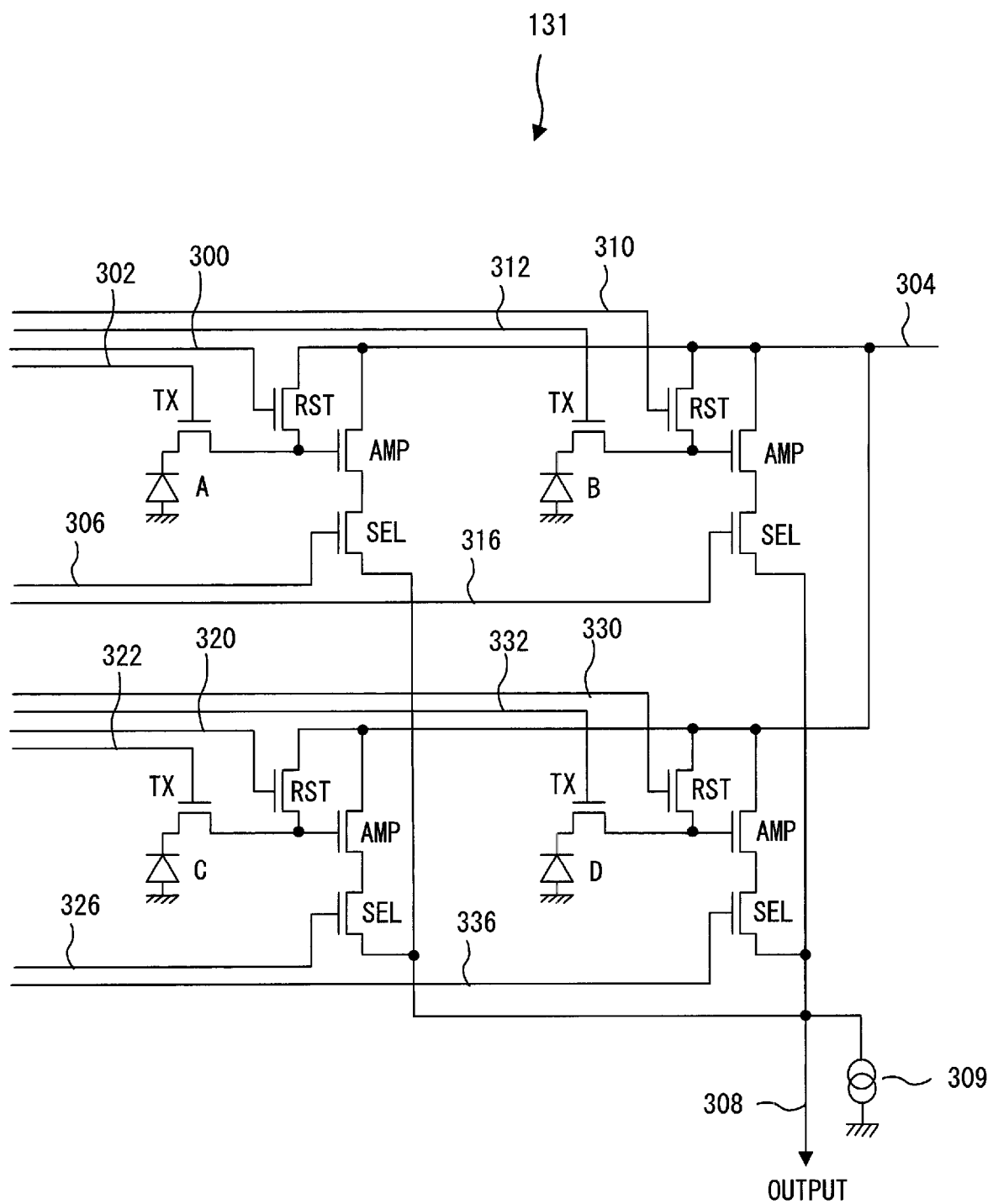
FIG. 4 is a figure for explanation of circuitry for a unit region.

FIG. 4 is a figure for explanation of the circuitry for one of the unit regions 131. In the FIG. 4 example, a single unit region 131 is formed by four adjacent pixels in a 2×2 arrangement. It should be understood that, as described above, the number of pixels included in a unit region 131 is not limited to the above; it could be a thousand pixels or more, or at minimum it could be only one pixel. The two dimensional pixel positions in the unit region 131 are referred to by the reference symbols A through D.

Reset transistors (RST) of the pixels included in the unit region 131 can be turned on and off individually for each of the pixels. In FIG. 4, reset wiring 300 is provided for turning the reset transistor of the pixel A on and off, and reset wiring 310 for turning the reset transistor of the pixel B on and off is provided separately from the above described reset wiring 300. In a similar manner, reset wiring 320 for turning the reset transistor of the pixel C on and off is provided separately from the above described reset wiring 300 and 310. Moreover, dedicated reset wiring 330 is also provided to the other pixel D for turning its reset transistor on and off.

Transfer transistors (TX) of the pixels included in the unit region 131 can also be turned on and off individually for each of the pixels. In FIG. 4, transfer wiring 302 for turning the transfer transistor of the pixel A on and off, transfer wiring 312 for turning the transfer transistor of the pixel B on and off, and transfer wiring 322 for turning the transfer transistor of the pixel C on and off are provided separately. Dedicated transfer wiring 332 is also provided for turning the transfer transistor of the other pixel D on and off.

Furthermore, selection transistors (SEL) of the pixels included in the unit region 131 can also be turned on and off individually for each of the pixels. In FIG. 4, selection wiring 306 for turning the selection transistor of the pixel A on and off, selection wiring 316 for turning the selection transistor of the pixel B on and off, and selection wiring 326 for turning the selection transistor of the pixel C on and off are provided separately. Dedicated selection wiring 336 is also provided for turning the selection transistor of the other pixel D on and off.

It should be understood that power supply wiring 304 is connected in common for all of the pixels A through D included in the unit region 131. In a similar manner, output wiring 308 is also connected in common for all of the pixels A through D included in the unit region 131. Moreover, while the power supply wiring 304 is connected in common for a plurality of unit regions, the output wiring 308 is provided individually for each of the unit regions 131. A load current source 309 supplies current to the output wiring 308. This load current source 309 could be provided at the image capture chip 111, or could be provided at the signal processing chip 112.

By individually turning the reset transistors and the transfer transistors of the unit region 131 on and off, it is possible to control charge accumulation for each of the pixels A through D included in the unit region 131, including their starting times for accumulation of charge, their ending times for accumulation of charge, and their transfer timings. Furthermore, by individually turning the selection transistors of the unit region 131 on and off, it is possible to output the photoelectrically converted signals of each of the pixels A through D via the common output wiring 308.

Here, a so called rolling shutter method is per se known of controlling charge accumulation for the pixels A through D included in the unit region 131 in a regular sequence by rows and columns. According to the rolling shutter method, for each row, when pixels are selected and then columns are designated, in the example of FIG. 4, photoelectrically converted signals are outputted in the order "ABCD".

By building the circuitry in this manner with the unit regions 131 taken as standard, it is possible to control the charge accumulation time for each of the unit regions 131. To put it in another manner, it is possible to output photoelectrically converted signals at frame rates that are different for each of the unit regions 131. Moreover by causing charge accumulation (i.e. image capture) to be performed by unit regions 131 included in some of the blocks on the image capturing chip 111 while allowing the unit regions included in other blocks to stand by, it is possible to cause image capture to be performed only by predetermined blocks of the image capture chip 111 and to output those photoelectrically converted signals. Furthermore, by changing over the blocks for which charge accumulation (i.e. image capture) is performed (i.e. by changing over the subject blocks for charge accumulation control) between frames, it is possible to cause image capture to be performed and output of photoelectric signals to be performed sequentially by different blocks of the image capture chip 111.

As described above, the output wiring 308 is provided to correspond to each of the unit regions 131. Since, in this imaging element 100, the image capture chip 111, the signal processing chip 112, and the memory chip 113 are laminated together, accordingly it is possible to route the wiring without increasing the sizes of the chips in their planar directions by employing, as the output wiring 308, electrical connections between the chips through the connection portions 109.

Block Control of the Imaging Element

In this embodiment of the present invention, the imaging element is arranged to be possible to set image capture conditions for each of a plurality of blocks upon the imaging element 32a. The image capture control unit 34c of the control unit 34 associates the plurality of regions described above with the blocks described above, so as to cause image capturing to be performed under the image capture conditions that have been set for each of the regions.

Figure 5:
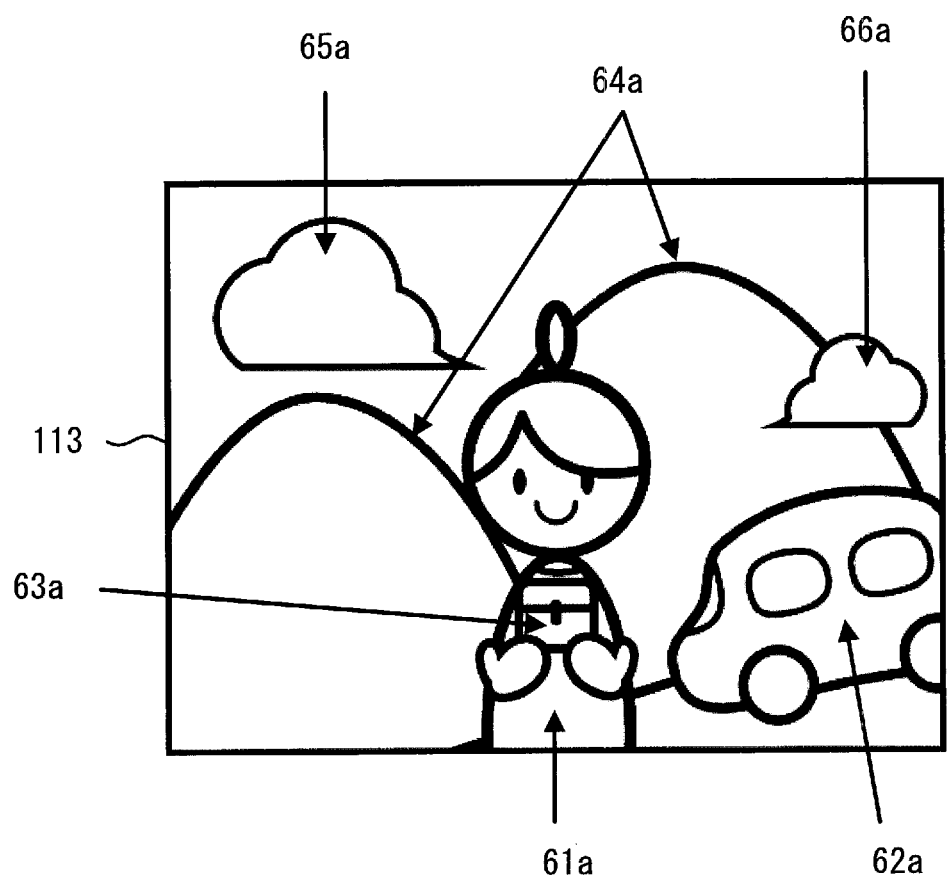
FIG. 5 is a figure schematically showing an image of a photographic subject formed on an imaging element of a camera.

FIG. 5 is a figure schematically showing an image of a photographic subject that has been formed upon the imaging element 32a of the camera 1. Before an image capture command is issued, the camera 1 acquires a live view image by photoelectrically converting an image of the photographic subject. The term "a live view image" refers to an image for monitoring which is captured repeatedly at a predetermined frame rate (for example 60 fps).

Before subdivision into regions by the setting unit 34b, the control unit 34 sets the same image capture conditions for the entire area of the image capture chip 111 (in other words, for the entire imaging screen). By "the same image capture conditions" is meant that common image capture conditions are set over the entire imaging screen; even if there is some variation in the conditions, such as for example the apex value varying by less than around 0.3 steps, they are regarded as being the same. These image capture conditions that are set to be the same over the entire area of the image capture chip 111 are determined on the basis of exposure conditions corresponding to the photometric value of the luminance of the photographic subject, or corresponding to exposure conditions that have been manually set by the user.

In FIG. 5, an image that includes a person 61a, an automobile 62a, a bag 63a, mountains 64a, and clouds 65a and 66a is formed upon the imaging surface of the image capture chip 111. The person 61a is holding the bag 63a with both hands. And the automobile 62a is stopped to the right of the person 61a and behind her.

Subdivision of the Regions

On the basis of the live view image, the control unit 34 subdivides the live view image screen into a plurality of regions in the following manner. First, elements of the photographic subject are detected from the live view image by the object detection unit 34a. A per se known photographic subject recognition technique may be used for this detection of the elements of the photographic subject. In the example shown in FIG. 5, the person 61a, the automobile 62a, the bag 63a, the mountains 64a, the cloud 65a, and the cloud 66a are detected as elements of the photographic subject.

Next, the setting unit 34b subdivides the live view image screen into regions that include the elements of the photographic subject described above. In this embodiment, the explanation will refer to the region that includes the person 61a as being a first region 61, the region that includes the automobile 62a as being a second region 62, the region that includes the bag 63a as being a third region 63, the region that includes the mountains 64a as being a fourth region 64, the region that includes the cloud 65a as being a fifth region 65, and the region that includes the cloud 66a as being a sixth region 66.

Setting of the Image Capture Conditions for Each Block

Figure 6:
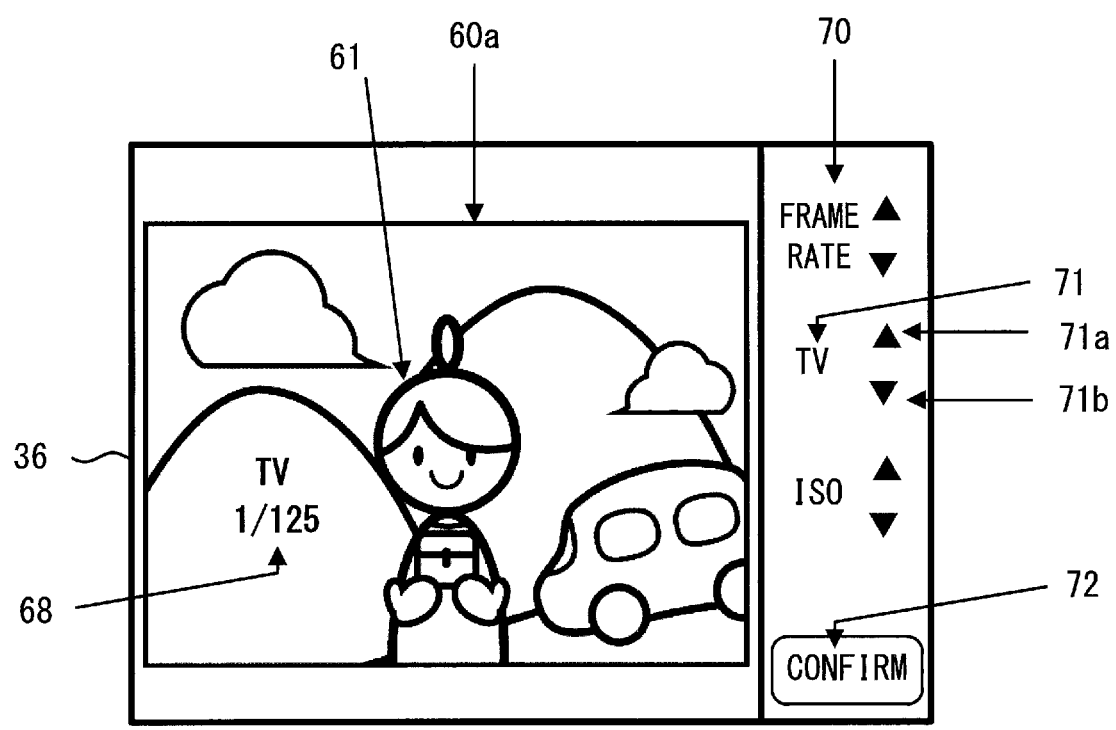
FIG. 6 is a figure showing an example of a setting screen for image capture conditions.

When the screen has thus been subdivided into a plurality of regions by the setting unit 34b, the control unit 34 displays a setting screen as shown by way of example in FIG. 6 upon the display unit 35. In FIG. 6, a live view image 60a is displayed, and a setting screen 70 for setting the image capture conditions are displayed to the right of the live view image 60a.

In the setting screen 70, in order from the top, frame rate, shutter speed ("TV"), and gain ("ISO") are shown as examples of image capture condition items to be set. The frame rate is the number of live view images acquired in one second, or the number of video image frames recorded by the camera 1 in one second. And the gain is the ISO sensitivity. Other setting items for image capture conditions may be added as appropriate, additionally to the ones shown by way of example in FIG. 6. It will be acceptable to arrange for other setting items to be displayed by scrolling the setting items up and down, if all of the setting items do not fit within the setting screen 70.

In this embodiment, the control unit 34 takes a region selected by the user, among the regions subdivided by the setting unit 34b, as being the subject for setting (i.e. changing) of image capture conditions. For example, in the case of the camera 1 that is capable of being operated by touch actuation, the user may perform tapping operation upon the display surface of the display unit 35 upon which the live view image 60a is being displayed at the position of display of the main photographic subject whose image capture conditions are to be set (i.e. changed). When for example tapping operation is performed at the display position of the person 61a, then the control unit 34, along with taking the first region 61 in the live view image 60a that includes the person 61a as being the subject region for setting (i.e. changing) of the image capture conditions, also displays the outline of this first region 61 as accentuated.

In FIG. 6, the fact that the first region 61 is being displayed with its contour accentuated (i.e. by being displayed thicker, by being displayed brighter, by being displayed with its color changed, by being displayed with broken lines, or the like) shows that this region is the subject of setting (i.e. of changing) its image capture conditions. In the FIG. 6 example, it will be supposed that the live view image 60a is being displayed in which the contour of the first region 61 is accentuated. In this case, this first region 61 is the subject for setting (i.e. of changing) its image capture conditions. For example, in the case of the camera 1 that can be operated by touch operation, when tapping operation is performed by the user upon the display 71 of shutter speed (i.e. "TV"), the control unit 34 causes the currently set value of shutter speed for this region that is being displayed as accentuated (i.e. for the first region 61) to be displayed upon the screen (as shown by the reference symbol 68).

While, in the above explanation, it has been supposed that this camera 1 can be operated by touch operation, it would also be acceptable to arrange for setting (i.e. changing) of the image capture conditions to be performed by operation of buttons or the like that are included in the operation members 36.

When tapping operation is performed by the user upon an upper icon 71*a* or upon a lower icon 71*b*, the setting unit 34*b* increases or decreases the shutter speed display 68 according to the above described tapping operation, and also sends a command to the image capture unit 32 (refer to FIG. 1) to change the image capture conditions for the unit regions 131 (refer to FIG. 3) of the imaging element 32*a* that correspond to the region that is being displayed as accentuated (i.e. the first region 61) according to the above described tapping operation. A confirm icon 72 is an operating icon for the user to confirm the image capture conditions that have been set. The setting unit 34*b* also performs setting (changing) of the frame rate or of the gain ("ISO") in a similar manner to performing setting (changing) of the shutter speed ("TV").

It should be understood that, although this explanation has presumed that the image capture conditions are set on the basis of operation by the user, this should not be considered as being limitative. It would also be acceptable to arrange for the setting unit 34*b* to set image capture conditions, not on the basis of operation by the user, but rather according to determination by the control unit 34.

For the regions that are not being displayed as accentuated (i.e. the regions other than the first region 61), the image capture conditions that are currently set are kept unchanged.

Instead of displaying as accentuated the contour of the region which is to be the subject of setting (i.e. of changing) its image capture conditions, it would also be acceptable to arrange for the control unit 34 to display this entire subject region as brighter, or to display this entire subject region in high contrast, or to display this entire subject region as blinking. Moreover, the subject region could also be displayed as being surrounded by a frame. The format for such a frame displayed as surrounding the subject area may be a double frame or a single frame, and the display of the frame, such as line type, color, brightness or the like may be varied as appropriate. Furthermore, it may be arranged for the control unit 34 to point at the region that is the subject of setting of image capture conditions with an arrow sign or the like displayed in the neighborhood of that subject region. It would also be acceptable to arrange for the control unit 34 to display the regions other than the region that is the subject of setting (i.e. of changing) the image capture conditions as more dark, or to display such other regions than the subject region in low contrast.

As described above, after the image capture conditions have been set for each of the subdivided regions described above, when a release button not shown in the figures included in the operation members 36 is actuated or when a display for commanding the start of image capture (i.e. a release icon) is actuated, the control unit 34 performs image capture under the image capture conditions that are set for each of the subdivided regions by controlling the image capture unit 32. And the image processing unit 33 performs image processing upon the image data acquired by the image capture unit 32. As described above, the image processing can be performed under different image processing conditions for each of the regions.

After the image processing described above has been performed by the image processing unit 33, upon receipt of a command from the control unit 34, the recording unit 37 records the image data after image processing upon a recording medium that may be, for example, a memory card or the like not shown in the figures. This completes the image capture processing sequence.

First Correction Processing

According to requirements, the correction unit 33*b* of the image processing unit 33 performs first correction processing, which is one type of pre-processing that is performed before the image processing, the focus detection processing, the photographic subject detection processing (for detecting the elements of the photographic subject), and the processing to set the image capture conditions.

As described above, in this embodiment, it is arranged to be possible, after the regions of the imaging screen have been subdivided by the setting unit 34*b*, to set (i.e. to change) the image capture conditions for a region selected by the user, or for a region determined by the control unit 34.

For example, suppose that the regions after subdivision are the first region 61 through the sixth region 66 (refer to FIG. 7A), and suppose that first image capture conditions through sixth image capture conditions, all different, are respectively set for the first region 61 through the sixth region 66. In such a case, there are blocks that include boundaries between the first region 61 through the sixth region 66. As described above, blocks are the minimum units upon the imaging element 32*a* for which image capture conditions can be set individually.

Figure 7A:
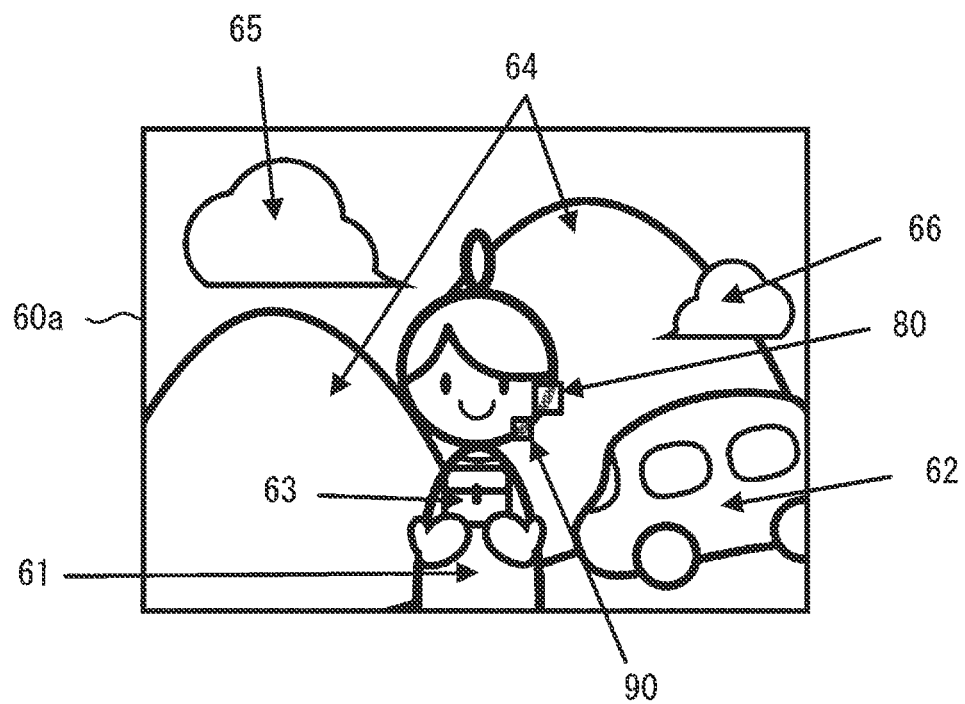
FIG. 7A is a figure showing an example of a predetermined range in a live view image.
Figure 7B:
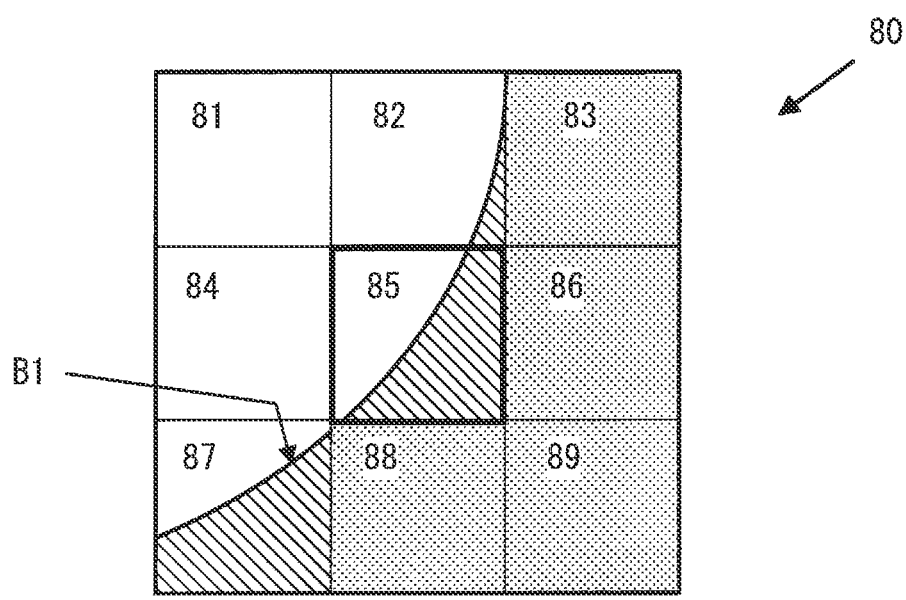
FIG. 7B is an enlarged view of that predetermined range.

FIG. 7A is a figure showing an example of a predetermined range 80 in the live view image 60*a* that includes a boundary between the first region 61 and the fourth region 64. And FIG. 7B is an enlarged view of that predetermined range 80 of FIG. 7A. In FIG. 7B, a plurality of blocks 81 through 89 are included in the predetermined range 80. In this example, the blocks 81 and 84 in which only the person is imaged are included in the first region 61, and the blocks 82, 85, and 87 in which both the person and a mountain are imaged are also included in the first region 61. For this reason, the first image capture conditions are set for the blocks 81, 82, 84, 85, and 87. On the other hand, it is supposed that the blocks 83, 86, 88, and 89 in which the mountain only is imaged are included in the fourth region 64. For this reason, the fourth image capture conditions are set for the blocks 83, 86, 88, and 89.

The white portion in FIG. 7B represents the portion corresponding to the person. Furthermore, the hatched portion in FIG. 7B represents the portion corresponding to the mountain. The boundary B1 between the first region 61 and the fourth region 64 is included in the block 82, the block 85, and the block 87. The stippled portion in FIG. 7B represents the portion corresponding to the mountain.

In this embodiment, the same image conditions are set over each single block, since the blocks are the minimum units for the setting of image capture conditions. Since, as described above, the first image capture conditions are set for the blocks 82, 85, and 87 that include the boundary B1 between the first region 61 and the fourth region 64, accordingly the first image capture conditions are also set for the hatched portions of these blocks 82, 85, and 87, that is, for their portions that correspond to the mountain. In other words, for the hatched portions within the blocks 82, 85, and 87, image capture conditions are set that are different from the fourth image capture conditions that are set for the blocks 83, 86, 88, and 89 in which the mountain is imaged.

In this case, there may be discrepancies in image brightness, contrast, hue and so on between the hatched portions of the blocks 82, 85, and 87 and the stippled portions of the blocks 83, 86, 88, and 89. In an extreme example, it is considered that clipped whites or crushed shadows may occur in the image data corresponding to the hatched portions mentioned above. For example, in the block 85, the first image capture conditions that are appropriate for a person may not be suitable for the hatched portion of the block 85 (in other words, for its portion corresponding to the mountain), and in some cases clipped whites or crushed shadows may occur in the image data corresponding to this hatched portion. "Clipped Whites" means that the gradations of the high luminance portion of the image data are lost due to over-exposure. Moreover, "crushed shadows" means that the gradations of the low luminance portion of the image data are lost due to under-exposure.

Figure 8:
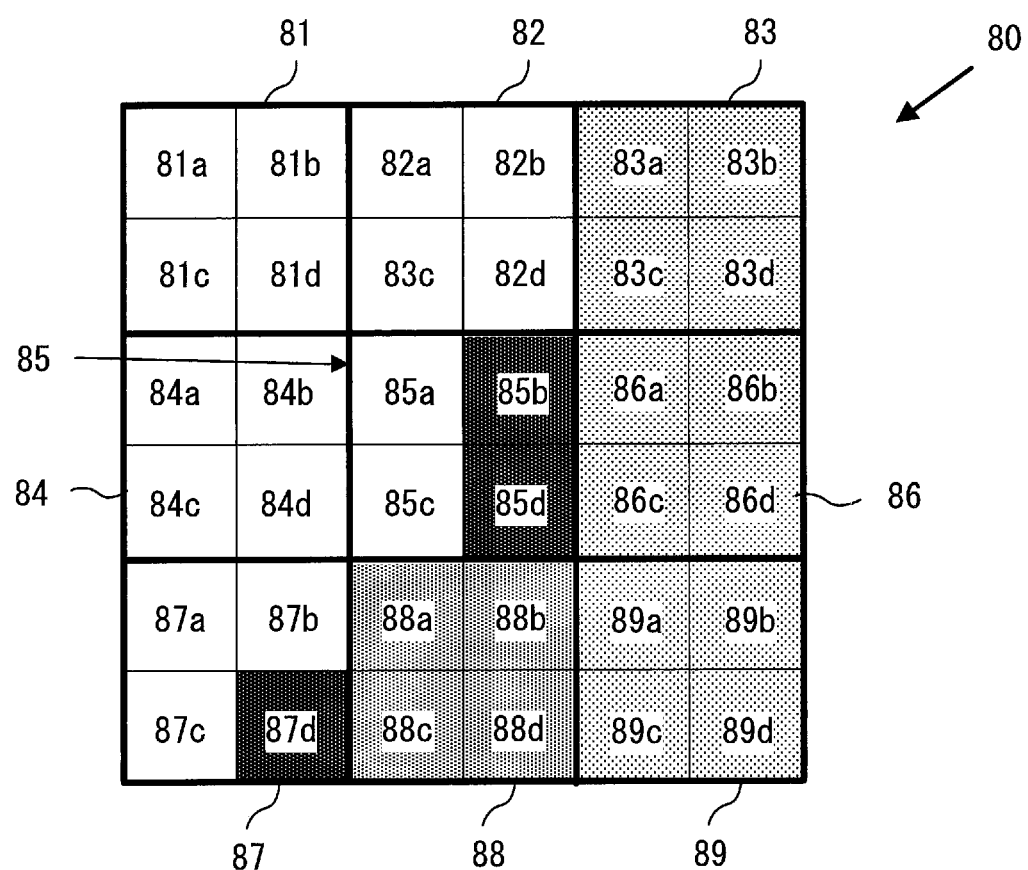
FIG. 8 is a figure showing an example of image data corresponding to FIG. 7B.

FIG. 8 is a figure showing an example of image data corresponding to FIG. 7B. In FIG. 8, it is supposed that each of the blocks 81 through 89 is composed of four pixels in a 2×2 arrangement. Of these, it is supposed that crushed shadows is occurring in the pixels 85b and 85d in the block 85 that is positioned in the center of FIG. 8. The correction unit 33b according to this embodiment corrects the image by performing replacement processing in which image data in a block in which clipped whites or crushed shadows has occurred is replaced with image data of some other block in the same imaging screen. This correction will be referred to as "first correction processing".

If a boundary between regions that are respectively based upon a plurality of elements of the photographic subject is included within a block such as the block 85 described above, and moreover clipped whites or crushed shadows is present in the image data for this block 85, then the correction unit 33b performs the first correction processing upon all of the blocks where clipped whites or crushed shadows is present.

It should be understood that, if clipped whites or crushed shadows is not occurring, then such first correction processing is unnecessary.

Description of Examples of the First Correction Processing

The correction unit 33b takes a block that includes the image data with which clipped whites or crushed shadows has occurred as being the block for attention, and performs the first correction processing upon that block for attention. Here, although the block for attention is taken as being a region that includes image data with which clipped white or crushed whites has occurred, it is not always necessary for the white portion of the image data to be totally blown or the black portion of the image data to be totally crushed. For example, it would also be acceptable to arrange to take a region where a signal value is greater than or equal to a first threshold value or less than or equal to a second threshold value as being the block for attention. In the example of FIG. 7B and FIG. 8, the eight blocks around a predetermined block for attention 85 that are included in the predetermined range 80 (for example three blocks by three blocks) centered upon the block for attention 85 will be taken as being reference blocks. In other words, the blocks 81 through 84 and the blocks 86 through 89 around the predetermined block for attention 85 are taken as being the reference blocks.

It should be understood that the number of blocks that constitute the predetermined range 80 is not limited to being three blocks by three blocks as described above; it may be varied as appropriate.

1. The Same Correction is Performed for the Entire Region Where Clipped Whites or Crushed Shadows Has Occurred (1-1) As the first correction processing, the correction unit 33b corrects a partial region within the block for attention by employing image data that has been acquired for a single reference block. In concrete terms, the correction unit 33b corrects all of the image data with which clipped whites or crushed shadows has occurred by employing image data that has been acquired for a single reference block. At this time, the area of the reference block is the same as that of the block for attention. This processing (1-1) may be executed by employing, for example, one of the following versions (i) through (iv) described below.

(i) The correction unit 33b replaces the image data having clipped whites or crushed shadows within the block for attention with the image data that has been acquired for the single reference block that, among the reference blocks that are positioned around the block for attention, is in the position closest to the region where clipped whites or crushed shadows has occurred. Even if a plurality of pixels where clipped whites or crushed shadows has occurred are present within the block for attention, still the image data for this plurality of pixels where clipped whites or crushed shadows has occurred is replaced with the same image data that has been acquired for the above described single reference block in the closest position. For example, on the basis of the image data corresponding to the pixels 86a through 86d included in the reference block 86 that is in the closest position to the pixels where crushed shadows has occurred (i.e. the pixels 85b and 85d) among the reference blocks 81 through 84 and 86 through 89 around the block for attention 85, the image data corresponding to the black crush pixel 85b and the image data corresponding to the black crush pixel 85d are replaced by the same data (for example the image data corresponding to the pixel 86c).

(ii) The correction unit 33b replaces the image data having clipped whites or crushed shadows within the block for attention with the same data by employing image data that has been acquired for a single reference block selected from the reference blocks for which, among the reference blocks positioned around the block for attention, specific image capture conditions (in this example, the fourth image capture conditions) are set. The specific image capture conditions are the image capture conditions set most for the same photographic subject element (for example, the mountain) as the photographic subject element (the mountain) with which clipped whites or crushed shadows has occurred. For example, among the reference blocks 81 through 84 and 86 through 89 around the block for attention 85, a single reference block, for example, the reference block 88, is selected from the reference blocks 83, 86, 88, and 89 assigned with the fourth image capture conditions for the mountain, and on the basis of the image data corresponding to the pixels 88a through 88d that are included in the reference block 88, the image data corresponding to the black crush pixel 85b and the image data corresponding to the black crush pixel 85d are replaced by the same data (for example the image data corresponding to the pixel 88b). As described above, it may be arranged for the correction unit 33b to replace the black crush pixel 85d with some of the pixels of the reference block.

(iii) It would also be acceptable to arrange for the correction unit 33b to select the pixel whose interval is the shortest from the pixel within the block for attention where clipped whites or crushed shadows has occurred, among the image data corresponding to the four pixels that have been acquired for the single reference block selected in (i) or (ii) described above. In concrete terms, the correction unit 33b replaces the black crush pixel 85b with the pixel 86a whose interval from the black crush pixel 85b is the shortest, among the interval between the black crush pixel 85b and the pixel 86a and the interval between the black crush pixel 85b and the pixel 86b. Here, with the black crush pixel 85b and the pixel 86a being taken as an example, the interval is the distance between the centers of the black crush pixel 85b and the pixel 86a. Moreover, it would also be acceptable for the interval to be the distance between the centroids of the black crush pixel 85b and the pixel 86a. Yet further, in a case in which two black crush pixels are consecutive (the black crush pixel 85*b* and the black crush pixel 86*a*), it would be acceptable for the interval to be the interval to the center of the clump of the two black crush pixels, or to its centroid. The same is the case for 86*a* etc. within the reference block. Moreover, it would also be acceptable to arrange for the correction unit 33*b* to replace the image data with which clipped whites or crushed shadows has occurred by employing image data corresponding to adjacent pixels. For example, if the reference block 86 has been selected, then the correction unit 33*b* may replace the image data corresponding to the black crush pixel 85*b* and the image data corresponding to the black crush pixel 85*d* with the same data (i.e. the image data corresponding to the pixel 86*a* of the reference block 86 or to the pixel 86*c* of the reference block 86).

(iv) It would also be acceptable to arrange for the correction unit 33*b* to replace the image data in the block for attention with which clipped whites or crushed shadows has occurred by employing image data generated on the basis of image data corresponding to the four pixels that have been acquired for the single reference block that has been selected in (i) or (ii) described above. If, for example, the reference block 88 has been selected, then the correction unit 33*b* may replace the image data corresponding to the black crush pixel 85*b* and the image data corresponding to the black crush pixel 85*d* with image data based upon a plurality of pixels within the reference black 88 (for example, with the average value of the image data corresponding to the pixels 88*a* through 88*d* included in the reference block 88).

It should be understood that, when calculating the average value of the image data, instead of performing simple averaging, it would also be acceptable to calculate a weighted average value in which weights are assigned according to the distance from the pixel where clipped whites or crushed shadows has occurred and perform replacement. For example, since the pixel 88*b* is closer to the black crush pixel 85*d* than is the pixel 88*d*, accordingly weightings are assigned so that the contribution ratio of the image data corresponding to the pixel 88*b* is made to be higher than the contribution ratio of the image data corresponding to the pixel 88*d*.

Furthermore, instead of calculating the average value of the image data corresponding to the pixels 88*a* through 88*d* included in the reference block 88, it would also be acceptable to arrange to calculate the median value of the image data corresponding to the pixels 88*a* through 88*d*, and to replace the image data corresponding to the black crush pixel 85*b* and the image data corresponding to the pixel 85*d* with this median value.

(1-2) As the first correction processing, the correction unit 33*b* replaces all of the image data in the block for attention with which clipped whites or crushed shadows has occurred by employing image data that has been acquired for a plurality of the reference blocks. Here, a plurality of candidate reference blocks for replacement of the black crush pixels (85*b*, 85*d*) are extracted. The pixels within one of these blocks are finally used for substitution. This processing (1-2) may be executed by employing, for example, one of the following versions (i) through (iv) described below.

(i) The correction unit 33*b* replaces the image data within the block for attention with which clipped whites or crushed shadows has occurred with the same data, by employing the image data that has been acquired for a plurality of reference blocks that, among the reference blocks that are positioned around the block for attention, are in the periphery of the region where clipped whites or crushed shadows has occurred. For example, replacement may be performed in the following manner, on the basis of the image data corresponding to the pixels 86*a* through 86*d* and 88*a* through 88*d* included in the two reference blocks 86 and 88 that are adjacent to the black crush (i.e. to the pixels 85*b* and 85*d*), among the reference blocks 81 through 84 and 86 through 89 surrounding the block for attention 85. For example, the image data corresponding to the black crush pixel 85*b* and the image data corresponding to the black crush pixel 85*d* may be replaced by the same data (for example, by the image data corresponding to the pixel 88*b*). At this time, the area of the black crush pixel 85*b* and the black crush pixel 85*d* that are replaced by the pixel 88*b* is smaller than the area of the reference block 88.

(ii) The correction unit 33*b* replaces the image data having clipped whites or crushed shadows within the block for attention with the same data by employing image data that has been acquired for a plurality of reference blocks selected from the reference blocks for which, among the reference blocks positioned around the block for attention, specific image capture conditions (in this example, the fourth image capture conditions) are set. The specific image capture conditions are the image capture conditions set most for the same photographic subject element (for example, the mountain) as the photographic subject element with which clipped whites or crushed shadows has occurred (i.e. the mountain). For example, among the reference blocks 81 through 84 and 86 through 89 around the block for attention 85, two reference blocks, for example the reference blocks 86 and 88, are selected from the reference blocks 83, 86, 88, and 89 in which the fourth image capture conditions are set for the mountain. Then, on the basis of the image data corresponding to the pixels 86*a* through 86*d* and 88*a* through 88*d* that are included in the reference blocks 86 and 88 respectively, the image data corresponding to the black crush pixel 85*b* and the image data corresponding to the black crush pixel 85*d* are replaced by the same data (for example the image data corresponding to the pixel 86*c*).

(iii) It would also be acceptable to arrange for the correction unit 33*b* to replace the image data with which clipped whites or crushes shadows has occurred by employing image data corresponding to pixels adjacent to the pixel within the block for attention with which clipped whites or crushed shadows has occurred, among the image data corresponding to the plurality of pixels acquired for the plurality of reference blocks selected in (i) or (ii) described above. For example, if the reference blocks 86 and 88 have been selected, then the correction unit 33*b* may replace the image data corresponding to the black crush pixel 85*b* and the image data corresponding to the black crush pixel 85*d* with the same data (i.e. with the image data corresponding to the pixel 86*a* or the pixel 86*c* of the reference block 86, or the image data corresponding to the pixel 86*c* or the pixel 88*a* of the reference block 88).

(iv) It would also be acceptable to arrange for the correction unit 33*b* to replace the image data in the block for attention with which clipped whites or crushed shadows has occurred by employing image data generated on the basis of the image data corresponding to a plurality of pixels that have been acquired for a plurality of reference blocks selected according to (i) or (ii) above. If, for example, the reference blocks 86 and 88 have been selected, then the correction unit 33*b* may replace the image data corresponding to the black crush pixel 85*b* and the image data corresponding to the black crush pixel 85*d* with the same data (i.e. with the average value of the image data corresponding to the pixels 86*a* through 86*d* included in the reference block 86 and the image data corresponding to the pixels 88a through 88d included in the reference block 88). At this time, the area of the pixels that are employed for replacement is larger than the area of the black crush pixels 85b and 85d.

It should be understood that, when calculating the average value of the image data, instead of performing simple averaging, it would also be acceptable to calculate a weighted average value in which weights are assigned according to the distance from the pixel where clipped whites or crush shadows has occurred and perform replacement. For example, since the pixel 86a is closer to the black crush pixel 85b than is the pixel 86b, accordingly weightings are assigned so that the contribution ratio of the image data corresponding to the pixel 86a is made to be higher than the contribution ratio of the image data corresponding to the pixel 86b.

Furthermore, instead of calculating the average value of the image data corresponding to the pixels 86a through 86d and the pixels 88a through 88d included in the reference blocks 86 and 88, it would also be acceptable to arrange to calculate the median value of the image data corresponding to the pixels 86a through 86d and the image data corresponding to the pixels 88a through 88d, and to replace the image data corresponding to the black crush pixels 85b and 85d with the median value.

2. A Plurality of Corrections Are Made for the Entire Region Where Clipped Whites or Crushed Shadows Has Occurred (2-1) As the first correction processing, the correction unit 33b replaces all of the image data in the block for attention for which clipped whites or crushed shadows has occurred by employing the image data acquired for a single reference block. This processing (2-1) may be executed by employing, for example, one of the following versions (i) through (iii) described below.

(i) The correction unit 33b replaces a plurality of image data items within the block for attention for which clipped whites or crushed shadows has occurred with respectively different data by employing the image data corresponding to pixels adjacent to the pixels with which clipped whites or crushed shadows has occurred in the reference blocks that are positioned around the block for attention. For example, replacement may be performed in the following manner, on the basis of the image data corresponding to the pixels 86a through 86d included in the reference block 86 that is adjacent to the black crush (i.e. the pixels 85b and 85d), among the reference blocks 81 through 84 and 86 through 89 surrounding the block for attention 85. For example, the image data corresponding to the black crush pixel 85b may be replaced by the image data for the pixel 86a of the adjacent reference block 86, and the image data corresponding to the black crush pixel 85d may be replaced by the image data for the pixel 86c of the adjacent reference block 86.

(ii) The correction unit 33b replaces a plurality of image data items within the block for attention with which clipped whites or crushed shadows has occurred with respectively different data by employing image data that has been acquired for a single reference block selected from the reference blocks for which, among the reference blocks positioned around the block for attention, specific image capture conditions (in this example, the fourth image capture conditions) are set. The specific image capture conditions are the image capture conditions set most for the same photographic subject element (for example, the mountain) as the photographic subject element (the mountain) with which clipped whites or crushed shadows has occurred. For example, a single reference block, for example the reference block 86, is selected from the reference blocks 83, 86, 88, and 89 in which the fourth image capture conditions are set for the mountain, among the reference blocks 81 through 84 and 86 through 89 around the block for attention 85. Then, replacement may be performed in the following manner, by employing image data corresponding to the pixels 86a through 86d included in the reference block 86. For example, the image data corresponding to the black crush pixel 85b may be replaced by the image data for the pixel 86b of the reference block 86, and the image data corresponding to the black crush pixel 85d may be replaced by the image data for the pixel 86d of the reference block 86.

(iii) It would also be acceptable to arrange for the correction unit 33b to perform replacement by employing image data that has been generated on the basis of image data corresponding to four pixels acquired for a single reference block selected in (i) or (ii) described above. If, for example, the reference block 86 has been selected, then the correction unit 33b may replace the image data corresponding to the black crush pixel 85b of the block for attention with the average value of the image data corresponding to the pixels 86a and 86b included in the reference block 86. Moreover, the image data corresponding to the black crush pixel 85d within the block for attention may be replaced by the average value of the image data corresponding to the pixels 86c and 86d included in the reference block 86.

It should be understood that, when calculating the average value of the image data, instead of performing simple averaging, it would also be acceptable to calculate a weighted average value in which weights are assigned according to the distance from the pixel where clipped whites or crushed black has occurred and perform replacement. For example, since the image data corresponding to the pixel 86a is closer to the image data corresponding to the black crush pixel 85b than is the image data corresponding to the pixel 86b, accordingly weightings are assigned so that the contribution ratio of the image data corresponding to the pixel 86a is made to be higher than the contribution ratio of the image data corresponding to the pixel 86b.

(2-2) As the first correction processing, the correction unit 33b replaces all of the image data in the block for attention with which clipped whites or crushed shadows has occurred by employing image data acquired for a plurality of reference blocks. This processing (2-2) may be executed by employing, for example, one of the following versions (i) through (iii) described below.

(i) The correction unit 33b replaces a plurality of image data items within the block for attention for which clipped whites or crushed shadows has occurred with respectively different data by employing image data acquired for a plurality of reference blocks that, among the reference blocks that are positioned around the block for attention, are in the periphery of the region where clipped whites or crushed shadows has occurred. For example, replacement may be performed in the following manner, on the basis of the image data corresponding to the pixels 86a through 86d and the pixels 88a through 88d respectively included in the reference blocks 86 and 88 that are adjacent to the black crush (i.e. the pixels 85b and 85d), among the reference blocks 81 through 84 and 86 through 89 surrounding the block for attention 85. For example, the image data corresponding to the black crush pixel 85b may be replaced by the image data for the pixel 86a of the adjacent reference block 86, and the image data corresponding to the black crush pixel 85d may be replaced by the image data for the pixel 88b of the adjacent reference block 88.

(ii) The correction unit 33b replaces a plurality of image data items within the block for attention with which clipped whites or crushed shadows has occurred with respectively different data by employing image data that has been acquired for a plurality of reference blocks selected from the reference blocks for which, among the reference blocks positioned around the block for attention, specific image capture conditions (in this example, the fourth image capture conditions) are set. The specific image capture conditions are the image capture conditions set most for the same photographic subject element (for example, the mountain) as the photographic subject element (the mountain) with which clipped whites or crushed shadows has occurred. For example, two reference blocks, for example the reference blocks 86 and 88, are selected from the reference blocks 83, 86, 88, and 89 in which the fourth image capture conditions are set for the mountain, among the reference blocks 81 through 84 and 86 through 89 around the block for attention 85, and then replacement may be performed in the following manner, on the basis of image data corresponding to the pixels 86a through 86d and 88a through 88d included in the reference blocks 86 and 88. For example, the image data corresponding to the black crush pixel 85b may be replaced by the image data for the pixel 86a of the reference block 86, and the image data corresponding to the black crush pixel 85d may be replaced by the image data for the pixel 88b of the reference block 88.

(iii) It would also be acceptable to arrange for the correction unit 33b to perform replacement by employing image data that has been generated on the basis of image data corresponding to a plurality of pixels acquired for a plurality of reference blocks selected in (i) or (ii) described above. If, for example, the reference blocks 86 and 88 are selected, then the correction unit 33b may replace the image data corresponding to the black crush pixel 85b and the black crush pixel 85d of the block for attention in the following manner. That is, the image data corresponding to the black crush pixel 85b is replaced with the average value of the image data corresponding to the pixels 86a through 86d included in the reference block 86. Moreover, the image data corresponding to the black crush pixel 85d is replaced with the average value of the image data corresponding to the pixels 88a through 88d included in the reference block 88.

It should be understood that, when calculating the average value of the image data, instead of performing simple averaging, it would also be acceptable to calculate a weighted average value in which weights are assigned according to the distance from the pixel where clipped whites or crushed shadows has occurred and perform replacement. For example, since the image data corresponding to the pixel 86a is closer to the image data corresponding to the black crush pixel 85b than is the image data corresponding to the pixel 86b, accordingly weightings are assigned so that the contribution ratio of the image data corresponding to the pixel 86a is made to be higher than the contribution ratio of the image data corresponding to the pixel 86b.

Furthermore, instead of calculating the average values of the image data corresponding to the pixels 86a through 86d and of the image data corresponding to the pixels 88a through 88d included in the reference blocks 86 and 88, respectively, it would also be acceptable to arrange to calculate the median values of the image data corresponding to the pixels 86a through 86d and of the image data corresponding to the pixels 88a through 88d, and to replace the image data corresponding to the black crush pixels 85b and 85d with these median values.

In the explanation given above, the first correction processing according to various different modes has been described. It may, for example, be determined by the control unit 34 according to which of these modes the first correction processing is to be performed, on the basis of the states of setting by the operation members 36 (including the operation menu settings).

It should be understood that it would also be acceptable to arrange to determine which version of the first correction processing should be performed by the control unit 34, according to the scene imaging mode that is set for the camera 1, and/or according to the type of photographic subject element that has been detected.

The Second Correction Processing

Before performing the image processing, the focus detection processing, the photographic subject detection processing (for detecting the elements of the photographic subject), and the processing for setting the image capture conditions, the correction unit 33b of the image processing unit 33 may further perform the following second correction processing, according to requirements. It should be understood that the correction unit 33b performs the second correction processing after having replaced the pixels where clipped whites or crushed shadows has occurred, as described above.

Moreover it should be understood that, for the image data at the position of the black crush pixel 85b (or 85d) that has been replaced with some other pixel, the second correction processing described below may be performed, assuming that the image data has been obtained under the image capture conditions according to which image capture at the replacement pixel (for example 86a) was performed. Furthermore, if the black crush pixel 85b was replaced by employing pixels of a plurality of blocks whose image capture conditions were different, then it will be acceptable for the image capture conditions to have values between the image capture conditions of the various blocks (i.e. average values or median values thereof). For example, when correcting the black crush pixel 85d with the pixel 86c for which the image capture was performed at ISO sensitivity 100 and with the pixel 88b for which the image capture was performed at ISO sensitivity 1600, then it will be acceptable to treat the data of this pixel as obtained at an ISO sensitivity of 800, which is between ISO sensitivity 100 and ISO sensitivity 1600.

1. When Performing Image Processing

In a case in which image processing performed upon the image data acquired by applying different image capture conditions for the various subdivided regions is predetermined image processing, the correction unit 33b of the image processing unit 33 performs the second correction processing upon the image data positioned at a boundary portion between the regions as pre-processing before the image processing. The predetermined image processing is processing for calculating the image data positioned at a position for attention in the image, that is taken as a processing subject, by referring to the image data at a plurality of reference positions around the position for attention. The predetermined may include, for example, pixel defect correction processing, color interpolation processing, contour enhancement processing, noise reduction processing, and so on.

The second correction processing is performed in order to alleviate discontinuity arising in the image after image processing, originating in the fact that the image capture conditions for the various subdivided regions are different.

In general, if the position for attention is positioned at a boundary portion between the subdivided regions, at a plurality of the reference positions around the position for attention, both of image data to which image capture conditions have been applied that are the same as the image data at the position for attention, and image data to which image capture conditions have been applied that are different from those of the image data at the position for attention, may be present. This embodiment is based on the consideration that it is more preferable to calculate the image data at the position for attention by referring to the image data at the reference positions after having performed the second correction processing thereupon so as to suppress disparities between the image data due to discrepancies in the image capture conditions, rather than calculating the image data at the position for attention by referring to the image data at the reference positions at which the different image capture conditions have been applied just as it is. The second correction processing is performed in the following manner.

Figure 9A:
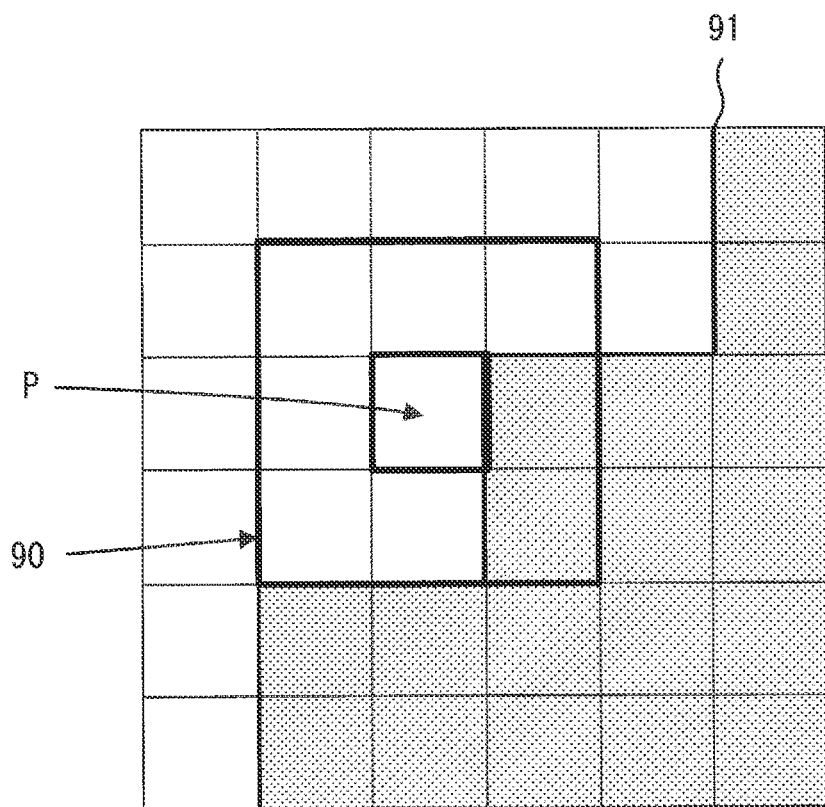
FIG. 9A is a figure showing an example of a region for attention in a live view image.
Figure 9B:
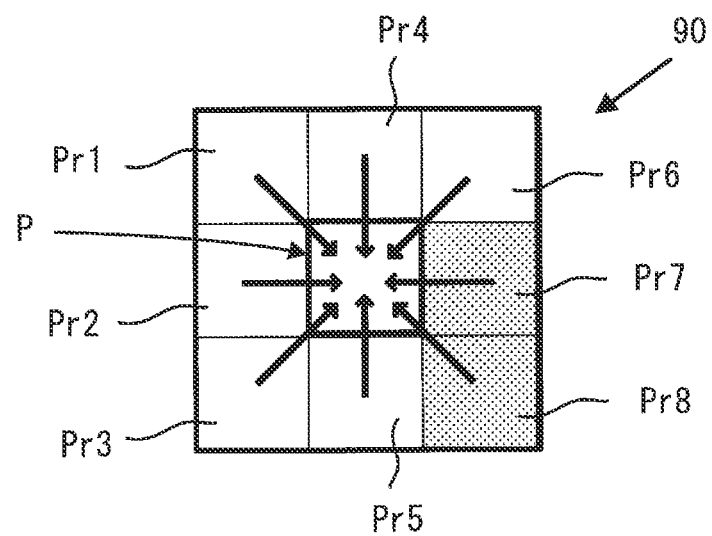
FIG. 9B is an enlarged view of a pixel for attention and reference pixels Pr.

FIG. 9A is a figure in which a region for attention 90 at the boundary portion between the first region 61 and the fourth region 64 in the live view image 60a shown in FIG. 7A is shown as enlarged. Image data from pixels on the imaging element 32a corresponding to the first region 61 for which the first image capture conditions have been set is shown as white, while image data from pixels on the imaging element 32a corresponding to the fourth region 64 for which the fourth image capture conditions have been set is shown with stippling. In FIG. 9A, the image data from the pixel for attention P is positioned in the first region 61 at the portion in the neighborhood of a boundary 91 between the first region 61 and the fourth region 64, in other words, at their boundary portion. The pixels (in this example, eight pixels) around the pixel for attention P which are included in the region for attention 90 (in this example, 3×3 pixels) centered at the pixel for attention P will be taken as being reference pixels Pr. FIG. 9B is an enlarged view showing the pixel for attention P and reference pixels Pr1 through Pr8. The position of the pixel for attention P is the position for attention, and the positions of the reference pixels Pr1 through Pr8 that surround this pixel for attention P are the reference positions. The first image capture conditions are set for the reference pixels Pr1 through Pr6 and for the pixel for attention P which correspond to the first region 61, while the fourth image capture conditions are set for the reference pixels Pr7 and Pr8 which correspond to the fourth region 64.

It should be understood that, in the following explanation, the reference symbol Pr is applied to the reference pixels Pr1 through Pr8 when they are referred to generically.

Normally, the generation unit 33c of the image processing unit 33 performs image processing by referring to the image data for the reference pixels Pr just as it is, without performing the second correction processing. However, when the image capture conditions that are applied at the pixel for attention P (here supposed to be the first image capture conditions) and the image capture conditions that are applied at the reference pixels Pr around the pixel for attention P (here supposed to be the fourth image capture conditions) are different, then the correction unit 33b performs the second correction processing as illustrated in the following Example 1 through Example 3 upon the image data having the fourth image capture conditions, among the image data for the reference pixels Pr. And the generation unit 33c performs image processing for calculation of the image data for the pixel for attention P by referring to the image data for the reference pixels Pr after this second correction processing.

EXAMPLE 1

If, for example, only the ISO sensitivity is different between the first image capture conditions and the fourth image capture conditions, with the ISO sensitivity of the first image capture conditions being 100 while the ISO sensitivity of the fourth image capture conditions is 800, then, as the second correction processing, the correction unit 33b of the image processing unit 33 performs multiplication by 100/800 upon the image data for the reference pixels Pr7 and Pr8 having the fourth image conditions among the image data for the reference pixels Pr. Due to this, the disparity between the image data due to discrepancy in the image capture conditions is reduced.

It should be understood that, if the amount of light incident upon the pixel for attention P and the amounts of light incident upon the reference pixels Pr are the same, then the disparity in their image data becomes low; but, if, for instance, the amount of light incident upon the pixel for attention P and the amounts of light incident upon the reference pixels Pr are fundamentally different, then in some cases the disparity in their image data does not become low. The same holds for the other examples described hereinafter.

EXAMPLE 2

If, for example, only the shutter speed is different between the first image capture conditions and the fourth image capture conditions, with the shutter speed of the first image capture conditions being $1/1000$ second while the shutter speed of the fourth image capture conditions is $1/100$ second, then, as the second correction processing, the correction unit 33b of the image processing unit 33 performs multiplication by $(1/1000)/(1/100)=1/10$ upon the image data for the reference pixels Pr7 and Pr8 having the fourth image conditions among the image data for the reference pixels Pr. Due to this, the disparity between the image data due to discrepancy in the image capture conditions is reduced.

EXAMPLE 3

If, for example, only the frame rate is different between the first image capture conditions and the fourth image capture conditions (the charge accumulation time being the same), with the frame rate of the first image capture conditions being 30 fps while the frame rate of the fourth image capture conditions is 60 fps, then, as the second correction processing, for the image data that was acquired under the fourth image capture conditions (at 60 fps) among the image data for the reference pixels Pr, the correction unit 33b of the image processing unit 33 employs image data of a frame image whose acquisition start timing is close to that of a frame image that was acquired under the first image capture conditions (at 30 fps). Due to this, the disparity between the image data due to discrepancy in the image capture conditions is reduced.

It should be understood that it would also be acceptable to perform the second correction processing to calculate the image data of a frame image whose acquisition start timing is close to that of a frame image that was acquired under the first image capture conditions (at 30 fps) through interpolation based on a plurality of previous and subsequent frame images that were acquired under the fourth image capture conditions (at 60 fps).

On the other hand, if the image capture conditions that were applied to the pixel for attention P (i.e. the first image capture conditions) and the image capture conditions that were applied to all of the reference pixels Pr around the periphery of the pixel for attention P (i.e. the fourth image capture conditions) are the same, then the correction unit 33*b* of the image processing unit 33 does not perform the second correction processing upon the image data for the reference pixels Pr. In other words, the generation unit 33*c* performs image processing by calculating the image data for the pixel for attention P with reference to the image data for the reference pixels Pr just as it is without alteration.

It should be understood that, as described above, the image capture conditions are still considered as being the same, even there is some minor difference between them.

Examples of Image Processing

Examples of image processing accompanied by the second correction processing will now be described.

(1) Pixel Defect Correction Processing

In this embodiment, pixel defect correction processing is one type of image processing that is performed upon image capture. Generally, with an imaging element 32*a* which is a solid imaging element, sometimes pixel defects occur during the manufacturing process or after manufacture, so that image data having anomalous levels may be outputted. Accordingly, the generation unit 33*c* of the image processing unit 33 corrects the image data outputted from the pixels in which pixel defects have occurred so as to make image data at the pixel positions where the pixel defects occurred not to stand out.

An example of the pixel defect correction processing will now be explained. The generation unit 33*c* of the image processing unit 33, for example, takes a pixel in an image of one frame at the position of a pixel defect that is recorded in advance in a non-volatile memory not shown in the figures as being the pixel for attention P (i.e. as the pixel that is the subject of processing), and takes the pixels (in this example, eight pixels) around the pixel for attention P that are included in a region for attention 90 (for example 3×3 pixels) centered upon this pixel for attention P as being reference pixels Pr.

The generation unit 33*c* of the image processing unit 33 calculates the maximum value and the minimum value of the image data for the reference pixels Pr and performs max-min filter processing, in order, when the image data outputted from the pixel for attention P is beyond this maximum value or below this minimum value, to replace the image data outputted from the pixel for attention P with the above described maximum value or minimum value. This type of processing is performed for all of the pixel defects whose position information is recorded in the non-volatile memory not shown in the figures.

In this embodiment, if a pixel to which the fourth image capture conditions different from the first image capture conditions applied to the pixel for attention P is included in the reference pixels Pr described above, then the correction unit 33*b* of the image processing unit 33 performs the second correction processing upon the image data to which the fourth image capture conditions have been applied. And subsequently the generation unit 33*c* of the image processing unit 33 performs the max-min filter processing described above.

(2) Color Interpolation Processing

In this embodiment, color interpolation processing is one of the types of image processing performed upon image capture. As illustrated in the example of FIG. 3, in the image capture chip 111 of the imaging element 100, green color pixels Gb and Gr, blue color pixels B, and red color pixels R are arranged in a Bayer array. Since, at the position of each pixel, image data is not available for the color components different from the color component of the color filter F that is installed for that pixel, accordingly the generation unit 33*c* of the image processing unit 33 performs color interpolation processing upon the image data in order to generate those color components that are not available, by referring to the image data for the peripheral pixel positions.

Figures 10A, 10B, 10C:
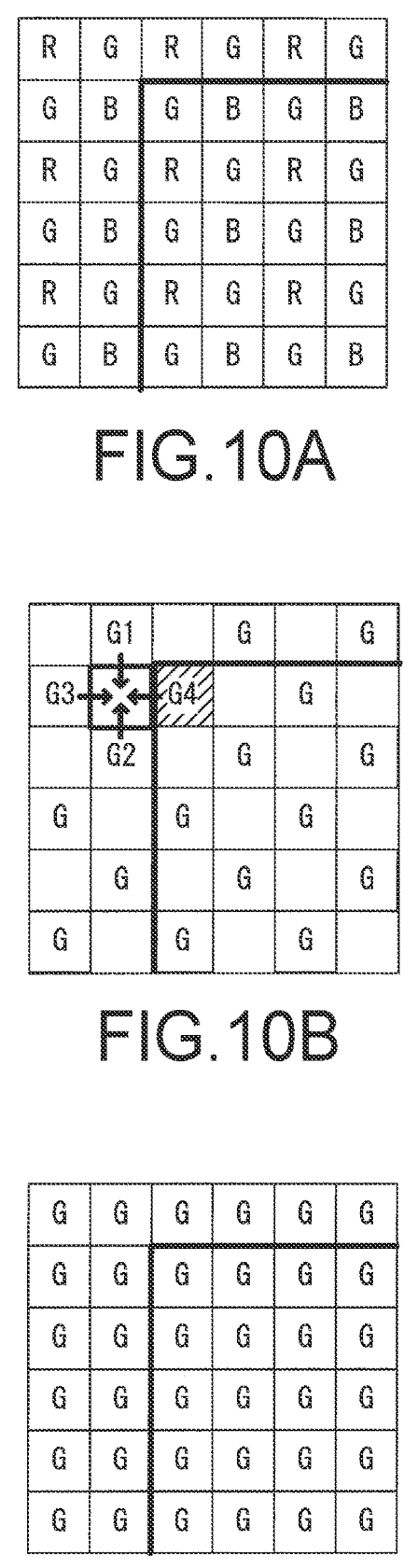

An example of color interpolation processing will now be explained. FIG. 10A is a figure showing an example of an arrangement of image data outputted from the imaging element 32*a*. R, G, and B color components are arranged according to the Bayer array rule corresponding to the respective positions of the pixels.

The G Color Interpolation

First, the general process of interpolation of the G color will be explained. In performing the G color interpolation, the generation unit 33*c* of the image processing unit 33 takes the positions of the R color component and of the B color component sequentially as the position for attention, and generates image data for the G color component at the position for attention by referring to the four items of image data for the G color component at the four reference positions surrounding the position for attention. When, for example, generating image data for the G color component at the position for attention indicated by the thick frame in FIG. 10B (which, counting from the upper left position, is at the second row and the second column; subsequently it will be supposed that the position for attention is designated by counting from the upper left position in the same manner), reference is made to the four image data items G1 through G4 for the G color component positioned in the neighborhood of the position for attention (which is at the second row and the second column). The generation unit 33*c* of the image processing unit 33 sets, for example, (aG1+bG2+cG3+dG4)/4 as being the image data of the G color component at the position for attention (which is at the second row and the second column). Here, it should be understood that a through d are weighting coefficients that are provided according to the distances between the reference positions and the position for attention, and/or according to the structure of the image.

Next, the G color interpolation in this embodiment will be explained. It will be supposed that, in FIGS. 10A through 10C, the first image capture conditions are applied to the region to the left of and above the thick line, while the fourth image capture conditions are applied to the region to the right of and below the thick line. And it should be understood that, in FIGS. 10A through 10C, the first image capture conditions and the fourth image capture conditions are different. Moreover, in FIG. 10B the image data G1 through G4 of the G color component are the reference positions for performing image processing upon the position for attention (at the second row and the second column). In FIG. 10B, the first image capture conditions are applied to the position for attention (at the second row and the second column). And, among the reference positions, the first image capture conditions are applied to the image data G1 through G3. Moreover, among the reference positions, the fourth image capture conditions are applied to the image data G4. Due to this, the correction unit 33*b* of the image processing unit 33 performs the second correction processing upon the image data G4. Subsequently, the generation unit 33*c* of the image processing unit 33 calculates the image data for the G color component at the position for attention (at the second row and the second column).

As shown in FIG. 10C, the generation unit 33*c* of the image processing unit 33 is able to obtain the image data for the G color component at each pixel position by generating image data for the G color component at each of the positions of the B color component and the R color component in FIG. 10A.

The R Color Interpolation

Figure 11A:
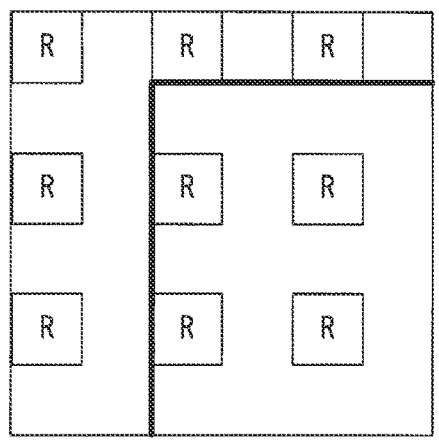
FIG. 11A is a figure showing image data for the R color component extracted from FIG. 10A.

FIG. 11A is a figure showing the image data for the R color component extracted from FIG. 10A. The generation unit 33c of the image processing unit 33 calculates the image data for the color difference component Cr shown in FIG. 11B on the basis of the image data for the G color component shown in FIG. 10C and the image data for the R color component shown in FIG. 11A.

First, the general process of interpolation of the color difference component Cr will be explained. When generating image data for the color difference component Cr at the position for attention (at the second row and the second column) indicated by the thick frame in FIG. 11B, the generation unit 33c of the image processing unit 33 refers to the four items of image data Cr1 through Cr4 for the color difference component at the four positions in the neighborhood of the position for attention (at the second row and the second column). The generation unit 33c of the image processing unit 33 sets, for example, (eCr1+fCr2+cCr3+hCr4)/4 as being the image data of the color difference component Cr at the position for attention (at the second row and the second column). Here, it should be understood that e through h are weighting coefficients that are provided according to the distances between the reference positions and the position for attention, and/or according to the structure of the image.

Figure 11B:
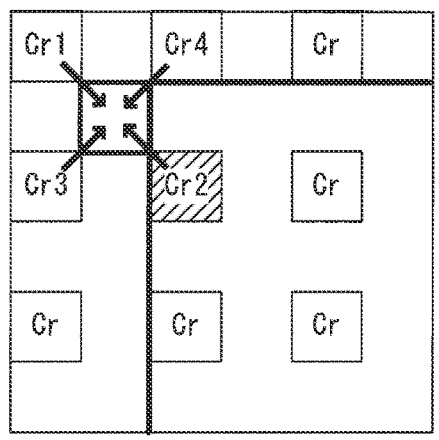
FIG. 11B is a figure for explanation of interpolation of the color difference component Cr.
Figure 11C:
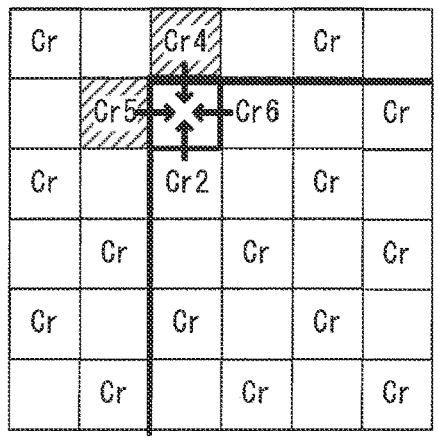
FIG. 11C is a figure for explanation of interpolation of the image data for the color difference component Cr.

In a similar manner, when generating the image data for the color difference component Cr at, for example, the position for attention indicated by the thick frame in FIG. 11C (at the second row and the third column), the generation unit 33c of the image processing unit 33 refers to the four image data items Cr2 and Cr4 through Cr6 for the color difference components at the four positions in the neighborhood of the position for attention (at the second row and the third column). The generation unit 33c of the image processing unit 33 sets, for example, (qCr2+rCr4+sCr5+tCr6)/4 as being the image data of the color difference component Cr at the position for attention (at the second row and the third column). It should be understood that q through t are weighting coefficients that are provided according to the distances between the reference positions and the position for attention, and/or according to the structure of the image. The image data for the color difference component Cr at each of the pixel positions is generated in this manner.

Next, the interpolation of the color difference component Cr in this embodiment will be explained. It will be supposed that, in FIGS. 11A through 11C, for example, the first image capture conditions are applied to the region to the left of and above the thick line, while the fourth image capture conditions are applied to the region to the right of and below the thick line. And it should be understood that, in FIGS. 11A through 11C, the first image capture conditions and the fourth image capture conditions are different. In FIG. 11B, the position indicated by the thick frame (at the second row and the second column) is the position for attention for the color difference component Cr. Moreover, the image data Cr1 through Cr4 for the color difference component Cr in FIG. 11B are the reference positions for performing image processing upon the pixel at the position for attention (at the second row and the second column). In FIG. 11B, the first image capture conditions are applied to the position for attention (at the second row and the second column). And, among the reference positions, the first image capture conditions are applied to the image data Cr1, Cr3, and Cr4.

Moreover, among the reference positions, the fourth image capture conditions are applied to the image data Cr2. Due to this, the correction unit 33b of the image processing unit 33 performs the second correction processing upon the image data Cr2. Subsequently, the generation unit 33c of the image processing unit 33 calculates the image data for the color difference component Cr at the position for attention (at the second row and the second column).

Furthermore, in FIG. 11C, the position indicated by the thick frame (at the second row and the third column) is the position for attention for the color difference component Cr. Moreover, the image data Cr2, Cr4, Cr5, and Cr6 of the color difference component Cr in FIG. 11C are the reference positions for performing image processing upon the pixel at the position for attention (at the second row and the third column). In FIG. 11C, the fourth image capture conditions are applied to the position for attention (at the second row and the third column). And, among the reference positions, the first image capture conditions are applied to the image data Cr4 and Cr5. Moreover, among the reference positions, the fourth image capture conditions are applied to the image data Cr2 and Cr6. Due to this, the correction unit 33b of the image processing unit 33 performs the second correction processing upon each of the image data Cr4 and Cr5. And subsequently the generation unit 33c of the image processing unit 33 calculates the image data for the color difference component Cr at the position for attention (at the second row and the third column).

Having obtained the image data for the color difference component Cr at each of the pixel positions, the generation unit 33c of the image processing unit 33 is able to obtain the image data for the R color component at each of the pixel positions by adding the image data for the G color component shown in FIG. 10C corresponding to each pixel position.

The B Color Interpolation

Figure 12A:
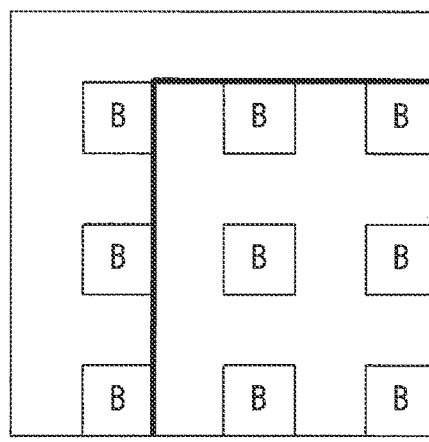
FIG. 12A is a figure showing image data for the B color component extracted from FIG. 10A.

FIG. 12A is a figure showing image data for the B color component extracted from FIG. 10A. The generation unit 33c of the image processing unit 33 calculates the image data for the color difference component Cb shown in FIG. 12B on the basis of the image data for the G color component shown in FIG. 10C and the image data for the B color component shown in FIG. 12A.

First, the general process of interpolation of the color difference component Cb will be explained. When generating the image data for the color difference component Cb at, for example, the position for attention indicated by the thick frame in FIG. 12B (at the third row and the third column), the generation unit 33c of the image processing unit 33 refers to the four image data items Cb1 through Cb4 for the color difference component at the four positions in the neighborhood of the position for attention (at the third row and the third column). The generation unit 33c of the image processing unit 33 sets, for example, (uCb1+vCb2+wCb3+xCb4)/4 as being the image data of the color difference component Cb at the position for attention (at the third row and the third column). It should be understood that u through x are weighting coefficients that are provided according to the distances between the reference positions and the position for attention, and/or according to the structure of the image.

Figure 12B:
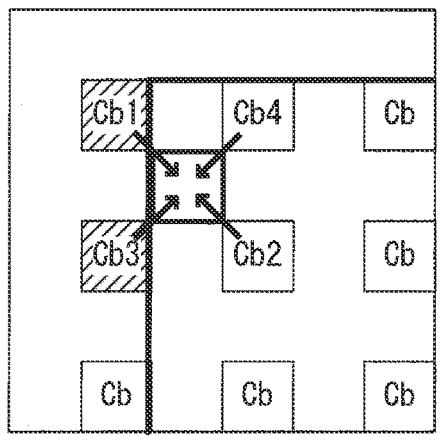
FIG. 12B is a figure for explanation of interpolation of the color difference component Cb.
Figure 12C:
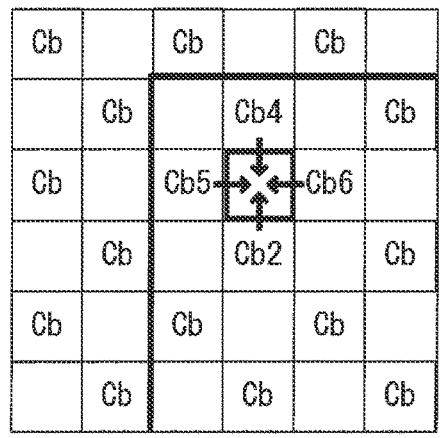
FIG. 12C is a figure for explanation of interpolation of the image data for the color difference component Cb.

In a similar manner, when for example generating the image data for the color difference component Cb at, for example, the position for attention indicated by the thick frame in FIG. 12C (at the third row and the fourth column), the generation unit 33c of the image processing unit 33 refers to the four image data items Cb2 and Cb4 through Cb6 for the color difference component at the four positions in the neighborhood of the position for attention (at the third row and the fourth column). The generation unit 33c of the image processing unit 33 sets, for example, (yCb2+zCb4+αCb5+βCb6)/4 as being the image data for the color difference component Cb at the position for attention (at the third row and the fourth column). It should be understood that y, z, α, and β are weighting coefficients that are provided according to the distances between the reference positions and the position for attention, and/or according to the structure of the image. The image data for the color difference component Cb at each of the pixel positions is generated in this manner.

Next, the interpolation of color difference component Cb of this embodiment will be explained. It will be supposed that, in FIGS. 12A through 12C, for example, the first image capture conditions are applied to the region to the left of and above the thick line, while the fourth image capture conditions are applied to the region to the right of and below the thick line. And it should be understood that, in FIGS. 12A through 12C, the first image capture conditions and the fourth image capture conditions are different. In FIG. 12B, the position indicated by the thick frame (at the third row and the third column) is the position for attention for the color difference component Cb. Moreover, the image data Cb1 through Cb4 of the color difference component in FIG. 12B are the reference positions for performing image processing upon the pixel at the position for attention (at the third row and the third column). In FIG. 12B, the fourth image capture conditions are applied to the position for attention (at the third row and the third column). And, among the reference positions, the first image capture conditions are applied to the image data items Cb1 and Cb3. Moreover, among the reference positions, the fourth image capture conditions are applied to the image data items Cb2 and Cb4. Due to this, the correction unit 33b of the image processing unit 33 performs the second correction processing upon the image data items Cb1 and Cb3. Subsequently, the generation unit 33c of the image processing unit 33 calculates the image data for the color difference component Cb at the position for attention (at the third row and the third column).

Furthermore, in FIG. 12C, the position indicated by the thick frame (at the third row and the fourth column) is the position for attention for the color difference component Cb. Moreover, the image data Cb2 and Cb4 through Cb6 of the color difference component Cb in FIG. 12C are the reference positions for performing image processing upon the pixel at the position for attention (at the third row and the fourth column). In FIG. 12C, the fourth image capture conditions are applied to the position for attention (at the third row and the fourth column). And the fourth image capture conditions are applied to the image data Cb2 and Cb4 through Cb6 at all of the reference positions. Due to this, the image data for the color difference component Cb at the position for attention (at the third row and the fourth column) is calculated by referring to the image data Cb2 and Cb4 through Cb6 at the reference positions, upon which the second correction processing is not performed by the correction unit 33b of the image processing unit 33.

Having obtained the image data for the color difference component Cb at each of the pixel positions, the generation unit 33c of the image processing unit 33 is able to obtain the image data for the B color component at each of the pixel positions by adding the image data for the G color component shown in FIG. 10C corresponding to each pixel position.

It should be understood that although, in the "G color interpolation" described above, for example, the four image data items G1 through G4 that are positioned in the neighborhood of the position for attention are referred to when generating image data for the G color component at the position for attention indicated by the thick frame in FIG. 10B (at the second row and the second column), it would also be acceptable, according to the structure of the image, to vary the number of image data items of the G color component that are referred to. For example, if the image in the vicinity of the position for attention is similar in the vertical direction (for example, if it has a pattern of vertical stripes), then the interpolation processing may be performed by employing only the image data above and below the position for attention (in FIG. 10B, G1 and G2). Furthermore, for example, if the image in the vicinity of the position for attention is similar in the horizontal direction (for example, if it has a pattern of horizontal stripes), then the interpolation processing may be performed by employing only the image data to the left and the right of the position for attention (in FIG. 10B, G3 and G4). In these cases, sometimes the image data item G4 upon which correction is performed by the correction unit 33b is used, and sometimes not. As described above, by the correction unit 33b performing the first correction processing, the second correction processing, and the interpolation processing, even if black crush pixels such as 85b and 85d are present, it is still possible to generate an image in which crushed shadows is corrected.

(3) Contour Enhancement Processing

An example of contour enhancement processing will now be explained. For example, in an image for one frame, the generation unit 33c of the image processing unit 33 may perform per se known linear filter calculation by employing a kernel of a predetermined size that is centered upon the pixel for attention P (i.e. upon the pixel that is the subject for processing). If the size of the kernel of a sharpening filter, which is one example of a linear filter, is N×N pixels, then the position of the pixel for attention P is the position for attention, and the positions of the ($N^2$-1) reference pixels Pr surrounding the pixel for attention are the reference positions.

It should be understood that it would also be acceptable for the size of the kernel to be N×M pixels.

The generation unit 33c of the image processing unit 33 performs filter processing for replacing the image data at the pixel for attention P with the result of linear filter calculation, for example, by shifting the pixel for attention along a horizontal line from left to right, starting from the horizontal line at the top portion of the frame image to the horizontal line at its bottom portion.

In this embodiment, when a pixel to which the fourth image capture conditions have been applied which are different from the first image capture conditions that have been applied to the pixel for attention P is included in the reference pixels Pr, the correction unit 33b of the image processing unit 33 performs the second correction processing upon the image data to which the fourth image capture conditions have been applied. Subsequently, the generation unit 33c of the image processing unit 33 performs the linear filter processing described above.

(4) Noise Reduction Processing

An example of noise reduction processing will now be explained. For example, in an image for one frame, the generation unit 33c of the image processing unit 33 may perform per se known linear filter calculation by employing a kernel of a predetermined size that is centered upon the pixel for attention P (i.e. upon the pixel that is the subject for processing). If the size of the kernel of a smoothing filter, which is one example of a linear filter, is N×N pixels, then the position of the pixel for attention P is the position for attention, and the positions of the ($N^2$-1) reference pixels Pr surrounding the pixel for attention are the reference positions.

It should be understood that it would also be acceptable for the size of the kernel to be N×M pixels.

The generation unit 33c of the image processing unit 33 performs filter processing for replacing the image data at the pixel for attention P with the result of linear filter calculation, for example from the horizontal line at the top portion of the frame image to the horizontal line at its bottom portion, while shifting the pixel for attention along a horizontal line from left to right.

In this embodiment, when a pixel to which the fourth image capture conditions have been applied which are different from the first image capture conditions that have been applied to the pixel for attention P is included in the reference pixels Pr described above, the correction unit 33b of the image processing unit 33 performs the second correction processing upon the image data to which the fourth image capture conditions have been applied. And, subsequently, the generation unit 33c of the image processing unit 33 performs the linear filter processing described above.

2. When Performing Focus Detection Processing

In the example described above, as the first correction processing, the pixels with which clipped whites or crush shadows had occurred were replaced by the image data for pixels of other blocks. If only focus adjustment is the objective, then it will be acceptable to replace the signal from a pixel for focus detection with which clipped whites or crushed shadows has occurred with the signal from some other pixel for focus detection. The method for replacement with another signal for focus detection is the same as the method for replacement of the image data of a pixel where clipped whites or crushed shadows has occurred, and accordingly description of the details will here be omitted. In the case of focus adjustment on the basis of image contrast, the image data that has been replaced in the first correction processing described above may be used.

The lens movement control unit 34d of the control unit 34 performs focus detection processing by employing the signal data (i.e. the image data) corresponding to a predetermined position upon the imaging screen (the point of focusing). If different image capture conditions are set for different subdivided regions, and if the point of focusing for A/F operation is positioned at a boundary portion between subdivided regions, then, as pre-processing before the focus detection processing, the lens movement control unit 34d of the control unit 34 performs the second correction processing upon the signal data for focus detection of at least one of those regions.

The second correction processing is performed in order to suppress deterioration of the accuracy of the focus detection processing originating in differences in image capture conditions between the different regions into which the imaging screen is subdivided by the setting unit 34b. For example, if the signal data for focus detection at the point of focusing where the amount of image deviation (i.e. of the phase difference) in the image is detected is positioned at a boundary portion between subdivided regions, then signal data for which the image capture conditions are mutually different may be mixed together in the signal data for focus detection. This embodiment is configured based on the consideration that it is more preferable to perform detection of the amount of image deviation (i.e. of the phase difference) by employing signal data upon which the second correction processing has been performed in order to suppress disparity in the signal data due to discrepancy in the image capture conditions, rather than performing detection of the amount of image deviation (i.e. of the phase difference) by employing signal data to which different image capture conditions have been applied just as it is without modification. The second correction processing is performed as described below.

An Example of Focus Detection Processing

Focus detection processing accompanied by the second correction processing will now be illustrated by an example. In the A/F operation of this embodiment, for example, the focus is set to a photographic subject corresponding to a point of focusing selected by the user from among a plurality of points of focusing upon the imaging screen. The lens movement control unit 34d (i.e. a generation unit) of the control unit 34 calculates the amount of defocusing of the image capture optical system 31 by detecting the amount of image deviation (i.e. the phase difference) of a plurality of images of the photographic subject formed by light fluxes that have passed through different pupil regions of the image capture optical system 31. And the lens movement control unit 34d of the control unit 34 adjusts the focal point of the image capture optical system 31 by shifting a focusing lens of the image capture optical system 31 to a position at which the defocusing amount becomes zero (i.e. is within a tolerance value), in other words to a focusing position.

Figure 13:
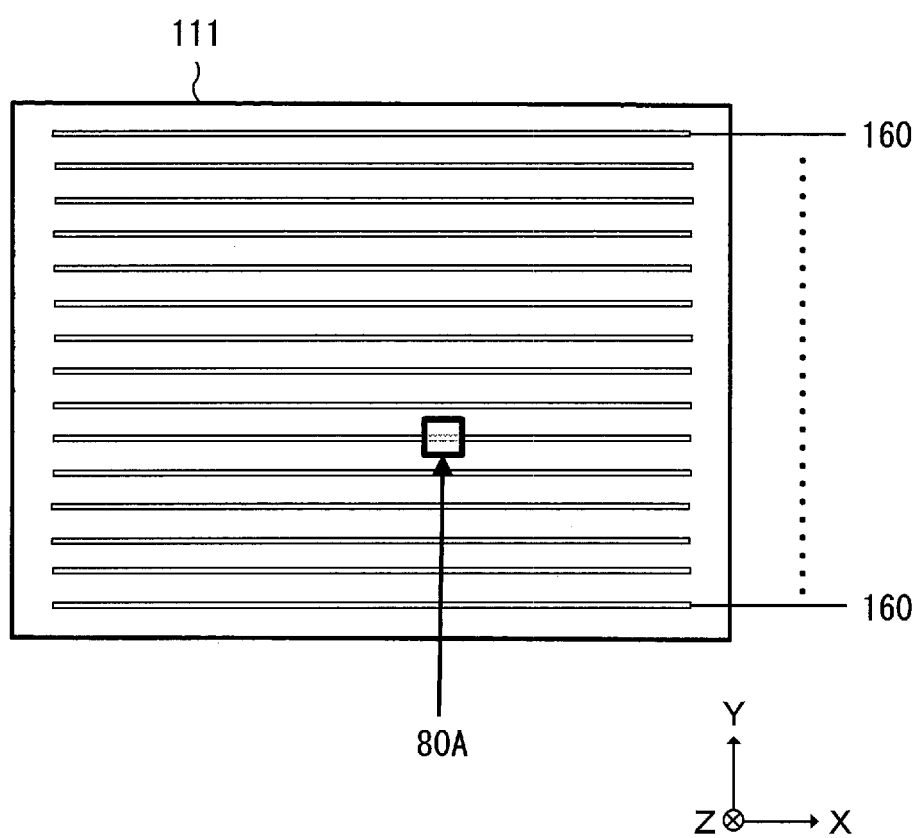
FIG. 13 is a figure showing an example of positions of pixels for focus detection on an imaging surface.

FIG. 13 is a figure showing an example of positions of pixels for focus detection upon the imaging surface of the imaging element 32a. In this embodiment, pixels for focus detection are provided as arranged discretely in lines along the X axis direction of the image capture chip 111 (i.e. along its horizontal direction). In the example of FIG. 13, fifteen focus detection pixel lines 160 are provided at predetermined intervals. Each of the pixels for focus detection making up each of these focus detection pixel lines outputs a photoelectrically converted signal for focus detection. Normal pixels for image capture are provided at pixel positions upon the image capture chip 111 other than the focus detection pixel lines 160. These pixels for image capture output photoelectrically converted signals for live view images and for recording.

Figure 14:
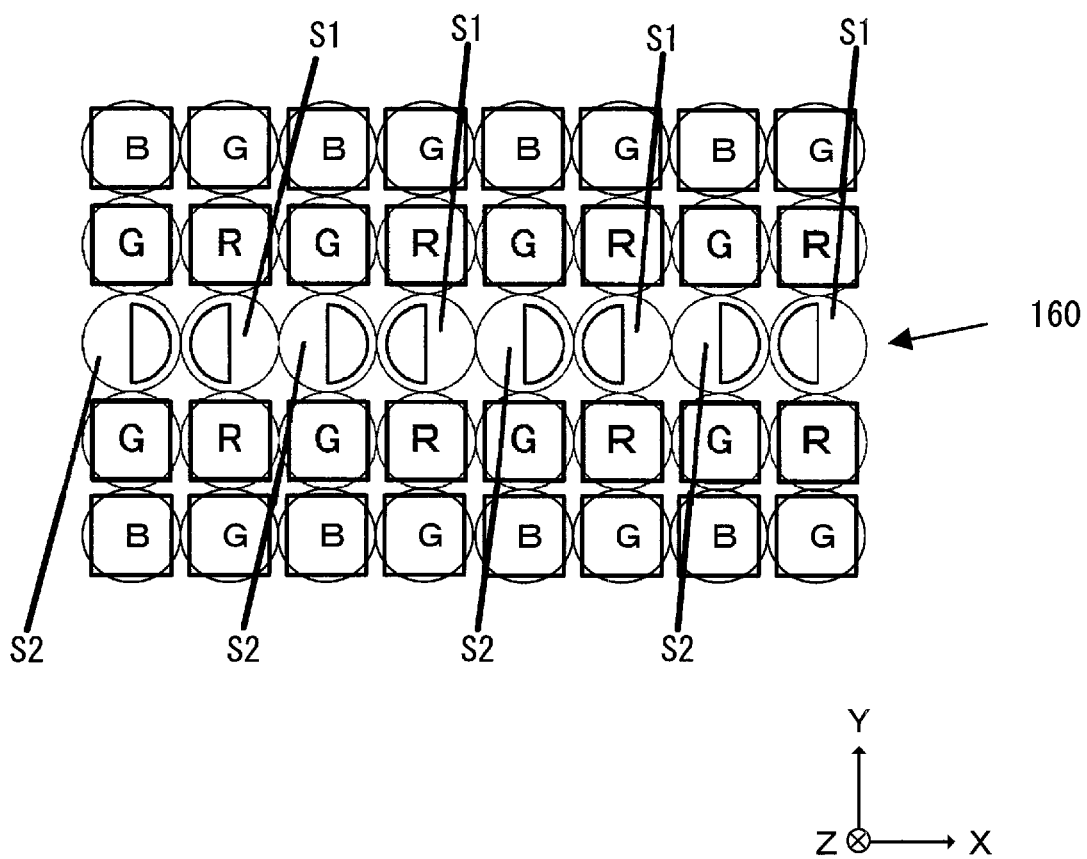
FIG. 14 is a figure in which a partial region of a focus detection pixel line is shown as enlarged.

FIG. 14 is a figure in which a partial region of one of the focus detection pixel lines 160 corresponding to a point of focusing 80A shown in FIG. 13 is illustrated as enlarged. In FIG. 14, examples are shown of red color pixels R, green color pixels G (Gb and Gr), blue color pixels B, pixels for focus detection S1, and pixels for focus detection S2. The red color pixels R, the green color pixels G (Gb and Gr), and the blue color pixels B are arranged according to the Bayer array rule described above.

The square shaped regions shown by way of example for the red color pixels R, for the green color pixels G (Gb and Gr), and for the blue color pixels B represent the light reception regions of these pixels for image capture. Each of these pixels for image capture receives a light flux that has passed through the exit pupil of the image capture optical system 31 (refer to FIG. 1). In detail, each of the red color pixels R, the green color pixels G (Gb and Gr), and the blue color pixels B has a square shaped mask opening portion, and light that has passed through these mask opening portions reaches the light reception portions of these pixels for image capture.

It should be understood that the shapes of the light reception regions (i.e. of the mask opening portions) of the red color pixels R, the green color pixels G (Gb and Gr), and the blue color pixels B are not limited to being rectangular; it would also be acceptable, for example, for them to be circular.

The semicircular shaped regions of the pixels for focus detection S1 and of the focus detection pixels S2 shown by way of example represent the light reception regions of these pixels for focus detection. In more detail, each of the pixels S1 for focus detection has a semicircular shaped mask opening portion on the left side of the pixel position in FIG. 14, and light passing through this mask opening portion reaches the light reception portion of the pixel for focus detection S1. On the other hand, each of the pixels S2 for focus detection has a semicircular shaped mask opening portion on the right side of the pixel position in FIG. 14, and light passing through this mask opening portion reaches the light reception portion of the pixel for focus detection S2. In this manner, each of the pixels for focus detection S1 and the pixels for focus detection S2 receives one of a pair of light fluxes that have passed through different regions of the exit pupil of the image capture optical system 31 (refer to FIG. 1).

It should be understood that the positions of the focus detection pixel lines 160 upon the image capture chip 111 are not to be considered as being limited to the positions shown by way of example in FIG. 13. Moreover, the number of the focus detection pixel lines 160 also is not to be considered as being limited to the number shown by way of example in FIG. 13. Yet further, the shapes of the mask opening portions of the pixels for focus detection S1 and of the pixels for focus detection S2 are not to be considered as being limited to being semicircular; it would also be acceptable, for example, to arrange for these mask opening portions to be formed in rectangular shapes by dividing the rectangular shaped light reception regions (i.e. the mask opening portions), such as of the R pixels for image capture, of the green color pixels for image capture (Gb and Gr), and of the blue color pixels for image capture B, in the horizontal direction.

It would also be acceptable for the focus detection pixel lines 160 upon the image capture chip 111 to be provided by the pixels for focus detection being arranged linearly along the Y axis direction of the image capture chip 111 (i.e. along its vertical direction). An imaging element in which pixels for image capture and pixels for focus detection are arranged in a two dimensional array as shown in FIG. 14 is per se known, and accordingly detailed illustration and explanation of these pixels will be omitted.

It should be understood that, in the example of FIG. 14, a so called 1PD structure has been explained that has a structure in which each of the pixels for focus detection S1 and S2 receives one of a pair of light fluxes for focus detection. Instead of this, it would also be acceptable to adopt a so called 2PD structure in which each of the pixels for focus detection S1 and S2 receives both of a pair of light fluxes for focus detection. By adopting a 2PD structure, it becomes possible also to employ the photoelectrically converted signals obtained by the pixels for focus detection as photoelectrically converted signals for recording.

On the basis of the photoelectrically converted signals for focus detection outputted from the pixels for focus detection S1 and from the pixels for focus detection S2, the lens movement control unit 34d of the control unit 34 detects the amount of image deviation (i.e. of the phase difference) between the pair of images by the pair of light fluxes that have passed through different regions of the image capture optical system 31 (refer to FIG. 1). And the defocusing amount is calculated on the basis of this amount of image deviation (i.e. on the basis of the phase difference). Since this type of defocusing amount calculation according to the split pupil phase difference method is per se known in the camera field, accordingly detailed explanation thereof will be omitted.

Figure 15:
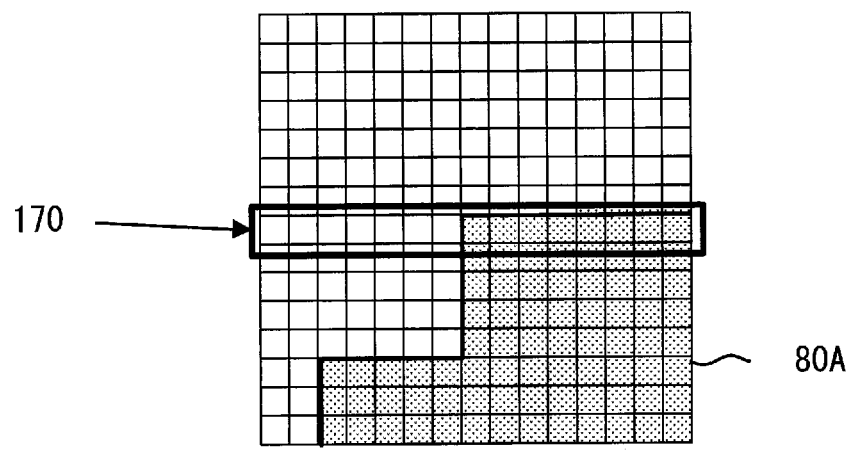
FIG. 15 is a figure in which a point of focusing is shown as enlarged.

It will be supposed that, for example, the point of focusing 80A (refer to FIG. 13) is selected by the user at a position in the live view image 60a shown by way of example in FIG. 7A that corresponds to the region for attention 90 at the boundary portion between the first region 61 and the fourth region 64. FIG. 15 is a figure in which the point of focusing 80A is shown as enlarged. The pixels shown as white are ones for which the first image capture conditions are set, while the pixels shown with stippling are ones for which the fourth image capture conditions are set. The positions in FIG. 15 surrounded by the frame 170 correspond to a focus detection pixel line 160 (refer to FIG. 13).

Normally, the lens movement control unit 34d of the control unit 34 performs focus detection processing by employing the signal data from the pixels for focus detection shown by the frame 170 just as it is, without performing the second correction processing. However, if signal data to which the first image capture conditions have been applied and signal data to which the fourth image capture conditions have been applied are mixed together in the signal data enclosed by the frame 170, then, as described in the following Example 1 through Example 3, the lens movement control unit 34d of the control unit 34 performs the second correction processing upon the signal data that, among the signal data enclosed by the frame 170, has been captured under the fourth image capture conditions. And the lens movement control unit 34d of the control unit 34 performs focus detection processing by employing the signal data after the second correction processing.

EXAMPLE 1

For example, if the first image capture conditions and the fourth image capture conditions only differ by ISO sensitivity, with the ISO sensitivity of the first image capture conditions being 100 while the ISO sensitivity of the fourth image capture conditions is 800, then the lens movement control unit 34d of the control unit 34 may perform the second correction processing by multiplying the signal data that was obtained under the fourth image capture conditions by 100/800. In this manner, disparity between the signal data due to discrepancy in the image capture conditions is reduced.

It should be understood that, when the amount of light incident upon the pixels to which the first image capture conditions have been applied and the amount of light incident upon the pixels to which the fourth image capture conditions have been applied are the same, then the disparity in the signal data becomes small. If, for instance, the amount of light incident upon the pixels to which the first image capture conditions have been applied and the amount of light incident upon the pixels to which the fourth image capture conditions have been applied are radically different, the disparity in the signal data may not be reduced. The same applies to the examples that will be described hereinafter.

EXAMPLE 2

For example, if the first image capture conditions and the fourth image capture conditions only differ by shutter speed, with the shutter speed of the first image capture conditions being $\frac{1}{1000}$ second while the shutter speed of the fourth image capture conditions is 1/100 second, then the lens movement control unit 34d of the control unit 34 may perform the second correction processing by multiplying the signal data that was obtained under the fourth image capture conditions by 1/1000/1/100=1/10. By doing this, disparity between the signal data due to discrepancy in the image capture conditions is reduced.

EXAMPLE 3

For example, if the first image capture conditions and the fourth image capture conditions only differ by frame rate (the charge accumulation time being the same), with the frame rate of the first image capture conditions being 30 fps while the frame rate of the fourth image capture conditions is 60 fps, then, for the signal data that was obtained under the fourth image conditions (i.e. at 60 fps), the lens movement control unit 34d of the control unit 34 may perform the second correction processing by employing signal data of a frame image whose acquisition start timing is close to that of a frame image that was acquired under the first image capture conditions (at 30 fps). In this manner, disparity between the signal data due to discrepancy in the image capture conditions is reduced.

It should be noted that it would also be acceptable to perform interpolation calculation as the second correction processing to calculate the signal data of a frame image whose acquisition start timing is close to that of a frame image acquired under the first image capture conditions (i.e. at 30 fps), on the basis of a plurality of previous and subsequent frame images acquired under the fourth image capture conditions (i.e. at 60 fps).

On the other hand, if the image capture conditions applied to all of the signal data enclosed by the frame 170 are the same, then the lens movement control unit 34d of the control unit 34 does not perform the second correction processing described above. In other words, the lens movement control unit 34d of the control unit 34 performs the focus detection processing by employing the signal data from the pixels for focus detection shown by the frame 170 just as it is without alteration.

It should be understood that, as described above, even if there are some moderate differences in the image capture conditions, still they are regarded as being the same image capture conditions.

Furthermore while, in the example described above, an example was explained in which the second correction processing was performed by referring to the first image capture conditions upon the signal data that, among the signal data, was acquired under the fourth image capture conditions, it would also be acceptable to perform the second correction processing based on the fourth image capture conditions upon the signal data that, among the signal data, was acquired under the first image capture conditions.

Whether the lens movement control unit 34d of the control unit 34 performs the second correction processing upon the signal data that was obtained under the first image capture conditions, or performs the second correction processing upon the signal data that was obtained under the fourth image capture conditions, may, for example, be determined on the basis of the ISO sensitivity. If the ISO sensitivity is different between the first image capture conditions and the fourth image capture conditions, then it is desirable to perform the second correction processing upon the signal data that was obtained under the image capture conditions whose ISO sensitivity was the lower, provided that the signal data that was obtained under the image capture conditions whose ISO sensitivity was the higher is not saturated. In other words, if the ISO sensitivity is different between the first image capture conditions and the fourth image capture conditions, then it is preferable to perform the second correction processing upon the signal data that is the darker, in order to reduce its difference from the signal data that is the brighter.

Yet further, it would also be acceptable to arrange to reduce the difference between the two sets of signal data after the second correction processing, by performing the second correction processing upon, among the signal data, both the signal data that was obtained under the first image capture conditions and also the signal data that was obtained under the fourth image conditions.

In the explanation given above an example of focus detection processing employing the split pupil phase difference method was described, but it would also be possible to perform focus detection processing in a similar manner in the case of a contrast detection method in which the focusing lens of the image capture optical system 31 is shifted to its focusing position on the basis of the amount of contrast in the image of the photographic subject.

If such a contrast detection method is employed, then, while shifting the focusing lens of the image capture optical system 31, the control unit 34 performs per se known calculation of a focus evaluation value for each position of the focusing lens on the basis of signal data outputted from the pixels for image capture of the imaging element 32a corresponding to the point of focusing. And the position of the focusing lens that maximizes this focus evaluation value is obtained as being the focusing position.

Normally, the control unit 34 performs calculation of the focus evaluation value by employing the signal data outputted from the pixels for image capture corresponding to the point of focusing just as it is, without performing second correction processing. However, if signal data to which the first image capture conditions have been applied and signal data to which the fourth image capture conditions have been applied are mixed together in the signal data corresponding to the point of focusing, then, among the signal data corresponding to the point of focusing, the control unit 34 performs the second control processing described above upon the signal data that was obtained under the fourth image capture conditions. And the control unit 34 then performs calculation of the focus evaluation value by employing the signal data after the second correction processing. In this manner, by performing the first correction processing, the second correction processing, and the interpolation processing, the correction unit 33b is able to perform correction of black crush and focus adjustment even if black crush pixels such as 85b and 85d are present. As a result, it is possible to adjust the focal point by shifting the lens, even if black crush pixels such as 85b and 85d occur.

In the example described above, the focus adjustment processing is performed after the second correction processing has been performed, but it would also be acceptable to perform the focus adjustment based on the image data obtained by the first correction processing, without performing the second correction processing.

3. When Performing Photographic Subject Detection Processing

Figure 16A:
FIG. 16A is a figure showing an example of a template image representing a object to be detected.
Figure 16B:
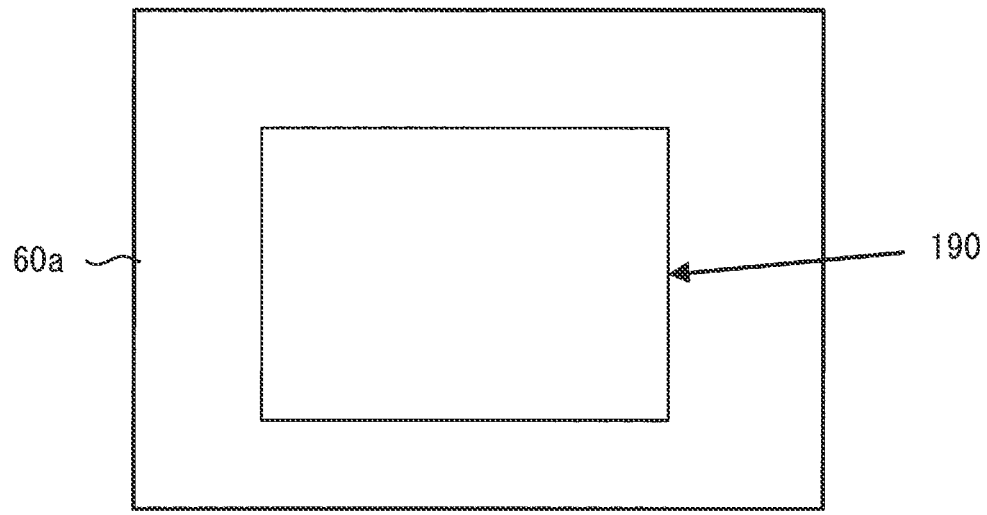
FIG. 16B is a figure showing examples of a live view image and a search range.

FIG. 16A is a figure showing an example of a template image in which an object to be detected is represented, and FIG. 16B is a figure showing an example of a live view image 60a and a search range 190. The object detection unit 34a of the control unit 34 detects an object (for example the bag 63a, which is one of the elements of the photographic subject of FIG. 5) from the live view image. It would be acceptable to arrange for the object detection unit 34a of the control unit 34 to set the range for detection of the object as being the entire range of the live view image 60a; but it would also be acceptable, in order to reduce the burden of the detection processing, to arrange for only a part of the live view image 60a to be set as the search range 190.

If different image capture conditions are set for the various subdivided regions, and the search range 190 includes a boundary between the subdivided regions, then, as pre-processing for the photographic subject detection processing, the object detection unit 34a of the control unit 34 performs the second correction processing upon the image data of at least one of the regions within the search range 190.

The second correction processing is performed in order to suppress deterioration of the accuracy of the processing for detecting the photographic subject element, originating in differences between the image capture conditions for the different regions into which the setting unit 34b has subdivided the imaging screen. In general, when a boundary between the subdivided regions is included in the search range 190 that is employed for detection of the photographic subject element, image data to which different image capture conditions have been applied may be mixed together in the image data in the search range 190. This embodiment is configured based on the consideration that it is preferable to perform detection of the photographic subject element by employing image data upon which the second correction processing has been performed in order to suppress disparity in the image data due to discrepancy in the image capture conditions, rather than performing detection of the photographic subject element by employing the image data to which different image capture conditions have been applied just as it is without alteration. The second correction processing is performed in the following manner.

For the image of the photographic subject shown by way of example in FIG. 5, the case will be explained of detecting the bag 63a which is being held by the person 61a. The object detection unit 34a of the control unit 34 sets the search range 190 to the vicinity of a region that includes the person 61a. It should be understood that it would also be acceptable to set the region 61 that includes the person 61a as the search range.

If the search range 190 is not divided into sections by two regions for which the image capture conditions are different, then the object detection unit 34a of the control unit 34 performs the photographic subject detection processing by employing the image data for the search range 190 just as it is, without performing the second correction processing. However, if image data to which the first image capture conditions have been applied and image data to which the fourth image capture conditions have been applied are mixed in the image data for the search range 190, then the object detection unit 34a of the control unit 34 performs the second correction processing upon the image data that, among the image data in the search range 190, was obtained under the fourth image capture conditions as described above in Example 1 through Example 3 for the case of performing the focus detection processing. And then the object detection unit 34a of the control unit 34 performs the photographic subject detection processing by employing the image data after this second correction processing.

It should be understood that, as described above, even if there are some moderate differences in the image capture conditions, still they are regarded as being the same image capture conditions.

Furthermore, in the example described above, explanation was made in which the second correction processing was performed referring to the first image capture conditions upon the image data that, among the image data, was obtained under the fourth image capture conditions; but it would also be acceptable to perform the second correction processing referring to the fourth image capture conditions upon the image data that, among the image data, was obtained under the first image capture conditions.

It would also be acceptable to apply the second correction processing performed upon the image data in the search range 190 described above to a search range that is employed for detection of a specific photographic subject such as the face of a person, or to a region that is employed for determination of the image capture scene.

Moreover, the second correction processing performed upon the image data in the search range 190 described above is not to be considered as being limited to a search range that is employed in a pattern matching method that uses a template image, but could also be applied in a similar manner to a search range that is employed when detecting the amount of a characteristic based upon the color of the image or upon its edge or the like.

Furthermore it would also be acceptable to apply the method described above to processing for tracking a moving object in which per se known template matching processing is performed by using image data for a plurality frames whose time points of acquisition are different so as to find in a frame image that has been acquired subsequently a region that resembles a tracked object in a frame image that has been previously acquired. In this case, if image data to which the first image capture conditions have been applied and image data to which the fourth image capture conditions have been applied are mixed together in the search range set for the frame image that is acquired later, then the control unit 34 performs the second correction processing upon the image data that, among the image data in the search range, was obtained under the fourth image capture conditions as described above in Example 1 through Example 3. And the control unit 34 performs tracking processing by employing the image data after this second correction processing.

Even further, the same holds for a case in which per se known movement vector detection is performed by employing image data for a plurality frames whose time points of acquisition are different. If image data to which the first image capture conditions have been applied and image data to which the fourth image capture conditions have been applied are mixed together in the image data for the detection region that is employed for detection of the movement vector, then the control unit 34 performs the second correction processing upon the image data that, among the image data in the detection region that is employed for detection of the movement vector, was obtained under the fourth image capture conditions as described above in Example 1 through Example 3. And the control unit 34 detects the movement vector by employing the image data after this second correction processing. In this manner, by performing the first correction processing, the second correction processing, and the interpolation processing, the correction unit 33b is able to perform correction of such black crush and to perform the detection of the photographic subject described above even if black crush pixels such as 85b and 85d occur. As a result, it is possible to perform detection of the photographic subject, even if black crush pixels such as 85*b* and 85*d* occur.

In the example described above, the photographic subject detection processing was performed after having performed the second correction processing, but it would also be acceptable to perform photographic subject detection based on the image data that was obtained by the first correction processing, without performing the second correction processing.

4. When Setting the Image Capture Conditions

When the setting unit 34*b* of the control unit 34 performs photometry and determination of the exposure conditions again after the imaging screen is subdivided into regions and different image capture conditions are set for the different regions, the second correction processing is performed as pre-processing for setting exposure conditions for the image data of at least one of the regions.

This second correction processing is performed in order to suppress deterioration of the accuracy of processing for determination of the exposure conditions, originating in discrepancy in the image capture conditions between the regions of the imaging screen subdivided by the setting unit 34*b*. For example, if a boundary between the subdivided regions is included in a photometric range that is set for the central portion of the imaging screen, image data to which different image capture conditions have been applied may be mixed together in the image data for the photometric range. This embodiment is configured based on the consideration that it is more preferable to perform exposure calculation processing by employing image data that has been subjected to the second correction processing, in order to reduce disparity between the image data due to discrepancy in the image capture conditions, rather than performing exposure calculation processing by employing the image data to which different image capture conditions have been applied just as it is without alteration. The second correction processing is performed in the following manner.

If the photometric range is not divided up into sections by a plurality of regions whose image capture conditions are different, then the setting unit 34*b* of the control unit 34 performs the exposure calculation processing by employing the image data for the photometric range just as it is without alteration, without performing the second correction processing. However, if image data to which the first image capture conditions have been applied and image data to which the fourth image capture conditions have been applied are mixed together in the image data for the photometric range, then the setting unit 34*b* of the control unit 34 performs the second correction processing upon the image data for which, among the image data for the photometric range, the fourth image capture conditions were applied as described in Example 1 through Example 3 above for performing the focus detection processing or the photographic subject detection processing. And the setting unit 34*b* of the control unit 34 performs exposure calculation processing by employing the image data after the second correction processing.

It should be understood that, as described above, even if there are some moderate differences in the image capture conditions, still they are regarded as being the same image capture conditions.

Moreover, in the example described above, explanation was made in which the second correction processing was performed by referring to the first image capture conditions upon the image data that, among the image data, was obtained under the fourth image capture conditions, but it would also be acceptable to perform the second correction processing by referring to the fourth image capture conditions upon the image data that, among the image data, was obtained under the first image capture conditions.

The application of this processing is not limited to the photometric range employed for performing the exposure calculation processing described above; the same would apply for the photometric (colorimetry) range employed when determining the white balance adjustment value, and/or for the photometric range employed when determining whether or not to cause a light source to emit auxiliary photographic light, and/or for the photometric range employed when determining the amount of auxiliary photographic light to be emitted by the light source mentioned above.

Furthermore, in a case in which the readout resolution of the photoelectrically converted signals is different between the various regions into which the imaging screen is subdivided, the above method may be applied in a similar manner to the regions that are employed for the determination of the image capture scene when determining the readout resolution for each region. By the correction unit 33*b* performing the first correction processing, the second correction processing, and the interpolation processing in this manner, even if black crush pixels such as the pixels 85*b* and 85*d* occur, still it is possible to perform setting of the photographic conditions while correcting for this black crush. As a result, it is possible to set the photographic conditions even if black crush pixels such as the pixels 85*b* and 85*d* occur.

In the example described above, the setting of the photographic conditions is performed after the second correction processing, but it would also be acceptable to perform setting of the photographic conditions based on the image data obtained by the first correction processing, without performing the second correction processing.

Explanation of the Flow Chart

Figure 17:
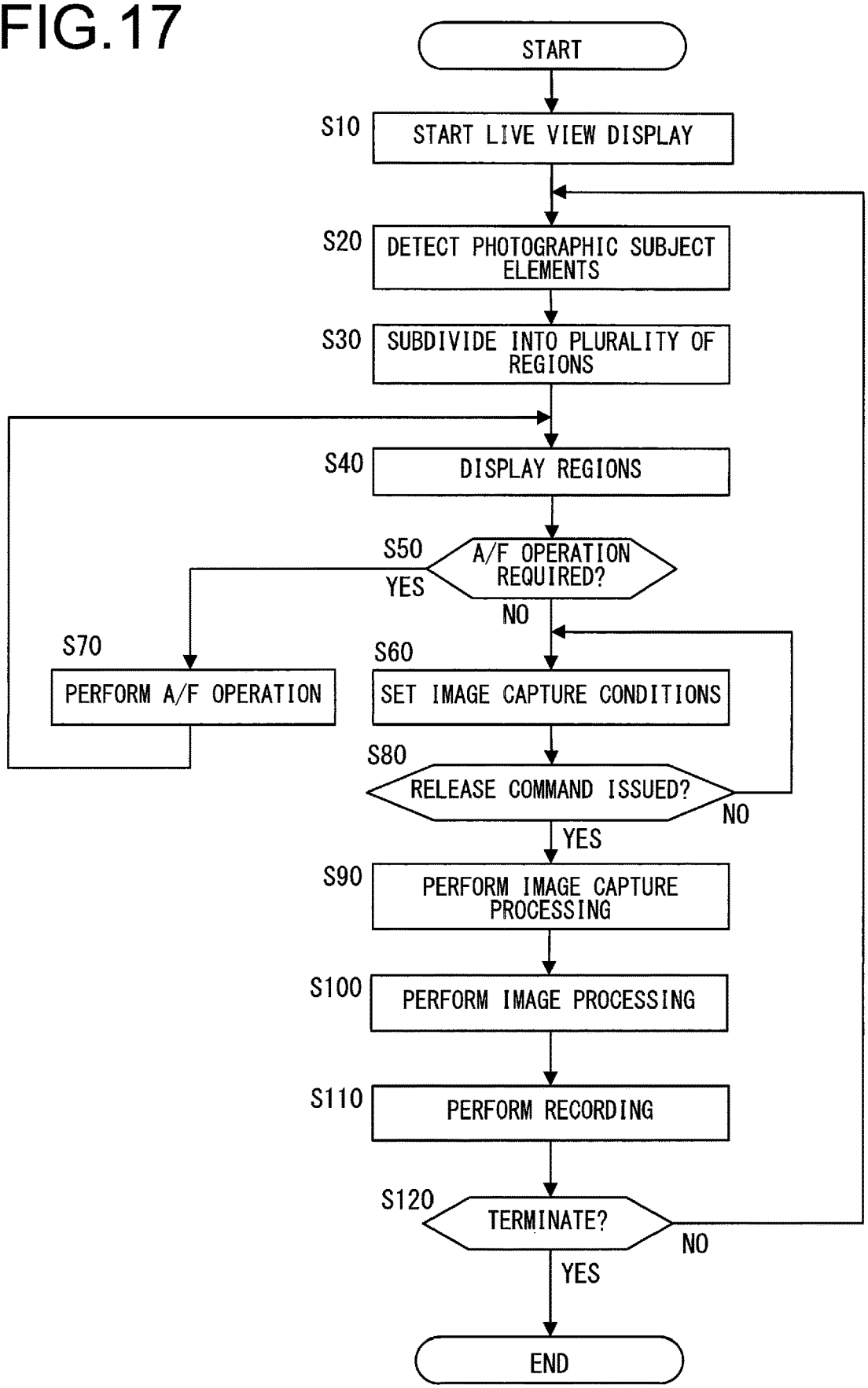
FIG. 17 is a flow chart for explanation of a processing flow for setting image capture conditions for various regions and performing image capture.

FIG. 17 is a flow chart for explanation of the flow of processing for setting image capture conditions for each region and performing image capture. When a main switch of the camera 1 is operated, the control unit 34 starts a program for execution of the processing shown in FIG. 17. In step S10, the control unit 34 starts live view display upon the display unit 35, and then the flow of control proceeds to step S20.

In concrete terms, the control unit 34 issues a command to the image capture unit 32 for the start of acquisition of a live view image, and live view images that are acquired are repeatedly displayed upon the display unit 35. As described above, at this time point, the same image capture conditions are set for the entire area of the image capture chip 111, in other words for the entire screen.

It should be understood that, if a setting is made for A/F operation to be performed during the live view display, then, by performing focus detection processing, the lens movement control unit 34*d* of the control unit 34 controls A/F operation so as to adjust the focus to a photographic subject element that corresponds to a predetermined focusing point. According to requirements, the lens movement control unit 34*d* may perform this focus detection processing after both the first correction processing described above and also the second correction processing described above have been performed, or after either the first correction processing described above or the second correction processing described above has been performed.

Moreover, if a setting is not made for A/F operation to be performed during the live view display, then the lens movement control unit 34d of the control unit 34 performs A/F operation subsequently, at the time point that a command for A/F operation is issued.

In step S20, the object detection unit 34a of the control unit 34 detects the elements of the photographic subject from the live view image, and then the flow of control proceeds to step S30. According to requirements, the object detection control unit 34a may perform this photographic subject detection processing after both the first correction processing described above and also the second correction processing described above have been performed, or after either the first correction processing described above or the second correction processing described above has been performed. Then in step S30 the setting unit 34b of the control unit 34 subdivides the screen of the live view image into regions that include the elements of the photographic subject, and then the flow of control proceeds to step S40.

In step S40, the control unit 34 performs display of these regions upon the display unit 35. As shown by way of example in FIG. 6, the control unit 34 displays as accentuated the region that, among the subdivided regions, is the subject for setting (i.e. for changing) its image capture conditions. Moreover, the control unit 34 displays the setting screen 70 for setting the image capture conditions upon the display unit 35, and then the flow of control proceeds to step S50.

It should be understood that, if the position at which another main photographic subject is displayed upon the display screen is selected by the user tapping upon it with his/her finger, then the control unit 34 changes over to this region including this new main photographic subject so that it becomes the new region which is to be the subject of setting (or of changing) the image capture conditions, and displays this new region as accentuated.

In step S50, the control unit 34 makes a determination as to whether or not A/F operation is required. For example, the control unit 34 reaches an affirmative determination in step S50 and the flow of control proceeds to step S70 if the focus adjustment state has changed due to the photographic subject having moved, or if the position of the point of focusing has been changed by user actuation, or if a command has been issued for A/F operation to be performed. But the control unit 34 reaches a negative determination in step S50 and the flow of control proceeds to step S60 if the focus adjustment state has not changed, and the position of the point of focusing has not been changed by user actuation, and moreover no command has been issued by user actuation for A/F operation to be performed.

In step S70 the control unit 34 performs A/F operation, and then the flow of control returns to step S40. According to requirements, the lens movement control unit 34d may perform the focus detection processing for A/F operation after both the first correction processing described above and also the second correction processing described above have been performed, or after either the first correction processing described above or the second correction processing described above has been performed. And, after the flow of control has returned to step S40, the control unit 34 repeats the processing similar to the processing described above on the basis of the live view image that is acquired after the A/F operation.

In step S60, in response to user actuation, the setting unit 34b of the control unit 34 sets image capture conditions for the region that is being displayed as accentuated, and then the flow of control proceeds to step S80. It should be understood that change of the display upon the display unit 35 corresponding to user actuation in step S60 and setting of the image capture conditions are as described above. According to requirements, the setting unit 34b of the control unit 34 may perform exposure calculation processing after both the first correction processing described above and also the second correction processing described above have been performed, or after either the first correction processing described above or the second correction processing described above has been performed.

In step S80, the control unit 34 determines whether or not an image capture command has been issued. If a shutter release button not shown in the figures among the operation members 36 has been actuated, or if a display icon for commanding image capture has been actuated, then the control unit 34 reaches an affirmative determination in step S80 and the flow of control proceeds to step S90. But if no image capture command has been issued, then the control unit 34 reaches a negative determination in step S80 and the flow of control returns to step S60.

In step S90, the control unit 34 performs predetermined image capture processing. That is, the image capture control unit 34c controls the imaging element 32a so as to capture an image under the image capture conditions that were set for each of the regions described above, and then the flow of control proceeds to step S100.

In step S100, the image capture control unit 34c of the control unit 34 issues a command to the image processing unit 33 so as to cause it to perform predetermined image processing upon the image data that was captured by the image capture processing described above, and then the flow of control proceeds to step S110. This image processing includes the pixel defect correction processing, the color interpolation processing, the contour enhancement processing, and/or the noise reduction processing described above.

It should be understood that, according to requirements, the correction unit 33b of the image processing unit 33 may perform the image processing upon the image data that is positioned at the boundary portions of regions after both the first correction processing described above and also the second correction processing described above have been performed, or after either the first correction processing described above or the second correction processing described above has been performed.

In step S110, the control unit 34 issues a command to the recording unit 37 and causes it to record the image data after the image processing upon a recording medium not shown in the figures, and then the flow of control proceeds to step S120.

In step S120, the control unit 34 determines whether or not actuation for termination has been performed. If termination actuation has been performed, then the control unit 34 reaches an affirmative determination in step S120 and the processing of FIG. 17 is terminated. But if termination actuation has not been performed, then the control unit 34 reaches a negative determination in step S120 and the flow of control returns to step S20. When the flow of control returns to step S20, the control unit 34 repeats the processing described above.

In the explanation given above the laminated type imaging element 100 was described as an example, but the imaging element (i.e. the image capture chip 111) is not necessarily to be configured of the laminated type, provided that it is of a type for which different image capture conditions can be set for each of a plurality of blocks.

According to the first embodiment as explained above, the following advantageous operational effects are obtained.

(1) The camera 1 that includes the image processing device comprises the image capture unit 32 having the first region 61 that captures an image under the first image capture conditions and the fourth region 64 that captures an image under the fourth image capture conditions that are different from the first image capture conditions, and the image processing unit 33 that generates an image of the photographic subject captured in the first region 61 by using image data for the photographic subject captured in the fourth region 64. Due to this, if for example inappropriate image data is generated in the image of the photographic subject captured in the first region 61 caused by the image capture conditions set for the first region 61, then it is possible to generate image data in an appropriate manner by employing the image of the photographic subject that has been captured in the fourth region 64 under its image capture conditions that are different from those for the first region 61. In concrete terms, it is possible to generate image data in which discontinuity in the image or a sense of strangeness due to discrepancy of the brightness, the contrast, the hue or the like of the image is suppressed between the hatched portions of the block 82, of the block 85, and of the block 87 and the stippled portions of the blocks 83, 86, 88, and 89 in FIG. 7B.

(2) The camera 1 that includes the image processing device comprises the image capture unit 32 having the first region 61 that captures an image under the first image capture conditions and the fourth region 64 that captures an image under the fourth image capture conditions that are different from the first image capture conditions, and the image processing unit 33 that generates image data for the photographic subject captured in the first region 61 by using image data for the photographic subject captured in the fourth region 64. Due to this, for example, if inappropriate image data is generated in the image of the photographic subject that is captured in the first region 61 caused by the image capture conditions set for the first region 61, then it is possible to generate image data in an appropriate manner by employing the image of the photographic subject that has been captured in the fourth region 64 under its image capture conditions that are different from those for the first region 61. In concrete terms, it is possible to generate image data in which discontinuity of the image or a sense of strangeness due to discrepancy in the brightness, contrast, hue or the like of the image is suppressed between the hatched portions of the block 82, the block 85, and the block 87 in FIG. 7B and the stippled portions of the blocks 83, 86, 88, and 89.

(3) The image processing unit 33 generates image data for the image of the photographic subject captured in the first region 61 by using the image data for the photographic subject captured in the fourth region 64. Due to this, for example, if inappropriate image data is generated in the image of the photographic subject that is captured in the first region 61 attributable to the image capture conditions that are set for the first region 61, then it is possible to generate image data in an appropriate manner by employing the image of the photographic subject that has been captured in the fourth region 64 under its image capture conditions that are different from those for the first region 61.

(4) The image processing unit 3 generates a part of the image data for the photographic subject captured in the first region 61 based on the image data for the photographic subject captured in the fourth region 64. Due to this, if inappropriate image data is generated in a part (the block for attention) of the image captured in the first region 61, then it is possible to generate image data in an appropriate manner by employing the image data (the reference blocks) for the image captured in the fourth region 64 whose image capture conditions are different from those for the first region 61.

(5) The image processing unit 33 generates a part of the image data for the photographic subject captured in the first region 61 based on the image data for the photographic subject captured in the fourth region 64. The part of the photographic subject captured in the first region 61 and at least a part of the photographic subject captured in the fourth region 64 are detected as being the same photographic subject. Due to this, if the same photographic subject, for example the mountain in FIG. 7A, is captured in the first region 61 and also in the fourth region 64, then it is possible to replace the image data for the mountain that has been obtained by image capture in the first region 61 with the image data for the mountain that has been captured in the fourth region 64. Accordingly, it is possible to generate the image data in an appropriate manner.

(6) The area of the fourth region 64 is larger than the area of the first region 61. Since, due to this, the image data for the photographic subject captured in the first region 61 is generated on the basis of the image data for the photographic subject captured in the fourth region 64 whose area is larger than that of the first region 61, accordingly it is possible to generate image data in an appropriate manner.

(7) The area of the fourth region 64 is less than or equal to the area of the first region 61. Accordingly, in replacement of the image data acquired for the block for attention by employing the image data that has been acquired for the reference block, for example, it is possible to keep down the burden of calculation for the replacement processing by performing replacement of the image data corresponding to the plurality of pixels included in the block for attention by employing the same number or fewer of a plurality of image data.

(8) The image processing unit 33 generates the image data for the photographic subject captured in the first region 61 based on the image data for the photographic subject captured in a partial region of the fourth region 64. Due to this, if inappropriate image data is generated in a part (the block for attention) of the image captured in the first region 61, then it is possible to generate image data in an appropriate manner by employing the image data for a part (the reference blocks) of the image captured in the fourth region 64 whose image capture conditions are different from those for the first region 61.

(9) The fourth region 64 has the pixel 86*a* that includes a photoelectric conversion unit that converts light into electric charge and the pixel 86*b* that is different from the pixel 86*a* and that also includes a photoelectric conversion unit that converts light into electric charge. And the image processing unit 33 generates image data for the photographic subject captured in the first region 61 based on image data for the photographic subject captured in one of the pixels from among the pixel 86*a* and the pixel 86*b*. In this manner, for example, if inappropriate image data caused by the image capture conditions that are set for the first region 61 is generated in the image of the photographic subject captured in the first region 61, then it is possible to generate image data in an appropriate manner by employing the image of the photographic subject captured in the fourth region 64 under the image capture conditions that are different from those for the first region 61.

(10) If the interval between the first region 61 and the pixel 86*a* is shorter than the interval between the first region 61 and the pixel 86*b*, then the image processing unit 33 generates image data for the photographic subject captured in the first region 61 based on the image data for the photographic subject captured by the pixel 86a. In other words, in the replacement of the image data acquired for the block for attention by employing the image data acquired by the reference block, the replacement is performed by employing image data from a pixel that, among the pixels included in the reference block, is closer to the pixel that is the subject of replacement and is included in the block for attention. Due to this, it is possible to generate the image data in an appropriate manner.

(11) The image processing unit 33 generates the image data for the photographic subject captured in the first region 61 based on data calculated from the image data for the photographic subject captured in the fourth region 64. Due to this, for example, if inappropriate image data attributable to the image capture conditions that are set for the first region 61 is generated in the image of the photographic subject captured in the first region 61, then it is possible to generate image data in an appropriate manner by employing the image of the photographic subject captured in the fourth region 64 under its image capture conditions that are different from those for the first region 61.

(12) The image processing unit 33 generates the image data for the photographic subject captured in the first region 61 based on data calculated by averaging the image data for the photographic subject captured in the fourth region 64. Due to this, for example, if inappropriate image data originating in the image capture conditions that are set for the first region 61 is generated in the image of the photographic subject captured in the first region 61, then it is possible to generate image data in an appropriate manner by employing the image of the photographic subject captured in the fourth region 64 under its image capture conditions that are different from those for the first region 61.

(13) The imaging element 100 comprises the image capture chip 111 that includes the first region 61 and the fourth region 64, and the signal processing chip 112 that is connected to the image capture chip 111 and that has the analog/digital conversion circuitry that converts the image data outputted from the image capture chip 111 to digital data. Due to this, it is possible to perform processing in an appropriate manner for each of the regions whose image capture conditions are different. In other words, it is possible to generate images in an appropriate manner, based on the image data generated by each of the regions.

(14) The imaging element 100 comprises the memory chip 113 that is connected to the signal processing chip 112, and that has a storage unit that stores the image data that has been converted into digital data by the signal processing chip 112. The signal processing chip 112 is disposed between the image capture chip 111 and the memory chip 113. Since, due to this, the chips are laminated together in a manner that corresponds to the flow of data in the imaging element 100, accordingly it is possible to connect the chips together in an efficient manner.

(15) The camera 1, which comprises a lens adjustment device, includes the image capture unit 32 that has the first region 61 that performs image capture of the light from the image capture optical system 31 under the first image capture conditions and the fourth region 64 that performs image capture of the light from the image capture optical system 31 under the fourth image capture conditions that are different from the first image capture conditions, and the image processing unit 33 and the control unit 34 that cause the image capture optical system 31 to shift so as to adjust the image of the light incident upon the first region 61 by using a signal based upon the photographic subject captured in the fourth region 64. Due to this, if, for example, inappropriate signal data originating in the image capture conditions is generated in the signal data for the image captured in the first region 61, then it is possible to generate signal data in an appropriate manner by employing the signal data for the image captured in the fourth region 64 under its image capture conditions that are different from those for the first region 61. In concrete terms, it is possible to generate signal data in which discontinuity of the image such as discrepancy of the brightness, contrast, or the like of the image between the hatched portions of the block 82, the block 85, and the block 87 and the stippled portions of the blocks 83, 86, 88, and 89 is suppressed. As a result it becomes possible to perform focus adjustment in an appropriate manner, since it is possible to suppress deterioration of the accuracy of focus detection due to difference in the image capture conditions between the various blocks.

(16) The camera 1, which comprises a lens adjustment device, includes the image capture unit 32 that has the first region 61 that performs image capture of the light from the image capture optical system 31 under the first image capture conditions and the fourth region 64 that performs image capture of the light from the image capture optical system 31 under the fourth image capture conditions that are different from the first image capture conditions, and the image processing unit 33 and the control unit 34 that generate a signal for the image of the light incident upon the first region 61 to be adjusted by the image capture optical system 31 by using a signal based upon the photographic subject captured in the fourth region 64. Due to this, if for example inappropriate signal data attributable to the image capture conditions is generated in the signal data for the image captured in the first region 61, then it is possible to generate signal data in an appropriate manner by employing the signal data for the image captured in the fourth region 64 under its image capture conditions that are different from those for the first region 61. In concrete terms, it is possible to generate signal data in which discontinuity of the image such as discrepancy of the brightness, contrast, or the like of the image between the hatched portions of the block 82, the block 85, and the block 87 and the stippled portions of the blocks 83, 86, 88, and 89 is suppressed. As a result it becomes possible to perform focus adjustment in an appropriate manner, since it is possible to suppress deterioration of the accuracy of focus detection due to difference in the image capture conditions between the various blocks.

(17) The image processing unit 33 generates a signal on the basis of the photographic subject captured in the first region 61 by using a signal based upon the photographic subject captured in the fourth region 64. Due to this, for example, if inappropriate signal data caused by the image capture conditions is generated in the signal data for the image captured in the first region 61, then it is possible to generate signal data in an appropriate manner by employing the signal data for the image captured in the fourth region 64 under its image capture conditions that are different from those for the first region 61.

(18) The image processing unit 33 generates a signal on the basis of a part of the photographic subject captured in the first region 61 by using a signal based upon the photographic subject captured in the fourth region 64. Due to this, if inappropriate signal data is generated in a part (the block for attention) of the image captured in the first region 61, then it is possible to generate signal data in an appropriate manner by employing the signal data for the image captured in the fourth region 64 under its image capture conditions that are different from those for the first region 61. As a result, it becomes possible to eliminate influence of the difference in the image capture conditions between the blocks in a part of the photographic subject, and accordingly it becomes possible to adjust the focus in an appropriate manner.

(19) The image processing unit 33 generates a signal based on a part of the photographic subject captured in the first region 61 by using a signal based upon the photographic subject captured in the fourth region 64. The part of the photographic subject captured in the first region 61 and at least a part of the photographic subject captured in the fourth region 64 are detected as being the same photographic subject. Due to this, if the same photographic subject, for example the mountain in FIG. 7A, is captured in the first region 61 and also in the fourth region 64, then it is possible to generate signal data in an appropriate manner by employing the signal data for the image of the mountain that has been captured in the fourth region 64 as the image data for the image of the mountain that has been obtained by image capture in the first region 61. Accordingly, it is possible to perform focus adjustment in an appropriate manner.

(20) The area of the fourth region 64 is larger than the area of the first region 61. Due to this, it is possible to generate signal data in an appropriate manner on the basis of the signal data of the image captured in the fourth region 64 whose area is larger than that of the first region 61. Accordingly, it becomes possible to perform focus adjustment in an appropriate manner.

(21) The area of the fourth region 64 is less than or equal to the area of the first region 61. In other words, in the generation of appropriate signal data, for example, it is possible to keep down the burden of calculation for the replacement processing by performing replacement of sets of image signal data corresponding to a plurality of pixels included in the block for attention by employing the same number of sets of image signal data or fewer.

(22) The image processing unit 33 generates a signal for the photographic subject captured in the first region 61 by using a signal based upon the photographic subject captured in a partial region of the fourth region 64. Due to this, if inappropriate signal data has been generated for a part (the block for attention) of the image captured in the first region 61, then it is possible to generate signal data in an appropriate manner by employing the captured image signal data for a part of the image (the reference block) captured in the fourth region 64 under its image capture conditions that are different from those for the first region 61. As a result, it becomes possible to perform focus adjustment in an appropriate manner, without experiencing any influence due to the difference of image capture conditions between the various blocks.

(23) The fourth region 64 comprises the pixel 86a that includes a photoelectric conversion unit that converts light into charge, and the pixel 86b that includes a photoelectric conversion unit that converts light into charge and that is different from the pixel 86a. And the image processing unit 33 generates a signal for the photographic subject captured in the first region 61, by using a signal based upon the photographic subject captured in one of the regions among the pixel 86a and the pixel 86b. Due to this, for example, if inappropriate signal data originating in the image capture conditions has been generated in the signal data for the image captured in the first region 61, then it is possible to generate signal data in an appropriate manner by employing the signal data for the image captured in the fourth region 64 under its image capture conditions that are different from those for the first region 61.

(24) If the interval between the first region 61 and the pixel 86a is shorter than the interval between the first region 61 and the pixel 86b, then the image processing unit 33 generates the signal for the photographic subject captured in the first region 61 by using the signal based upon the photographic subject captured by the pixel 86a. In other words, in replacement of the signal data for the image acquired in the block for attention by employing the signal data for the image acquired in the reference block, the pixel that is the subject of replacement included in the block for attention is replaced by employing signal data for the image from, among the pixels included in the reference block, a pixel closer to the pixel that is the subject of replacement. Due to this, it is possible to generate the signal data in an appropriate manner.

(25) The image processing unit 33 generates a signal for the photographic subject captured in the first region 61 by using data calculated from the signal data based upon the photographic subject captured in the fourth region 64. Due to this, if for example inappropriate signal data originating in the image capture conditions has been generated for the signal data for the image captured in the first region 61, then it is possible to generate signal data in an appropriate manner by employing the signal data for the image captured in the fourth region 64 under its image capture conditions that are different from those for the first region 61.

(26) The image processing unit 33 generates a signal for the photographic subject captured in the first region 61 by using data calculated by averaging the signal data based upon the photographic subject captured in the fourth region 64. Due to this, if for example inappropriate signal data originating in the image capture conditions has been generated for the signal data for the image captured in the first region 61, then it is possible to generate signal data in an appropriate manner by employing the signal data for the image captured in the fourth region 64 under its image capture conditions that are different from those for the first region 61.

(27) The lens movement control unit 34d of the camera 1 generates a signal for driving the image capture optical system 31 on the basis of the amount of image deviation of a plurality of optical images that have passed through different pupils of the image capture optical system 31. Due to this, when performing focus detection processing according to the split pupil phase detection method, it is possible to perform focus adjustment in an appropriate manner without experiencing any influence from differences of the image capture conditions between the various blocks.

(28) The lens movement control unit 34d of the camera 1 generates a signal for driving the image capture optical system 31 on the basis of the contrast of the optical image formed by the light that is incident upon the image capture unit 32. Due to this, when performing focus detection processing according to the contrast detection method, it is possible to perform focus adjustment in an appropriate manner without experiencing any influence from differences of the image capture conditions between the various blocks.

(29) The camera 1, which is provided with a photographic subject detection device, comprises: the image capture unit 32 that has the first region 61 that captures an image under first image capture conditions and the fourth region 64 that captures an image under fourth image capture conditions that are different from the first image capture conditions, and the image processing unit 33 and the control unit 34 that detect the photographic subject captured in the first region 61 by using the image data for the photographic subject captured in the fourth region 64. Due to this, if for example inappropriate image data originating in the image capture conditions has been generated in the image data for the image captured in the first region 61, then it is possible to generate image data in an appropriate manner by employing the image data for the image captured in the fourth region 64 under its image capture conditions that are different from those for the first region 61. In concrete terms, it is possible to generate image data in which discontinuity of the image such as discrepancy of the brightness, the contrast, or the like of the image between the hatched portions of the block 82, the block 85, and the block 87 and the stippled portions of the blocks 83, 86, 88, and 89 is suppressed. As a result it is possible to suppress deterioration of the accuracy of detection of the elements of the photographic subject due to difference in the image capture conditions between the various blocks.

(30) The camera 1, which is provided with a photographic subject detection device, comprises: the image capture unit 32 that has the first region 61 that captures an image under first image capture conditions and the fourth region 64 that captures an image under fourth image capture conditions that are different from the first image capture conditions, and the image processing unit 33 and the control unit 34 that generate a signal for detection of the photographic subject captured in the first region 61 by using the image data for the photographic subject captured in the fourth region 64. Due to this, if for example inappropriate image data originating in the image capture conditions has been generated for the image data for the image captured in the first region 61, then it is possible to generate image data in an appropriate manner by employing the image data for the image captured in the fourth region 64 under its image capture conditions that are different from those for the first region 61. In concrete terms, it is possible to generate image data in which discontinuity of the image such as discrepancy of the brightness, contrast, or the like of the image between the hatched portions of the block 82, the block 85, and the block 87 and the stippled portions of the blocks 83, 86, 88, and 89 is suppressed. As a result it is possible to suppress deterioration of the accuracy of detection of the elements of the photographic subject due to difference in the image capture conditions between the various blocks.

(31) The image processing unit 33 generates image data for the photographic subject captured in the first region 61 by using the image data for the photographic subject captured in the fourth region 64. Due to this if, for example, inappropriate image data originating in the image capture conditions has been generated in the image data for the image captured in the first region 61, then it is possible to generate image data in an appropriate manner by employing the image data for the image captured in the fourth region 64 under its image capture conditions that are different from those for the first region 61. As a result it is possible to suppress deterioration of the accuracy of detection of the photographic subject due to difference in the image capture conditions between the various blocks.

(32) The image processing unit 33 generates a part of the image data for the photographic subject captured in the first region 61 by using the image data for the photographic subject captured in the fourth region 64. Due to this, if inappropriate image data has been generated for a part (the block for attention) of the image captured in the first region 61, then it is possible to generate image data in an appropriate manner by employing the image data for the image captured in the fourth region 64 whose image capture conditions are different from those for the first region 61. As a result it is possible to eliminate influence, even upon a part of the photographic subject, of the difference in image capture conditions between the various blocks, so that it becomes possible to detect the elements of the photographic subject in an appropriate manner.

(33) The image processing unit 33 generates image data for a part of the photographic subject captured in the first region 61 by using the image data for the photographic subject captured in the fourth region 64. The part of the photographic subject captured in the first region 61 and at least a part of the photographic subject captured in the fourth region 64 are detected as being the same photographic subject. As a result, if the same photographic subject, for example the mountain in FIG. 7A, is captured both in the first region 61 and in the fourth region 64, then it is possible to replace the image data for the mountain obtained by image capture in the first region 61 with the image data for the mountain captured in the fourth region 64. Accordingly, it is possible to generate the image data in an appropriate manner. As a result, it becomes possible to detect the elements of the photographic subject in an appropriate manner without experiencing any influence due to the difference in image capture conditions between the various blocks.

(34) The area of the fourth region 64 is larger than the area of the first region 61. Since, due to this, the image data for the photographic subject captured in the first region 61 is generated based on the image data for the photographic subject captured in the fourth region 64 whose area is larger than that of the first region 61, accordingly it is possible to generate the image data in an appropriate manner. As a result, it is possible to detect the elements of the photographic subject in an appropriate manner without experiencing any influence due to the difference in image capture conditions between the various blocks.

(35) The area of the fourth region 64 is less than or equal to the area of the first region 61. In other words, in replacing the image data acquired in the block for attention by employing the image data acquired in a reference block, for example, it is possible to keep down the burden of calculation for the replacement processing by performing replacement of sets of image data corresponding to a plurality of pixels included in the block for attention by employing the same number of sets of image data or fewer. Accordingly, it is possible to keep down the burden of calculation related to detection of the elements of the photographic subject.

(36) The image processing unit 33 generates image data for the photographic subject captured in the first region 61 by using the image data for the photographic subject captured in a part of the fourth region 64. Due to this, if inappropriate image data has been generated in a part (the block for attention) of the image captured in the first region 61, then it is possible to generate image data in an appropriate manner by employing a part (the reference block) of the image captured in the fourth region 64 whose image capture conditions are different from those for the first region 61. As a result it is possible to detect the elements of the photographic subject in an appropriate manner, without experiencing any influence due to difference in image capture conditions between the various blocks.

(37) The fourth region 64 comprises the pixel 86a that includes a photoelectric conversion unit that converts light into charge, and the pixel 86b that includes a photoelectric conversion unit that converts light into charge and is different from the pixel 86a. And the image processing unit 33 generates the image data for the photographic subject captured in the first region 61, by using the image data for the photographic subject captured in one of the regions among the pixel 86*a* and the pixel 86*b*. Due to this, for example, if inappropriate signal data originating in the image capture conditions has been generated for the image captured in the first region 61, then it is possible to generate signal data in an appropriate manner by employing the image data for the image captured in the fourth region 64 under its image capture conditions that are different from those for the first region 61. As a result, it is possible to suppress deterioration in the accuracy of detection of the elements of the photographic subject due to differences in the image capture conditions between the various blocks.

(38) When the interval between the first region 61 and the pixel 86*a* is shorter than the interval between the first region 61 and the pixel 86*b*, then the image processing unit 33 generates the image data for the photographic subject captured in the first region 61 by using the image data for the photographic subject captured in the pixel 86*a*. In other words, in replacement of the image data acquired in the block for attention by employing the image data acquired in a reference block, replacement is performed by employing the image data from a pixel that, among the pixels included in the reference block, is closer to the pixel included in the block for attention that is the subject of replacement. Due to this, it is possible to generate image data in an appropriate manner. As a result, it is possible to suppress deterioration of the accuracy of detection of the elements of the photographic subject due to difference in the image capture conditions.

(39) The image processing unit 33 generates the image data for the photographic subject captured in the first region 61 by using data calculated from the image data for the photographic subject captured in the fourth region 64. Due to this, for example, if inappropriate image data originating in the image capture conditions has been generated in the image data captured in the first region 61, then it is possible to generate image data in an appropriate manner by employing the image data for the image captured in the fourth region 64 under its image capture conditions that are different from those for the first region 61. As a result, it is possible to suppress deterioration in the accuracy of detection of the elements of the photographic subject due to difference in the image capture conditions between the various blocks.

(40) The image processing unit 33 generates the image data for the photographic subject captured in the first region 61 by using data calculated by averaging the image data for the photographic subject captured in the fourth region 64. Due to this, for example, if inappropriate image data originating in the image capture conditions has been generated in the image data of the image captured in the first region 61, then it is possible to generate image data in an appropriate manner by employing the image data for the image captured in the fourth region 64 under its image capture conditions that are different from those for the first region 61. As a result, it is possible to suppress deterioration in the accuracy of detection of the elements of the photographic subject due to difference in the image capture conditions between the various blocks.

(41) Since the object detection unit 34*a* of the camera 1 detects the photographic subject element that is to be the subject of focus adjustment of the image capture optical system 31, accordingly it is possible to detect the subject for focus adjustment of the image capture optical system 31 in an appropriate manner without experiencing any influence due to difference in the image capture conditions between the various blocks.

(42) The camera 1 comprises the control unit 34 that detects the brightness of the photographic subject. Since the object detection unit 34*a* detects the photographic subject element that is to be the target for photometry by the control unit 34, accordingly it is possible to detect the subject for photometry in an appropriate manner without experiencing any influence due to difference in the image capture conditions between the various blocks.

(43) The camera 1 comprises: the image capture unit 32 that has the first region 61 that captures an image under first image capture conditions and the fourth region 64 that captures an image under fourth image capture conditions that are different from the first image capture conditions, and the image processing unit 33 and the control unit 34 that set image capture conditions for the first region 61 on the basis of the signal for the photographic subject captured in the fourth region 64. Due to this, if for example inappropriate image data originating in the image capture conditions has been generated in the image data for the image captured in the first region 61, then it is possible to generate image data in an appropriate manner by employing the image data for the image captured in the fourth region 64 under its image capture conditions that are different from those for the first region 61. In concrete terms, it is possible to generate image data in which discontinuity of the image such as discrepancy of the brightness, contrast, or the like of the image between the hatched portions of the block 82, the block 85, and the block 87 and the stippled portions of the blocks 83, 86, 88, and 89 is suppressed. As a result it is possible to suppress deterioration of the accuracy of setting of the exposure conditions due to difference in the image capture conditions between the various blocks.

(44) The camera 1 comprises: the image capture unit 32 that has the first region 61 that captures an image under first image capture conditions and the fourth region 64 that captures an image under fourth image capture conditions that are different from the first image capture conditions, and the image processing unit 33 and the control unit 34 that generate a signal for setting the image capture conditions for the first region 61 by using a signal based upon the photographic subject captured in the fourth region 64. Due to this, if for example inappropriate image data originating in the image capture conditions has been generated in the image data for the image captured in the first region 61, then it is possible to generate image data in an appropriate manner by employing the image data for the image captured in the fourth region 64 under its image capture conditions that are different from those for the first region 61. In concrete terms, it is possible to generate image data in which discontinuity of the image such as discrepancy of the brightness, contrast, or the like of the image between the hatched portions of the block 82, the block 85, and the block 87 and the stippled portions of the blocks 83, 86, 88, and 89 is suppressed. As a result it is possible to suppress deterioration of the accuracy of setting of the exposure conditions due to difference in the image capture conditions between the various blocks.

(45) The image processing unit 33 generates a signal of the photographic subject captured in the first region 61 based on a signal of the photographic subject captured in the fourth region 64. Due to this, for example, if inappropriate image data originating in the image capture conditions has been generated in the image data for the image captured in the first region 61, then it is possible to generate image data in an appropriate manner by employing the image data for the image captured in the fourth region 64 under its image capture conditions that are different from those for the first region 61. As a result, it is possible to suppress deterioration in the accuracy of setting the exposure conditions due to difference in the image capture conditions between the various blocks.

(46) The image processing unit 33 generates a signal based upon a part of the photographic subject captured in the first region 61 by using a signal based upon the photographic subject captured in the fourth region 64. Due to this, if inappropriate image data has been generated in a part (the block for attention) of the image captured in the first region 61, then it is possible to generate image data in an appropriate manner by employing the image captured in the fourth region 64 whose image capture conditions are different from those for the first region 61. As a result it is possible to set the exposure conditions in an appropriate manner, while not experiencing influence due to the difference in image capture conditions between the various blocks.

(47) The image processing unit 33 generates a signal based upon a part of the photographic subject captured in the first region 61 by using a signal based upon the photographic subject captured in the fourth region 64. The part of the photographic subject captured in the first region 61 and at least a part of the photographic subject captured in the fourth region 64 are detected as being the same photographic subject. As a result, if the same photographic subject, for example the mountain in FIG. 7A, is captured both in the first region 61 and also in the fourth region 64, then it is possible to replace the image data for the mountain obtained by image capture in the first region 61 with the image data for the mountain captured in the fourth region 64. Accordingly, it is possible to generate the image data in an appropriate manner. As a result, it becomes possible to set the exposure conditions in an appropriate manner without experiencing influence due to the difference in image capture conditions between the various blocks.

(48) The area of the fourth region 64 is larger than the area of the first region 61.

Since, due to this, the image data for the photographic subject captured in the first region 61 is generated based on the image data for the photographic subject captured in the fourth region 64 whose area is larger than that of the first region 61, accordingly it is possible to generate the image data in an appropriate manner. As a result, it is possible to set the exposure conditions in an appropriate manner without experiencing influence due to the difference in image capture conditions between the various blocks.

(49) The area of the fourth region 64 is smaller than or equal to the area of the first region 61. In other words, in replacing the image data acquired in the block for attention by employing image data acquired in the reference block, for example, it is possible to keep down the burden of calculation for the replacement processing by performing replacement of sets of the image data corresponding to a plurality of pixels included in the block for attention by employing sets of image data of the same number or fewer. Accordingly, it is possible to keep down the burden of calculation related to setting of the exposure conditions.

(50) The image processing unit 33 generates a signal of the photographic subject captured in the first region 61 by using a signal of the photographic subject captured in a part of the fourth region 64. Due to this, if inappropriate image data has been generated in a part (the block for attention) of the image captured in the first region 61, then it is possible to generate image data in an appropriate manner by employing a part (the reference block) of the image captured in the fourth region 64 whose image capture conditions are different from those for the first region 61. As a result it is possible to avoid influence of the difference in the image capture conditions between the various blocks, so that it is possible to set the exposure conditions in an appropriate manner.

(51) The fourth region 64 comprises the pixel 86a that includes a photoelectric conversion unit that converts light into charge, and the pixel 86b that includes a photoelectric conversion unit that converts light into charge and that is different from the pixel 86a. And the image processing unit 33 generates a signal based upon the photographic subject captured in the first region 61 by using a signal based upon the photographic subject captured in one of the regions among the pixel 86a and the pixel 86b. Due to this, for example, if inappropriate signal data originating in the image capture conditions has been generated in the image data for the image captured in the first region 61, then it is possible to generate image data in an appropriate manner by employing the image data for the image captured in the fourth region 64 under its image capture conditions that are different from those for the first region 61. As a result, it is possible to suppress deterioration in the accuracy of setting the exposure conditions due to differences in the image capture conditions between the various blocks.

(52) When the interval between the first region 61 and the pixel 86a is shorter than the interval between the first region 61 and the pixel 86b, then the image processing unit 33 generates a signal based upon the photographic subject captured in the first region 61 by using the signal based upon the photographic subject captured by the pixel 86a. In other words, in replacement of the image data acquired in the block for attention by employing the image data acquired in the reference block, replacement is performed by employing the image data from a pixel that, among the pixels included in the reference block, is closer to the pixel included in the block for attention that is the subject of replacement. Due to this, it is possible to generate image data in an appropriate manner. As a result, it is possible to suppress deterioration of the accuracy of setting of the exposure conditions due to difference in the image capture conditions.

(53) The image processing unit 33 generates a signal for the photographic subject captured in the first region 61 by using data calculated from the signal data for the photographic subject captured in the fourth region 64. Due to this, for example, if inappropriate image data originating in the image capture conditions has been generated for the image data of the image captured in the first region 61, then it is possible to generate image data in an appropriate manner by employing the image data for the image captured in the fourth region 64 under its image capture conditions that are different from those for the first region 61. As a result, it is possible to suppress deterioration in the accuracy of setting of the exposure conditions due to difference in the image capture conditions between the various blocks.

(54) The image processing unit 33 generates a signal for the photographic subject captured in the first region 61 by using data calculated by averaging the signal data for the photographic subject captured in the fourth region 64. Due to this, for example, if inappropriate image data originating in the image capture conditions has been generated for the image data captured in the first region 61, then it is possible to generate image data in an appropriate manner by employing the image data for the image captured in the fourth region 64 under its image capture conditions that are different from those for the first region 61. As a result, it is possible to suppress deterioration in the accuracy of setting of the exposure conditions due to difference in the image capture conditions between the various blocks.

(55) Since the setting unit 34b of the camera 1 sets the exposure conditions as photographic conditions, accordingly it is possible to set the exposure conditions for each block in an appropriate manner, even when there is a difference in the image capture conditions between the various blocks.

(56) The camera 1 includes the control unit 34 that performs control of a light source that emits auxiliary photographic light, and, as the image capture conditions, the setting unit 34b sets whether or not light is to be emitted by the light source controlled by the control unit 34, or the amount of light that it is to emit. Due to this, it is possible to perform setting processing in an appropriate manner, even when there is a difference in the image capture conditions between the various blocks.

It would also be acceptable to change over between a mode 1 in which the second processing described above is performed as pre-processing, and a mode 2 in which no second correction processing as pre-processing is performed. When the mode 1 is selected, the control unit 34 performs the processing for image processing and so on after having performed the pre-processing described above. On the other hand, when the mode 2 is selected, the control unit 34 performs the processing for image processing and so on without performing the pre-processing described above. For example, a case is assumed in which there is a shadow upon a part of a face that is detected as a photographic subject element and an image is generated by image capture under settings in which the image capture conditions for a region including the part of the face that is in shadow and the image capture conditions for a region including a portion of the face that is not in shadow are different from one another so that the brightness of the shadowed portion of the face is of the same order as the brightness of the other portions which are not shadowed. If color interpolation processing is performed upon such an image after having performed the second correction processing thereupon, then, depending upon the difference in the image capture conditions that have been set, unintended color interpolation may be performed upon the portion that is in shadow. It is possible to avoid unintended color interpolation by making it possible to change over between the mode 1 and the mode 2 and to perform color interpolation processing by employing the image data just as it is, without performing the second correction processing.

Variants of First Embodiment

The following modifications also come within the range of the present invention, and one or a plurality of the following variants could also be combined with the embodiment described above.

Variant 1

Figure 18A:
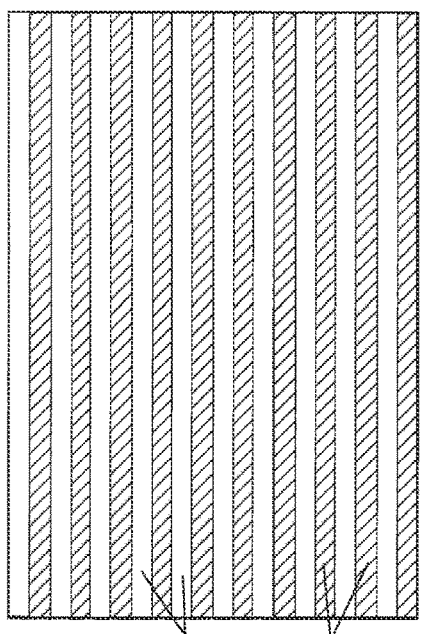
FIGS. 18A to 18C are figures showing examples of arrangement of a first image capture region and a second image capture region upon the imaging surface of the imaging element.
Figure 18B:
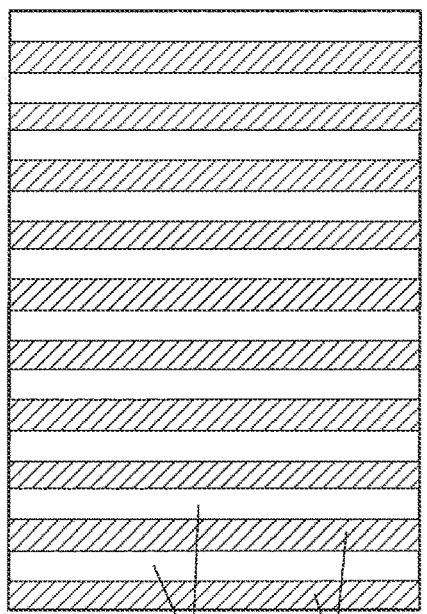
Figure 18C:
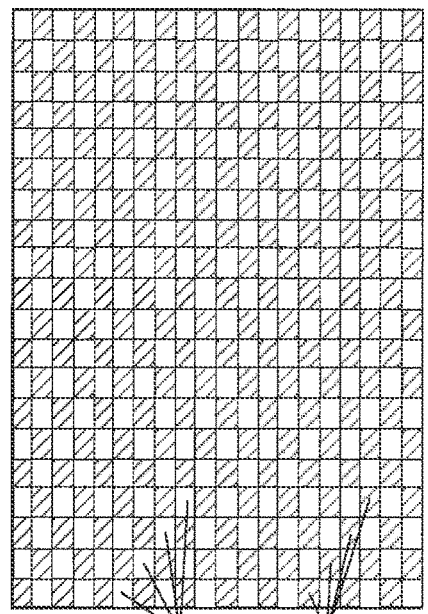

FIGS. 18A through 18C are figures showing examples of arrangement of a first image capture region and a second image capture region upon the imaging surface of the imaging element 32a. According to the example of FIG. 18A, the first image capture region consists of even numbered columns, while the second image capture region consists of odd numbered columns. In other words, the imaging surface is subdivided into even numbered columns and odd numbered columns.

According to the example of FIG. 18B, the first image capture region consists of odd numbered rows, while the second image capture region consists of even numbered rows. In other words, the imaging surface is subdivided into odd numbered rows and even numbered rows.

And, according to the example of FIG. 18C, the first image capture region includes the blocks in odd numbered columns and even numbered rows, and also includes the blocks in even numbered columns and odd numbered rows. Moreover, the second image capture region includes the blocks in odd numbered columns and odd numbered rows, and also includes the blocks in even numbered columns and even numbered rows. In other words, the imaging surface is subdivided into a checkerboard pattern.

In any of the cases shown in FIG. 18A through FIG. 18C, according to the photoelectrically converted signals read out from the imaging element 32a that has performed image capture of one frame, a first image based upon the photoelectrically converted signals read out from the first image capture region and a second image based upon the photoelectrically converted signals read out from the second image capture region are generated. According to Variant 1, the first image and the second image are captured at the same angle of view, and thus include images of the common photographic subject.

In Variant 1, the control unit 34 employs the first image for display and employs the second image for detection. In concrete terms, the control unit 34 controls the display unit 35 to display the first image as a live view image. Moreover, the control unit 34 causes photographic subject detection processing to be performed by the object detection unit 34a by employing the second image, causes focus detection processing to be performed by the lens movement control unit 34d by employing the second image, and causes exposure calculation processing to be performed by the setting unit 34b by using the second image.

In this Variant 1, the image capture conditions that are set for the first capture region to capture the first image will be referred to as the "first image capture conditions", while the image capture conditions that are set for the second capture region to capture the second image will be referred to as the "second image capture conditions". The control unit 34 may make the first image capture conditions be different from the second image capture conditions.

1. As one example, the control unit 34 may set the first image capture conditions to conditions that are suitable for display upon the display unit 35. For example, the first image capture conditions that are set for the first image capture region may be set to be the same over the entire extent of the first image capture region of the imaging screen. On the other hand, the control unit 34 may set the second image capture conditions to be conditions that are suitable for the focus detection processing, for the photographic subject detection processing, and for the exposure calculation processing. The second image capture conditions may be set to be the same over the entire extent of the second image capture region of the imaging screen.

It should be understood that, if the conditions suitable for the focus detection processing, for the photographic subject detection processing, and for the exposure calculation processing are different from one another, then the control section 34 may make the second image capture conditions that are set for the second image capture region be different for each frame. For example, the second image capture conditions for a first frame may be set as conditions that are suitable for the focus detection processing, the second image capture conditions for a second frame may be set as conditions that are suitable for the photographic subject detection processing, and the second image capture conditions for a third frame may be set as conditions that are suitable for the exposure calculation processing. In these cases, for each frame, the second image capture conditions may be set to be the same for the entire second image capture region of the imaging screen.

2. As another example, it would also be acceptable for the control unit 34 to make the first image capture conditions that are set for the first image capture region vary according to the region. The setting unit 34b of the control unit 34 may set first image capture conditions that are different for each of the regions subdivided by the setting unit 34b including elements of the photographic subject. On the other hand, the control unit 34 may set the second image capture conditions for the second image capture region to be the same over the entire extent of the second image capture region of the imaging screen. While the second image capture conditions are set to conditions that are suitable for the focus detection processing, for the photographic subject detection processing, and for the exposure calculation processing, if the conditions that are suitable for the focus detection processing, for the photographic subject detection processing, and for the exposure calculation processing are mutually different, then it will also be acceptable for the control unit 34 to make the image capture conditions that are set for the second capture region be different for each frame.

3. Furthermore, as another example, it would also be acceptable for the control unit 34 to make the first image capture conditions that are set for the first image capture region be the same over the entire area of the first image capture region of the imaging screen, while on the other hand making the second image capture condition that are set for the second image capture region vary over the imaging screen. For example, the second image capture conditions may be set to be different for each of the regions, including a photographic subject element, into which the screen has been subdivided by the setting unit 34b. Also in this case, if the conditions that are suitable for the focus detection processing, for the photographic subject detection processing, and for the exposure calculation processing are mutually different, then it will be acceptable for the control unit 34 to make the image capture conditions that are set for the second capture region be different for each frame.

4. Even further, as another example, the control unit 34 may set first image capture conditions for the first image capture regions that are different over the imaging screen, and may set second image capture conditions for the second image capture region that are different over the imaging screen. For example, different first image capture conditions may be set for each of the regions including elements of the photographic subject subdivided by the setting unit 34b, and also different second image capture conditions may be set for each of the regions including elements of the photographic subject subdivided by the setting unit 34b.

In FIG. 18A through FIG. 18C, it would also be acceptable to make a ratio between the area of the first image capture region and the area of the second image capture region to be different. For example, on the basis of operation by the user or a decision by the control unit 34, the control unit 34 may set the ratio of the first capture region to the second image capture region to be high, or may set the ratio of the first image capture region and the second image capture region to be equal as shown in FIG. 18A through FIG. 18C, or may set the ratio of the first capture region to the second image capture region to be low. By changing the ratio between the area of the first image capture region and the area of the second image capture region, it is possible to make the first image be higher in definition as compared with the second image, or to make the resolutions of the first image and the second image to be equal, or to make the second image be higher in definition as compared with the first image.

Variant 2

In the embodiments described above, in the second correction processing when performing image processing, if the image capture conditions that are applied to the position for attention (i.e. the first image capture conditions) and the image capture conditions that are applied to the reference positions around the position for attention (i.e. the fourth image capture conditions) are different, then the correction unit 33b of the image processing unit 33 corrects the image data that was captured under the fourth image capture conditions (i.e. the image data that, among the image data for the reference positions, was captured under the fourth image capture conditions) on the basis of the first image capture conditions. In other words, by performing the second correction processing upon the image data that was captured under the fourth image capture conditions, it becomes possible to reduce discontinuity of the image due to discrepancy between the first image capture conditions and the fourth image capture conditions.

Instead of the above, it is possible, with this Variant 2, for the correction unit 33b of the image processing unit 33 to correct the image data that was captured under the first image capture conditions (i.e. the image data that, among the image data for the position for attention and the image data for the reference positions, was captured under the first image capture conditions) on the basis of the fourth image capture conditions. In this case as well, it is possible to reduce discontinuity of the image due to discrepancy between the first image capture conditions and the fourth image capture conditions.

Alternatively, it would also be acceptable to arrange for the correction unit 33b of the image processing unit 33 to correct both the image data that was captured under the first image capture conditions and also the image data that was captured under the fourth image capture conditions. In other words it would also be acceptable to arrange to reduce discontinuity in the image due to disparity between the first image conditions and the fourth image conditions by performing the second correction processing upon each of the image data at the position for attention that was captured under the first image capture conditions, the image data among the image data at the reference positions that was captured under the first image capture conditions, and the image data among the image data at the reference positions that was captured under the fourth image capture conditions.

For example, in Example 1 described above, the second correction processing is performed on the image data of a reference pixel Pr to which the first image capture conditions (ISO sensitivity is 100) is applied by multiplying it by 400/100, while the second correction processing is performed on the image data of a reference pixel Pr to which the fourth image capture conditions (ISO sensitivity is 800) is applied by multiplying it by 400/800. By doing this, disparity between the image data due to discrepancy in the image capture conditions is reduced. It should be understood that the second correction processing is performed upon the pixel data of the pixel for attention by applying multiplication by 100/400 after color interpolation processing. By this second correction processing, it is possible to change the pixel data of the pixel for attention after color interpolation processing to a value similar to the value in the case of image capture under the first image capture conditions. Furthermore, in Example 1 described above, it would also be acceptable to change the level of the second correction processing according to the distance from the boundary between the first region and the fourth region. And it is possible to reduce the rate by which the image data increases or decreases due to the second correction processing as compared to the case of Example 1 described above, and to reduce the noise generated due to the second correction processing. Although the above explanation has referred to the previously described Example 1, it could be applied in a similar manner to the previously described Example 2.

According to this Variant 2, in a similar manner to the embodiments described above, it is possible to perform image processing in an appropriate manner upon the image data that is generated for each of the regions whose image capture conditions are different.

Variant 3

In the embodiments described above, when performing the second correction processing upon the image data, it is arranged to obtain the corrected image data by performing calculation on the basis of the difference between the first image capture conditions and the fourth image capture conditions. However, instead of performing calculation, it would also be acceptable to obtain the corrected image data by referring to a correction table. For example, the corrected image data may be read out by inputting the first image capture conditions and the fourth image capture conditions as arguments. Alternatively, it would also be acceptable to arrange to read out a correction coefficient by inputting the first image capture conditions and the fourth image capture conditions as arguments.

Variant 4

In the second correction processing of the embodiments described above, it would also be acceptable to impose an upper limit and/or a lower limit upon the image data after correction. By establishing such upper and lower limit values, it is possible to ensure that the corrections that are made are not greater than necessary. Such an upper limit value and/or lower limit value may be determined in advance, or, if a photometric sensor is provided separately from the imaging element 32a, they may be determined on the basis of the output signal from that photometric sensor.

Variant 5

In the embodiments described above, examples were explained in which the setting unit 34b of the control unit 34 detected the elements of the photographic subject on the basis of the live view image, and subdivided the live view image screen into regions containing the elements of the photographic subject. However, if a photometric sensor is provided separately from the imaging element 32a, then, in Variant 5, it would also be acceptable to arrange for the control unit 34 to subdivide into the regions on the basis of the output signal from that photometric sensor The control unit 34 divides the image into a foreground and a background on the basis of the output signal from the photometric sensor. In concrete terms, the live view image acquired by the imaging element 32a is divided into a foreground region corresponding to a region that has been decided from the output signal from the photometric sensor to be the foreground, and a background region corresponding to a region that has been decided from the output signal from the photometric sensor to be the background.

Furthermore, the control unit 34 arranges first image capture regions and second image capture regions as shown in FIGS. 18A through 18C in positions corresponding to the foreground region of the imaging surface of the imaging element 32a. On the other hand, the control unit 34 arranges only first image capture regions upon the imaging surface of the imaging element 32a in positions corresponding to the background region of the imaging surface of the imaging element 32a. The control unit 34 employs the first image for display, and employs the second image for detection.

According to this Variant 5, it is possible to perform subdivision of the live view image acquired by the imaging element 32a into regions by employing the output signal from the photometric sensor. Moreover, both the first image for display and the second image for detection can be obtained for the foreground region, while only the first image for display can be obtained for the background region.

Variant 6

In Variant 6, the generation unit 33c of the image processing unit 33 performs contrast adjustment processing, which is one example of the second correction processing. In other words, the generation unit 33c is able to reduce discontinuity of the image caused by disparity between the first image capture conditions and the fourth image capture conditions by adjusting the gradation curve (i.e. the gamma curve).

For example, suppose that only the ISO sensitivity is different between the first image capture conditions and the fourth image capture conditions, and that the ISO sensitivity of the first image capture conditions is 100 while the ISO sensitivity of the fourth image capture conditions is 800. By flattening the gradation curve, the generation unit 33c compresses by ⅛ the values of the image data that, among the image data for the reference positions, was captured under the fourth image conditions.

Alternatively it would also be acceptable for the generation unit 33c, by raising the gradation curve, to increase by 8 times the values of the image data that, among the image data for the position for attention and the image data for the reference positions, was captured under the first image capture conditions.

According to this Variant 6, in a similar manner to the embodiments described above, it is possible to perform image processing in an appropriate manner upon the image data that is generated for each of the regions whose image capture conditions are different. For example, it is possible to suppress any discontinuity or sense of strangeness appearing in the image after image processing due to difference in the image capture conditions at the boundary between regions.

Variant 7

In Variant 7, it is arranged for the image processing unit 33 not to lose the contours of the elements of the photographic subject in the image processing described above (for example, in the noise reduction processing). Generally, smoothing filter processing is employed when performing noise reduction. When a smoothing filter is employed, although there is a beneficial effect for reduction of noise, a boundary of an element of the photographic subject may become blurred.

Accordingly, for example, in addition to the noise reduction processing, or together with the noise reduction processing, the generation unit 33c of the image processing unit 33 also compensates for the blurring of the boundary of an element of the photographic subject described above by performing contrast adjustment processing. In this Variant 7, as the density conversion curve (i.e. the gradation conversion curve), the generation unit 33c of the image processing unit 33 sets a curve like one drawn in a letter-S shape (this is referred to as "letter-S conversion"). By performing contrast adjustment by employing this letter-S conversion, the generation unit 33c of the image processing unit 33 extends the gradations of both the bright data and also the dark data and thus increases the gradation levels of the bright data (and of the dark data), and also compresses the image data having intermediate gradations so as to reduce its gradation levels. Due to this, the number of image data items whose image brightness is intermediate is reduced while the number of data items classified as either bright or dark is increased, and as a result it is possible to compensate for blurring at the boundary of the element of the photographic subject.

According to this Variant 7, it is possible to compensate for blurring of a boundary of an element of the photographic subject by sharpening the contrast of the image.

Variant 8

In Variant 8, the generation unit 33c of the image processing unit 33 changes the white balance adjustment gain in order to reduce discontinuity of the image due to disparity between the first image capture conditions and the fourth image capture conditions.

For example, in a case in which the image capture conditions that have been applied during image capture at the position for attention and the image capture conditions that have been applied during image capture at the reference positions around the position for attention are different, the generation unit 33c of the image processing unit 33 changes the white balance adjustment gain so as to bring the white balance of the image data that, among the image data for the reference positions, was captured under the fourth image capture conditions closer to the white balance of the image data that was acquired under the first image capture conditions.

It should be understood that it would also be acceptable for the generation unit 33c of the image processing unit 33 to change the white balance adjustment gain so as to bring the white balance of the image data that, among the image data for the reference positions, was captured under the first image capture conditions and also the white balance of the image data for the position for attention closer to the white balance of the image data that was acquired under the fourth image capture conditions.

According to Variant 8, by matching the white balance adjustment gain for the image data respectively generated in regions for which the image capture conditions are different to the adjustment gain for one of the regions for which the image capture conditions are different, it is possible to reduce discontinuity of the image due to disparity between the first image capture conditions and the fourth image capture conditions.

Variant 9

It would also be possible to provide plurality of the image processing units 33, and to perform the image processing in parallel. For example, while image processing is being performed upon the image data captured in a region A of the image capture unit 32, image processing may also be performed upon the data captured in another region B of the image capture unit 32. The plurality of image processing units 33 may all perform the same type of image processing, or may perform different types of image processing. In other words, similar image processing may be performed by applying the same parameters and so on to the image data from the region A and to the image data from the region B, or different types of image processing may be performed by applying different parameters and so on to the image data from the region A and to the image data from the region B.

In a case in which a plurality of image processing units 33 are provided, it would be acceptable for image processing to be performed upon the image data to which the first image capture conditions have been applied with one image processing unit, while image processing is performed upon the image data to which the fourth image capture conditions have been applied with another image processing unit. In the above, the number of image processing units is not limited to being two; for example, it would also be acceptable to arrange for the same number of image processing units to be provided as the number of different sets of image capture conditions that can be set. In other words, one image processing unit may be in charge of image processing for each of the regions to which different image capture conditions have been applied. According to this Variant 9, it is possible to progress image capturing under image capture conditions that are different for each region, and also image processing for the image data of the images obtained for each of the regions described above in parallel.

Variant 10

In the above explanation, the camera 1 has been described by way of example, but it would also be possible to embody the present invention as a high function portable telephone unit 250 (refer to FIG. 20) such as a smartphone that is provided with a camera function, or as a mobile device such as a tablet terminal or the like.

Variant 11

In the embodiments described above, various examples were explained with reference to the camera 1 in which the image capture unit 32 and the control unit 34 were built as a single electronic apparatus. Instead of that, it would also be acceptable to arrange, for example, to provide the image capture unit 32 and the control unit 34 separately, and to build an image capturing system 1B so that the image capture unit 32 is controlled via communication from the control unit 34.

In the following, an example in which an imaging device 1001 that includes an image capture unit 32 is controlled from a display device 1002 that includes the control unit 34 will be explained with reference to FIG. 19.

Figure 19:
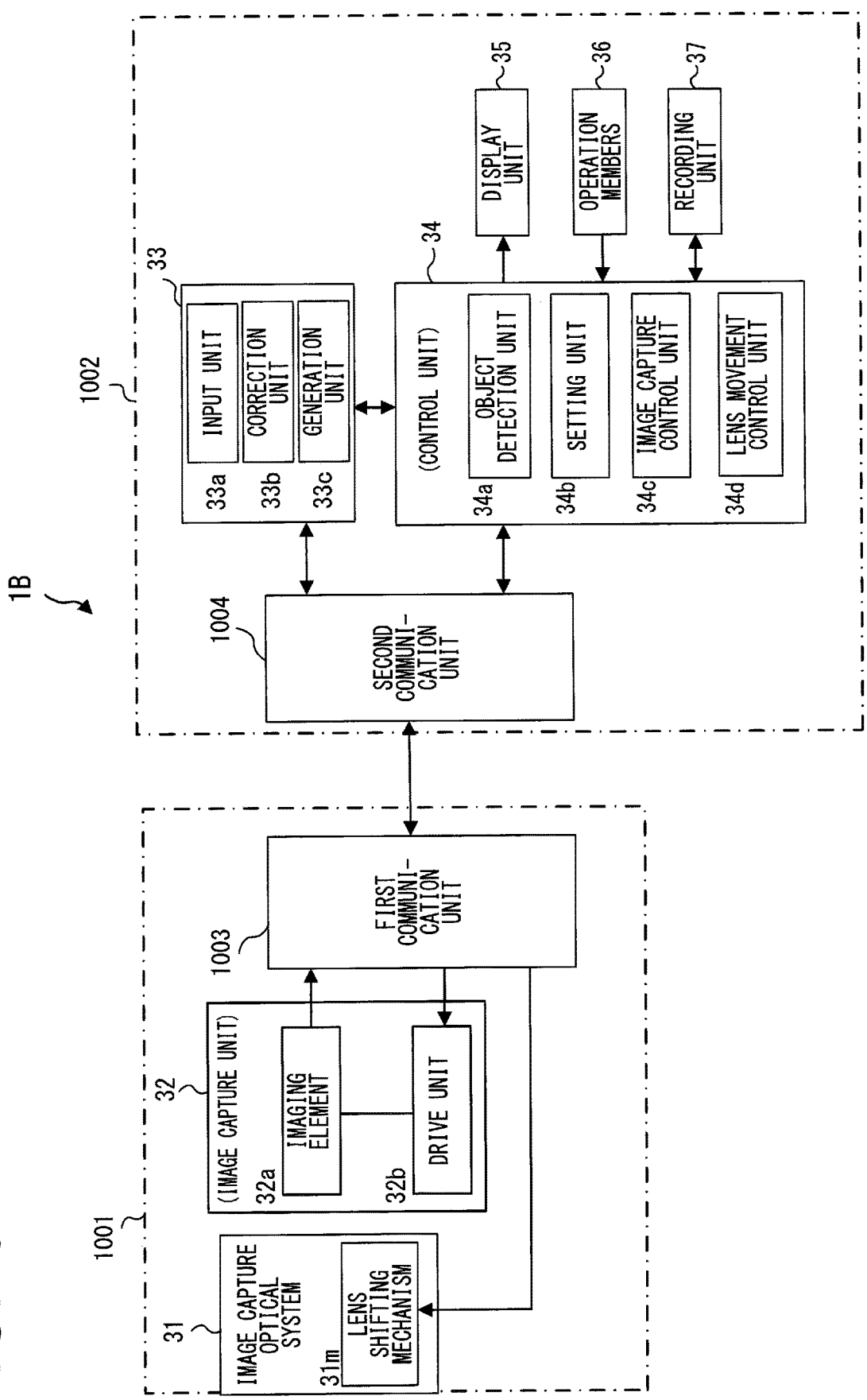
FIG. 19 is a block diagram showing an example of the structure of an image capturing system according to an eleventh variant embodiment.

FIG. 19 is a block diagram showing an example of the structure of an image capturing system 1B according to Variant 11. In FIG. 19, the image capturing system 1B comprises an imaging device 1001 and a display device 1002. In addition to comprising the image capture optical system 31 and the image capture unit 32 as explained in connection with the embodiments described above, the imaging device 1001 also comprises a first communication unit 1003. Moreover, in addition to comprising the image processing unit 33, the control unit 34, the display unit 35, the operation members 36, and the recording unit 37 as explained in connection with the embodiments described above, the display device 1002 also comprises a second communication unit 1004.

The first communication unit 1003 and the second communication unit 1004 may, for example, perform bidirectional image data communication according to a per se known wireless communication technique or according to a per se known optical communication technique.

It should be understood that it would also be acceptable for the imaging device 1001 and the display device 1002 to be connected together via a cable, and for the first communication unit 1003 and the second communication unit 1004 to be adapted to perform bidirectional image data communication with this cable.

The image capturing system 1B performs control of the image capture unit 32 by the control unit 34 performing data communication therewith via the second communication unit 1004 and the first communication unit 1003. For example, by predetermined control data being transmitted and received between the imaging device 1001 and the display device 1002, the display device 1002 may be enabled to subdivide the screen into a plurality of regions on the basis of an image, to set different image capture conditions for each of the subdivided regions, and to read out photoelectrically converted signals that have been photoelectrically converted in each of the regions as described above.

Since, according to this Variant 11, a live view image that is acquired by the imaging device 1001 and that is transmitted to the display device 1002 is displayed upon the display unit 35 of the display device 1002, accordingly the user is able to perform remote actuation at the display device 1002 while it is located at a position remote from the imaging device 1001.

The display device 1002 may, for example, be implemented by a high function portable telephone device 250 such as a smartphone. Moreover, the imaging device 1001 may be implemented by an electronic apparatus that incorporates the laminated type imaging element 100 such as described above.

It should be understood that, although an example has been explained in which the object detection unit 34*a*, the setting unit 34*b*, the image capture control unit 34*c*, and the lens movement control unit 34*d* are provided to the control unit 34 of the display device 1002, it would also be acceptable to arrange for portions of the object detection unit 34*a*, the setting unit 34*b*, the image capture control unit 34*c*, and the lens movement control unit 34*d* to be provided to the imaging device 1001.

Variant 12

Figure 20:
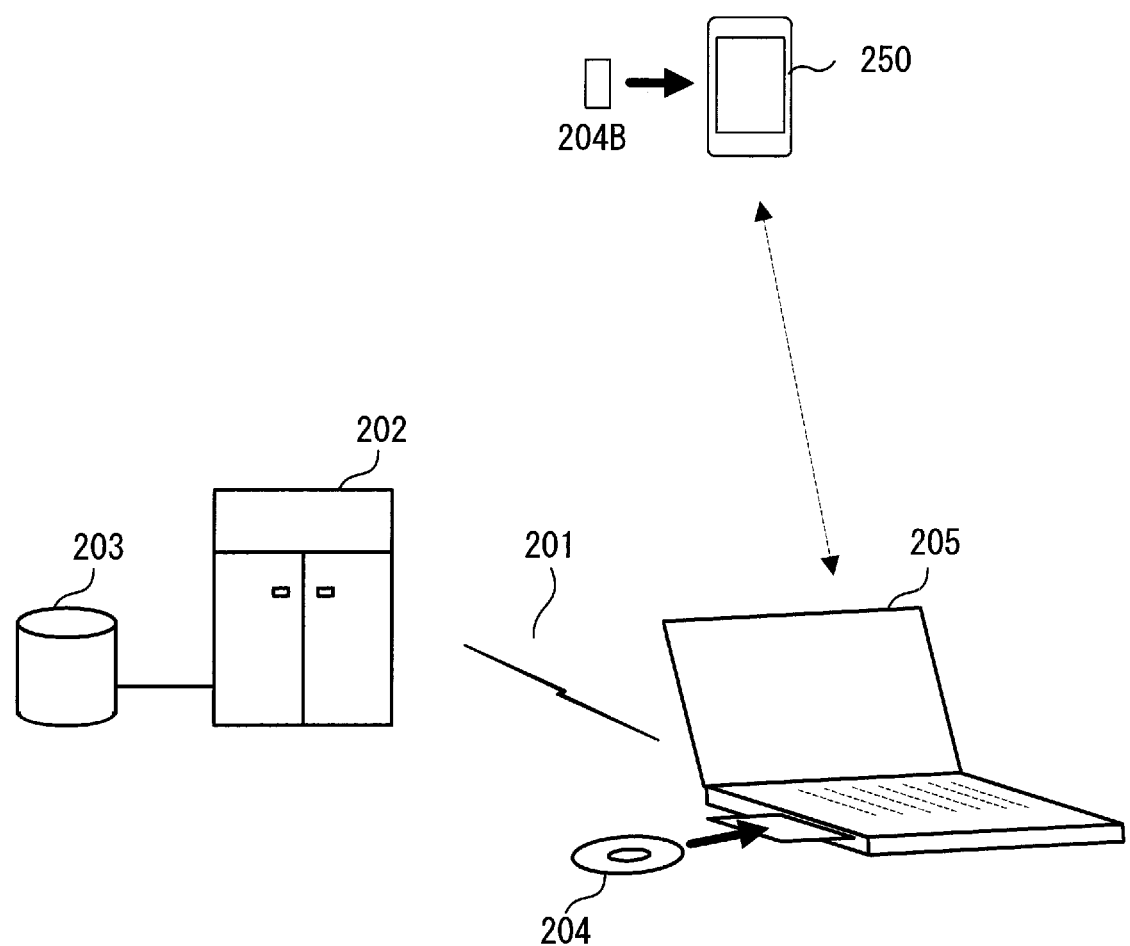
FIG. 20 is a figure for explanation of supply of a program to a mobile device.

As shown by way of example in FIG. 20, supply of the program to a mobile device such as the camera 1 described above, a high function portable telephone device, and a tablet terminal may be performed by transmission to the mobile device from a personal computer 205 in which the program is stored by infra-red communication or short distance wireless communication.

Supply of the program to the personal computer 205 may be performed by loading a recording medium 204 such as a CD-ROM or the like upon which the program is stored into the personal computer 205, or the program may be loaded onto the personal computer 205 by the method of transmission via a communication line 201 such as a network or the like. In the case of transmission via the communication line 201, the program may be stored in, for instance, a storage device 203 of a server 202 that is connected to that communication line.

Moreover, it would also be possible for the program to be directly transmitted to the mobile device via an access point of a wireless LAN (not shown in the figures) that is connected to the communication line 201. Furthermore, it would also be acceptable to arrange for a recording medium 204B such as a memory card or the like upon which the program is stored to be loaded into the mobile device. In this manner, the program may be supplied as a computer program product in various formats, such as via a recording medium or via a communication line or the like.

Second Embodiment

An example of a digital camera will now be described with reference to FIGS. 21 through 27, as one example of an electronic apparatus to which an image processing device according to the second embodiment of the present invention is provided. The same reference symbols will be appended to structural elements that are the same as ones in the first embodiment, and the explanation will principally focus upon the features of difference. Points that are not particularly explained are the same as in the first embodiment. In this embodiment, the principal difference from the first embodiment is the feature that, instead of the provision of the image processing unit 33 of the first embodiment, an image capture unit 32A further includes an image processing unit 32*c* that has a similar function to that of the image processing unit 33 of the first embodiment.

Figure 21:
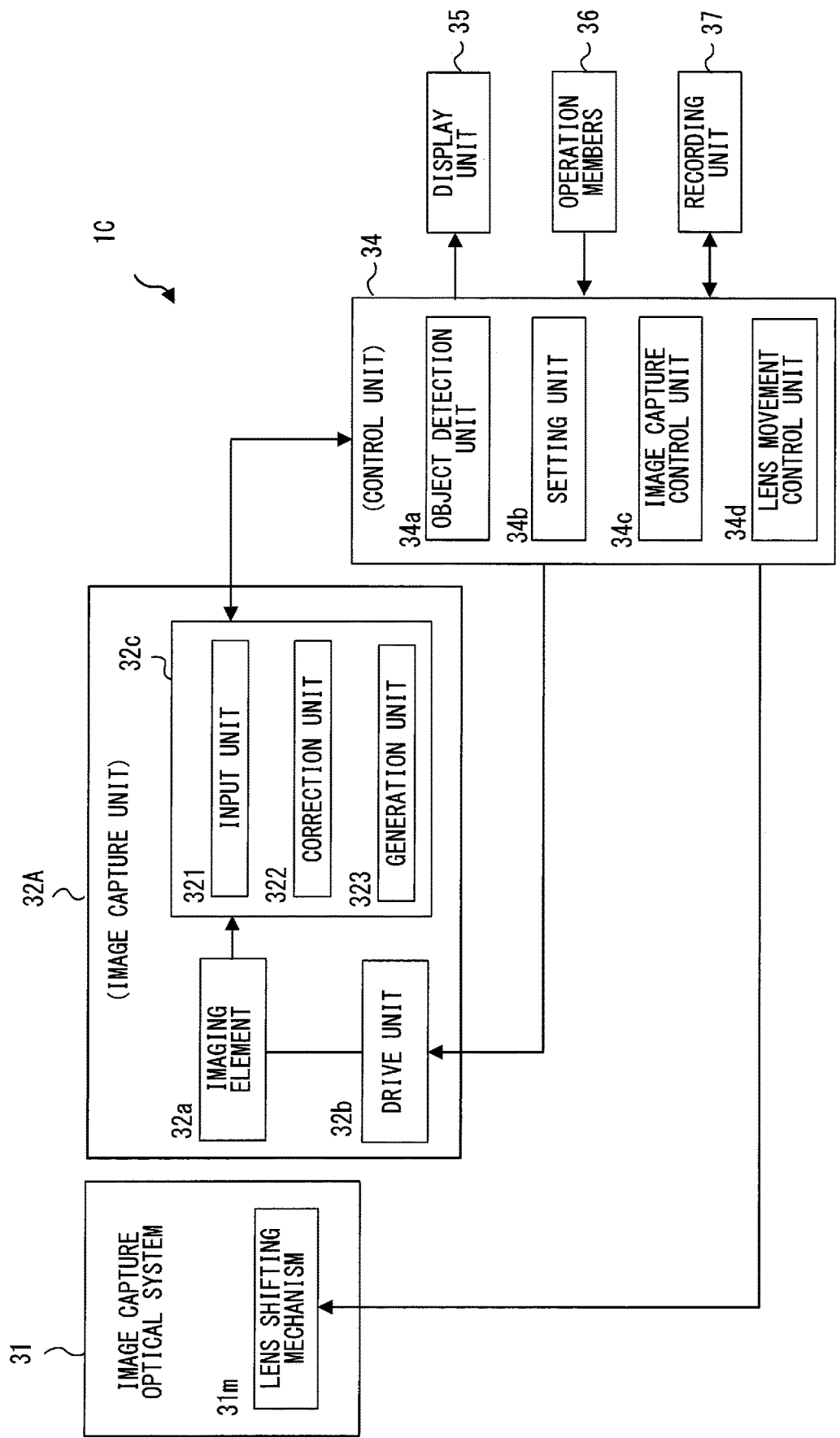
FIG. 21 is a block diagram showing an example of the structure of a camera according to a second embodiment.

FIG. 21 is a block diagram showing the structure of a camera 1C according to this second embodiment. In FIG. 21, the camera 1C comprises the image capture optical system 31, an image capture unit 32A, the control unit 34, the display unit 35, the operation members 36, and the recording unit 37. And the image capture unit 32A further comprises an image processing unit 32*c* that has a function similar to that of the image processing unit 33 of the first embodiment.

The image processing unit 32*c* includes an input unit 321, correction units 322, and a generation unit 323. Image data from the imaging element 32*a* is inputted to the input unit 321. The correction units 322 perform pre-processing for performing correction upon the input data inputted as described above. This pre-processing performed by the correction units 322 is the same as the pre-processing performed by the correction unit 33*b* in the first embodiment. The generation unit 323 performs image processing upon the inputted image data after having performed preprocessing thereupon as described above, and thereby generates an image. The image processing performed by the generation unit 323 is the same as the image processing performed by the generation unit 33*c* of the first embodiment.

Figure 22:
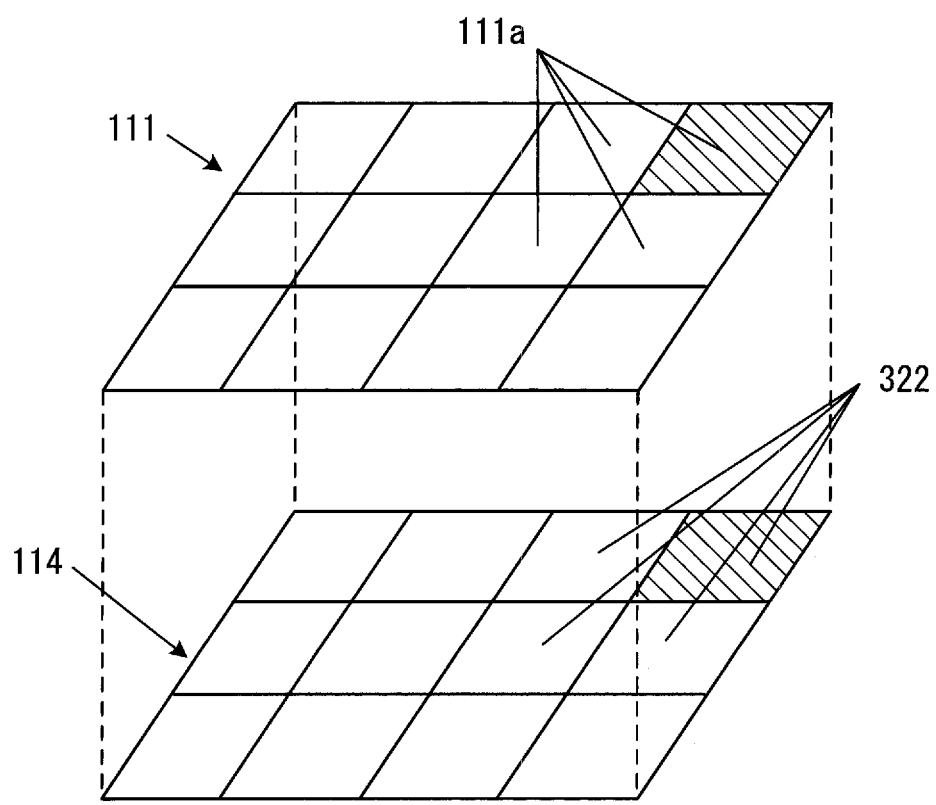
FIG. 22 is a figure schematically showing a correspondence relationship in the second embodiment between various blocks and a plurality of correction units.

FIG. 22 is a figure schematically showing a correspondence relationship between various blocks and a plurality of the correction units 322 in this second embodiment. In FIG. 22, one square shown as rectangular upon the image capture chip 111 represents one block 111*a*. Similarly, one square shown as rectangular upon an image processing chip 114 that will be described hereinafter represents a single one of the correction units 322.

In this embodiment, one of the correction units 322 is provided to correspond to each of the blocks 111*a*. To put it in another manner, one correction unit 322 is provided for each of the blocks, which are the minimum unit regions upon the imaging surface for which the image capture conditions can be changed. For example, the hatched block 111*a* in FIG. 22 is in a correspondence relationship with the hatched correction unit 322. The hatched correction unit 322 in FIG. 22 performs pre-processing upon the image data from the pixels included in the hatched block 111*a*. And each of the correction units 322 likewise performs pre-processing upon the image data from the pixels included in the respectively corresponding block 111*a*.

Since, in this manner, it is possible for the pre-processing of the image data to be performed by the plurality of correction units 322 in parallel, accordingly it is possible to reduce the processing burden upon the correction units 322, and moreover it is possible to generate an appropriate image in a short time period from the image data generated in each of the regions for which the image capture conditions are different.

It should be understood that, in the following explanation, when explaining the relationship between some block 111*a* and a pixel included in that block 111*a*, in some cases the block 111*a* may be referred to as the block 111*a* to which that pixel belongs. Moreover, the block 111*a* will sometimes be referred to as a unit subdivision, and a collection of a plurality of the blocks 111*a*, that is a collection of a plurality of unit subdivisions will sometimes be referred to as a compound subdivision.

Figure 23:
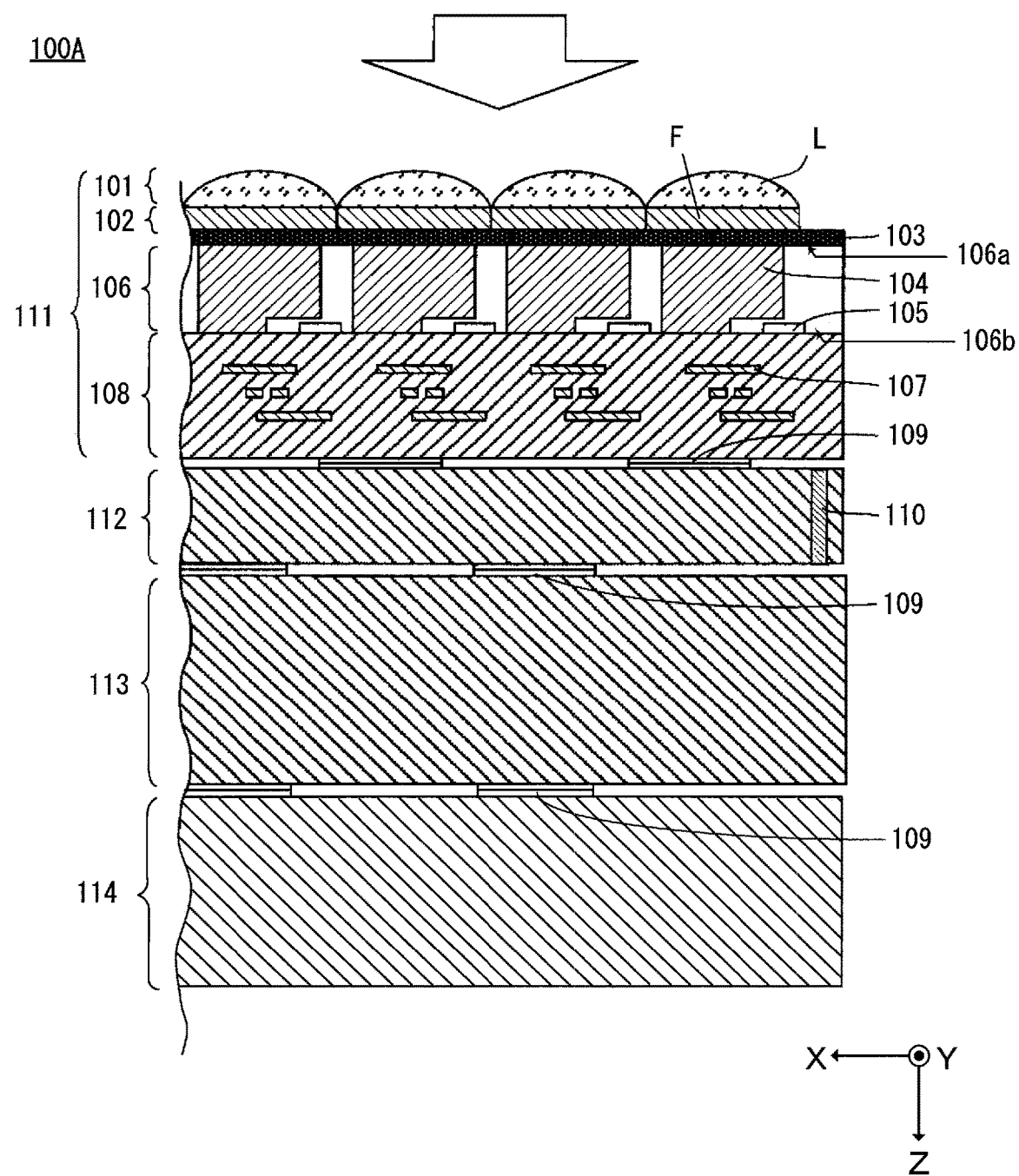
FIG. 23 is a sectional view of a laminated type imaging element.

FIG. 23 is a sectional view of a laminated type imaging element 100A. In addition to comprising the backside illuminated type image capture chip 111, the signal processing chip 112, and the memory chip 113, this laminated type imaging element 100A further comprises the image processing chip 114 that performs the pre-processing and image processing described above. In other words, the image processing unit 32c described above is provided upon the image processing chip 114.

The image capture chip 111, the signal processing chip 112, the memory chip 113, and the image processing chip 114 are laminated together, and are mutually electrically connected by electrically conductive bumps 109 that are made from Cu or the like.

A plurality of these bumps 109 are arranged on mutually opposing surfaces of the memory chip 113 and the image processing chip 114. These bumps 109 are aligned with each other, and, by for example pressing the memory chip 113 and the image processing chip 114 against each other, these bumps 109 that are mutually aligned are bonded together so as to be electrically connected together.

The First Correction Processing

In a similar manner to the case with the first embodiment, in this second embodiment it is possible, after the regions of the imaging screen have been subdivided by the setting unit 34b, to set (i.e. to change) the image capture conditions for a region selected by the user, or for a region determined by the control unit 34. And, if different image capture conditions have been set for different subdivided regions, then, according to requirements, the control unit 34 causes the correction units 322 of the image processing unit 32c to perform pre-processing.

That is, when a boundary between regions based upon a plurality of elements of the photographic subject is included in a block, which is the minimum unit for which image capture conditions can be set, and moreover clipped whites or crushed black is present in the image data for this block, then the control unit 34 causes the correction unit 322 to perform first correction processing as described below, as one type of pre-processing performed before the image processing, the focus detection processing, photographic subject detection processing, and processing for setting the image capture conditions.

1. The Same Correction is Performed for the Entire Region Where Clipped Whites or Crushed Black Has Occurred (1-1) In a similar manner to the case with the first embodiment, as the first correction processing, the correction unit 322 replaces the image data with which clipped whites or crushed black has occurred with the image data acquired for a single block within the same imaging screen, according to any of the methods (i) through (iv) described below.

(i) The correction unit 322 replaces the image data in which clipped whites or crushed black has been generated within the block for attention with the same data, by employing image data that has been acquired for a single reference block that, among the reference blocks that are positioned around the block for attention, is in the position closest to the region where clipped whites or crushed black has occurred.

(ii) The correction unit 322 replaces the image data in which clipped whites or crushed black has occurred within the block for attention with the same data by employing image data that has been acquired for a single reference block selected from the reference blocks for which, among the reference blocks positioned around the block for attention, image capture conditions (for example, the fourth image capture conditions) set most for the same photographic subject element (for example, the mountain) as the photographic subject element (the mountain) with which clipped whites or black crush has occurred are set.

(iii) Among the image data corresponding to a plurality of pixels (in the example of FIG. 8, four pixels) that have been acquired for a single reference block selected according to (i) or (ii) described above, the correction unit 322 replaces the image data having clipped whites or black crush within the block for attention by employing image data corresponding to a pixel adjacent to the pixel with which clipped whites or black crush has occurred.

(iv) The correction unit 322 replaces the image data in the block for attention with which clipped whites or black crush has occurred by employing image data generated on the basis of image data corresponding to a plurality of pixels (in the example of FIG. 8, four pixels) acquired for a single reference block that has been selected in (i) or (ii) described above.

It should be understood that the feature that, when calculating the average value of the image data, instead of performing simple averaging, it would also be acceptable to perform replacement with a weighted average value in which weights are assigned according to the distance from the pixel where clipped whites or black crush has occurred, is the same manner as in the case of the first embodiment.

Furthermore the feature is the same as in the case of the first embodiment that, instead of calculating the average value of the image data corresponding to the plurality of pixels included in the reference block, it would also be acceptable to calculate the median value of the image data corresponding to the plurality of pixels and to replace the image data corresponding to the pixels where clipped whites or black crush has occurred with this median value.

(1-2) In a similar manner to the case with the first embodiment, as the first correction processing, the correction unit 322 replaces the image data with which clipped whites or black crush has occurred by image data that has been acquired for a plurality of the reference blocks upon the same imaging screen, according to one of the following methods (i) through (iv) described below.

(i) The correction unit 322 replaces the image data items within the block for attention with which clipped whites or black crush has occurred with the same respective data, by employing the image data that has been acquired for a plurality of reference blocks that, among the reference blocks that are positioned around the block for attention, are adjacent to the region where clipped whites or black crush has occurred.

(ii) The correction unit 322 replaces the image data items having clipped whites or black crush within the block for attention with the same data by employing image data that has been acquired for a plurality of reference blocks selected from the reference blocks for which, among the reference blocks positioned around the block for attention, the image capture conditions (in this example, the fourth image capture conditions) set most for the same photographic subject element (for example, the mountain) as the photographic subject element with which clipped whites or black crush has occurred (i.e. the mountain) are set.

(iii) The correction unit 322 replaces the image data with which clipped whites or black crush has occurred by employing image data corresponding to a pixel adjacent to the pixel within the block for attention with which clipped whites or black crush has occurred, among the image data corresponding to the plurality of pixels acquired for the plurality of reference blocks selected in (i) or (ii) described above.

(iv) The correction unit 322 replaces the image data in the block for attention with which clipped whites or black crush has occurred by employing image data generated on the basis of the image data corresponding to a plurality of pixels that have been acquired for a plurality of reference blocks selected according to (i) or (ii) above.

It should be understood that, when calculating the average value of the image data, instead of performing simple averaging, the feature is the same as in the case of the first embodiment that it would also be acceptable to perform replacement with a weighted average value in which weights are assigned according to the distance from the pixel where clipped whites or black crush has occurred.

The feature that, instead of calculating the average value of the image data corresponding to a plurality of pixels included in a plurality of reference blocks, it would also be acceptable to calculate the median value of the image data corresponding to a plurality of pixels, and to replace the image data corresponding to the pixel where clipped whites or black crush has occurred with that median value, is also the same as in the case of the first embodiment.

2. A Plurality of Corrections Are Made for the Entire Region Where Clipped Whites or Black Crush Has Occurred (2-1) As in the case of the first embodiment, as the first correction processing, the correction unit 322 replaces the image data in the block for attention for which clipped whites or black crush has occurred with the image data acquired for a single reference block, according to one of the methods (i) through (iii) described below.

(i) The correction unit 322 replaces a plurality of image data items within the block for attention for which clipped whites or black crush has occurred with respectively different data by employing the image data corresponding to pixels adjacent to the pixels with which clipped whites or black crush has occurred among the reference blocks that are positioned around the block for attention.

(ii) The correction unit 322 replaces a plurality of image data items within the block for attention with which clipped whites or black crush has occurred with respectively different data by employing image data that has been acquired for a single reference block selected from the reference blocks for which, among the reference blocks positioned around the block for attention, the image capture conditions (in this example, the fourth image capture conditions) set most for the same photographic subject element (for example, the mountain) as the photographic subject element (the mountain) with which clipped whites or black crush has occurred are set.

(iii) The correction unit 322 replaces a plurality of image data items within the block for attention with which clipped whites or black crush has occurred with respectively different data by employing image data that has been generated on the basis of image data corresponding to a plurality of pixels (in the FIG. 8 example, four pixels) acquired for a single reference block selected in (i) or (ii) described above.

It should be understood that, when calculating the average value of the image data, instead of performing simple averaging, it would also be acceptable to perform replacement with a weighted average value in which weights are assigned according to the distance from the pixel where clipped whites or black crush has occurred, as in the case of the first embodiment.

(2-2) In a similar manner to the case with the first embodiment, as the first correction processing, the correction unit 322 replaces the image data with which clipped whites or black crush has occurred by employing image data acquired for a plurality of reference blocks within the same imaging screen, according to one of the methods (i) through (iv) described below.

(i) The correction unit 322 replaces a plurality of image data items within the block for attention for which clipped whites or black crush has occurred with respectively different data by employing image data acquired for a plurality of reference blocks that, among the reference blocks that are positioned around the block for attention, are near the region where clipped whites or black crush has occurred.

(ii) The correction unit 322 replaces a plurality of image data items within the block for attention with which clipped whites or black crush has occurred with respectively different data by employing image data that has been acquired for a plurality of reference blocks selected from the reference blocks for which, among the reference blocks positioned around the block for attention, the image capture conditions (in this example, the fourth image capture conditions) set most for the same photographic subject element (for example, the mountain) as the photographic subject element (the mountain) with which clipped whites or black crush has occurred are set.

(iii) The correction unit 322 replaces the image data item within the block for attention with which clipped whites or black crush has occurred by employing image data that has been generated on the basis of image data corresponding to a plurality of pixels acquired for a plurality of reference blocks selected in (i) or (ii) described above.

It should be understood that, when calculating the average value of the image data, instead of performing simple averaging, the feature that it would also be acceptable to perform replacement with a weighted average value in which weights are assigned according to the distance from the pixel where clipped whites or black crush has occurred, is the same as in the case of the first embodiment.

The feature that, instead of calculating the average value of the image data corresponding to a plurality of pixels included in a plurality of reference blocks, it would also be acceptable to calculate the median value of the image data corresponding to a plurality of pixels, and to replace the image data corresponding to the pixel where clipped whites or black crush has occurred with that median value, is also the same as in the case of the first embodiment.

With respect to which correction methods should be performed among the methods of the first correction processing explained above, the control unit 34 may, for example, make a decision on the basis of the state of setting by the operation members 36 (including operation menu settings).

It should be understood that it would also be acceptable to arrange for the control unit 34 to determine which of the various methods of the first correction processing explained above should be performed, according to the scene imaging mode that is set for the camera 1, or according to the type of photographic subject element that has been detected.

The Second Correction Processing

Before performing the image processing, the focus detection processing, the photographic subject detection processing (for detecting the elements of the photographic subject), and the processing for setting the image capture conditions, the control unit 34 instructs the correction unit 322 to perform the following second correction processing, according to requirements.

1. When Performing Image Processing 1-1. When the Image Capture Conditions for the Pixel for Attention P Are the Same as the Image Capture Conditions for a Plurality of Reference Pixels Pr Around the Pixel for Attention P In this case, in the image processing unit 32c, the second correction processing is not performed by the correction unit 322, and the generation unit 323 performs image processing by employing the image data for the plurality of reference pixels Pr upon which the second correction processing has not been performed.

1-2. When the Image Capture Conditions for the Pixel for Attention P and the Image Capture Conditions for at Least one Reference Pixel Pr Among the Plurality of Reference Pixels Pr Around the Pixel for Attention P are Different The image capture conditions that have been applied to the pixel for attention P are taken as being the first image capture conditions, and, with the image capture conditions that have been applied to a part of the plurality of reference pixels Pr being these first image capture conditions, the image capture conditions that have been applied to the remainder of the plurality of reference pixels Pr are the second image capture conditions.

In this case, the correction unit 322 corresponding to the block 111a of the reference pixels Pr to which the second image capture conditions have been applied performs the second correction processing upon the image data for the reference pixels Pr to which those second image capture conditions have been applied, as exemplified by the following Example 1 through Example 3. And the generation unit 323 then performs image processing to calculate the image data for the pixel for attention P by referring to the image data for the reference pixels Pr to which the first image capture conditions have been applied and to the reference data for the reference pixels Pr after this second correction processing.

EXAMPLE 1

If, for example, only the ISO sensitivity is different between the first image capture conditions and the fourth image capture conditions, with the ISO sensitivity of the first image capture conditions being 100 while the ISO sensitivity of the second image capture conditions is 800, then, as the second correction processing, the correction unit 322 of the block 111a of the reference pixels Pr to which the second image capture conditions have been applied performs multiplication by 100/800 upon the image data for those reference pixels Pr. By doing this, the disparity between the image data due to discrepancy in the image capture conditions is reduced.

EXAMPLE 2

And if, for example, only the shutter speed is different between the first image capture conditions and the second image capture conditions, with the shutter speed of the first image capture conditions being $1/1000$ second while the shutter speed of the second image capture conditions is $1/100$ second, then, as the second correction processing, the correction unit 322 of the block 111a of the reference pixels Pr to which the second image capture conditions have been applied performs multiplication by $1/1000 / 1/100 = 1/10$ upon the image data for those reference pixels Pr. By doing this, the disparity between the image data due to discrepancy in the image capture conditions is reduced.

EXAMPLE 3

The case is assumed that only the frame rate is different between the first image capture conditions and the second image capture conditions (the charge accumulation time being the same), with the frame rate of the first image capture conditions being 30 fps while the frame rate of the second image capture conditions is 60 fps. Then, as the second correction processing, the correction unit 322 corresponding to the block 111a of the reference pixels Pr to which the second image capture conditions have been applied employs image data for a frame image whose acquisition start timing is close to that of a frame image that was acquired under the first image capture conditions (at 30 fps), among the image data for the reference pixels Pr acquired under the second image capture conditions (at 60 fps). By doing this, the disparity between the image data due to discrepancy in the image capture conditions is reduced.

It should be understood that it would also be acceptable to perform the second correction processing to calculate the image data of a frame image whose acquisition start timing is close to that of a frame image that was acquired under the first image capture conditions (at 30 fps) through interpolation based on a plurality of previous and subsequent frame images that were acquired under the second image capture conditions (at 60 fps).

Moreover, it should be noted that the same applies to the case in which the image capture conditions that have been applied to the pixel for attention P are taken as being the second image capture conditions, while the image capture conditions that have been applied to the reference pixels Pr around the pixel for attention P are taken as being the first image capture conditions. In other words, in this case, the correction unit 322 corresponding to the block 111a of the reference pixels Pr to which the first image capture conditions have been applied performs the second correction processing upon the image data for those reference pixels Pr, as exemplified by Example 1 through Example 3 described above.

It should be understood that, as described above, even if there are some moderate differences in the image capture conditions, still they are regarded as being the same image capture conditions.

The generation unit 323 performs image processing such as pixel defect correction processing, color interpolation processing, contour enhancement processing, noise reduction processing, and so on in a similar manner to the operation of the generation unit 33c of the image processing unit 33 in the first embodiment described above, on the basis of the image data for the reference pixels Pr to which the same image capture conditions have been applied as the image capture conditions for the pixel for attention P, and the image data for the reference pixels Pr for which the second correction processing has been performed by the correction unit 322.

Figure 24:
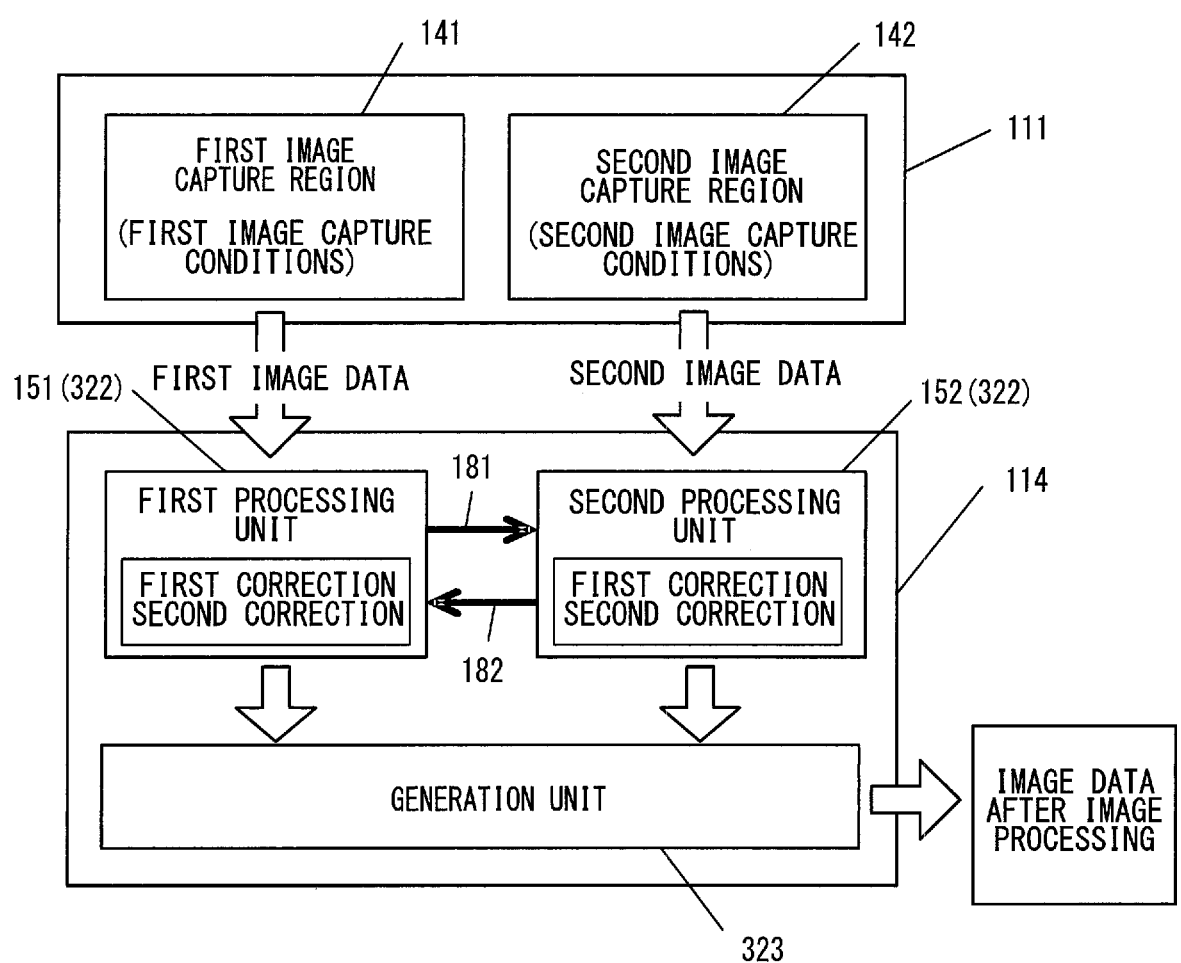
FIG. 24 is a figure relating to image processing, schematically showing processing of first image data and second image data.

FIG. 24 is a figure schematically showing processing of image data (hereinafter referred to as "first image data") from pixels included in a partial region of the imaging surface to which the first image capture conditions have been applied (hereinafter referred to as a "first image capture region 141") and of image data (hereinafter referred to as "second image data") from pixels included in a partial region of the imaging surface to which the second image capture conditions have been applied (hereinafter referred to as "second image capture region 142").

The first image data captured under the first image capture conditions is outputted from each of the pixels included in the first image capture region 141, and the second image data captured under the second image capture conditions is outputted from each of the pixels included in the second image capture region 142. The first image data is outputted to those correction units 322 that, among the correction units 322 provided to the image processing chip 114, correspond to the blocks 111*a* to which the pixels that generated the first image data belong. In the following explanation, the plurality of correction units 322 that correspond to the plurality of blocks 111*a* to which the pixels that generated the first image data belong will be referred to as a "first processing unit 151".

According to requirements, the first processing unit 151 performs upon the first image data the first correction processing described above and also the second correction processing described above, or either the first correction processing described above or the second correction processing described above.

Similarly, the second image data is outputted to those correction units 322 that, among the correction units 322 provided to the image processing chip 114, correspond to the blocks 111*a* to which the pixels that generated the second image data belong. In the following explanation, the plurality of correction units 322 that correspond to the plurality of blocks 111*a* to which the pixels that generated the second image data belong will be referred to as a "second processing unit 152".

According to requirements, the second processing unit 152 performs upon the second image data the first correction processing described above and also the second correction processing described above, or either the first correction processing described above or the second correction processing described above.

In the first correction processing described above, for example, when the block for attention is included in the first image capture region 141, then the first correction processing described above, in other words the replacement processing, is performed by the first processing unit 151, as shown in FIG. 24. In this manner, the image data within the block for attention with which clipped whites or black crush has occurred is replaced with the second image data from a reference block that is included in the second image capture region 142. For this, the first processing unit 151 receives the second image data from the reference block as, for example, information 182 from the second processing unit 152.

In the second correction processing described above, for example, if the pixel for attention P is included in the first image capture region 141, then the second correction processing described above is performed by the second processing unit 152 upon the second image data from the reference pixels Pr included in the second image capture region 142, as shown in FIG. 24. It should be understood that, for example, the second processing unit 152 receives information 181 from the first processing unit 151 related to the first image capture conditions, required for reducing the disparity between the image data due to discrepancy in the image capture conditions.

In a similar manner, for example, if the pixel for attention P is included in the second image capture region 142, then the second correction processing described above is performed upon the first image data from the reference pixels Pr included in the first image capture region 141 by the first processing unit 151. It should be understood that, for example, the first processing unit 151 receives information from the second processing unit 152 related to the second image capture conditions, required for reducing the disparity between the image data due to discrepancy in the image capture conditions.

It should be understood that, if the pixel for attention P and the reference pixels Pr are included in the first image capture region 141, then the first processing unit 151 does not perform the second correction processing upon the first image data from those reference pixels Pr. In a similar manner, if the pixel for attention P and the reference pixels Pr are included in the second image capture region 142, then the second processing unit 152 does not perform the second correction processing upon the second image data from those reference pixels Pr.

Alternatively, it would also be acceptable to arrange for both the image data captured under the first image capture conditions and also the image data captured under the second image capture conditions to be corrected by the first processing unit 151 and the second processing unit 152, respectively. In other words it would be acceptable to reduce the disparity in the image due to discrepancy between the first image capture conditions and the second image capture conditions, by performing the second correction processing upon each of the image data for the position of attention that was captured under the first image capture conditions, and the image data that, among the image data for the reference positions, was captured under the first image conditions, and also upon the image data that, among the image data for the reference positions, was captured under the second image conditions.

For example, in Example 1 described above, the image data for the reference pixels Pr under the first image capture conditions (ISO sensitivity being 100) is multiplied by 400/100 as the second correction processing, while the image data for the reference pixels Pr under the second image capture conditions (ISO sensitivity being 800) is multiplied by 400/800 as the second correction processing. In this manner, the disparity between the image data due to discrepancy in the image capture conditions is reduced. It should be understood that second correction processing is performed upon the pixel data of the pixel for attention by applying multiplication by 100/400 after color interpolation processing. By this second correction processing, it is possible to change the pixel data of the pixel for attention after color interpolation processing to a value similar to the value in the case of image capture under the first image capture conditions. Furthermore, in Example 1 described above, it would also be acceptable to change the level of the second correction processing according to the distance from the boundary between the first region and the second region. And it is possible to reduce the rate by which the image data increases or decreases due to the second correction processing as compared to the case of Example 1 described above, and to reduce the noise generated due to the second correction processing. Although the above explanation has referred to the previously described Example 1, it could be applied in a similar manner to the previously described Example 2.

On the basis of the image data from the first processing unit 151 and from the second processing unit 152, the generation unit 323 performs image processing such as pixel defect correction processing, color interpolation processing, contour enhancement processing, noise reduction processing, and so on, and outputs the image data after image processing.

It should be understood that, when the pixel for attention P is positioned in the second image capture region 142, it would be acceptable to arrange for the first processing unit 151 to perform the second correction processing upon the first image data from all of the pixels that are included in the first image capture region 141; or, alternatively, it would also be acceptable to arrange for the second correction processing to be performed only upon the first image data from those pixels which, among the pixels included in the first image capture region 141, may be employed in interpolation of the pixel for attention P in the second image capture region 142. In a similar manner, when the pixel for attention P is positioned in the first image capture region 141, it would be acceptable to arrange for the second processing unit 152 to perform the second correction processing upon the second image data from all of the pixels that are included in the second image capture region 142; or, alternatively, it would also be acceptable to arrange for the second correction processing to be performed only upon the second image data from those pixels which, among the pixels included in the second image capture region 142, may be employed in interpolation of the pixel for attention P in the first image capture region 141.

2. When Performing Focus Detection Processing

In a similar manner to the case with the first embodiment, the lens movement control unit 34d of the control unit 34 performs focus detection processing by employing the signal data (i.e. the image data) corresponding to a predetermined position upon the imaging screen (the point of focusing). It should be understood that, if different image capture conditions are set for different ones of the various subdivided regions, and if the point of focusing for A/F operation is positioned at a boundary portion between several subdivided regions, in other words if the point of focusing is divided into two by the first region and the second region, then, in this embodiment, as explained in 2-2 below, the lens movement control unit 34d of the control unit 34 causes the correction units 322 to perform the second correction processing upon the signal data for focus detection of at least one of those regions.

2-1. The Case in Which Signal Data to Which the First Image Capture Conditions Have Been Applied and Signal Data to Which the Second Image Capture Conditions Have Been Applied Are Not Mixed Together in the Signal Data from the Pixels within the Frame 170 in FIG. 15

In this case, the correction unit 322 does not perform the second correction processing, and the lens movement control unit 34d of the control unit 34 performs focus detection processing by employing the signal data from the pixels for focus detection shown by the frame 170 just as it is without modification.

2-2. The Case in Which Signal Data to Which the First Image Capture Conditions Have Been Applied and Signal Data to Which the Second Image Capture Conditions Have Been Applied Are Mixed Together in the Signal Data from the Pixels within the Frame 170 in FIG. 15

In this case, the lens movement control unit 34d of the control unit 34 instructs to perform the second correction processing with the correction unit 322 that corresponds to the block 111a of the pixels to which, among the pixels within the frame 170, the second image capture conditions have been applied, as shown in Example 1 through Example 3 below. And the lens movement control unit 34d of the control unit 34 performs focus detection processing by employing the signal data from the pixels to which the first image capture conditions have been applied, and the above signal data after the second correction processing.

EXAMPLE 1

For example, if the first image capture conditions and the second image capture conditions only differ by ISO sensitivity, with the ISO sensitivity of the first image capture conditions being 100 while the ISO sensitivity of the second image capture conditions is 800, then the correction unit 322 corresponding to the block 111a of the pixels to which the second image capture conditions have been applied performs the second correction processing by multiplying the signal data that was captured under the second image capture conditions by 100/800. By doing this, disparity between the signal data due to discrepancy in the image capture conditions is reduced.

EXAMPLE 2

For example, if the first image capture conditions and the second image capture conditions only differ by shutter speed, with the shutter speed of the first image capture conditions being $1/1000$ second while the shutter speed of the second image capture conditions is $1/100$ second, then the correction unit 322 corresponding to the block 111a of the pixels to which the second image capture conditions have been applied may perform the second correction processing by multiplying the signal data that was captured under the second image capture conditions by $1/1000 / 1/100 = 1/10$. By doing this, disparity between the signal data due to discrepancy in the image capture conditions is reduced.

EXAMPLE 3

For example, if the first image capture conditions and the second image capture conditions only differ by frame rate (the charge accumulation time being the same), with the frame rate of the first image capture conditions being 30 fps while the frame rate of the second image capture conditions is 60 fps, then for example, as the second correction processing for the signal data that was captured under the second image conditions (i.e. at 60 fps), the correction unit 322 corresponding to the block 111a of the pixels to which the second image capture conditions have been applied employs signal data for a frame image whose starting timing of acquisition is close to that of a frame image that was acquired under the first image capture conditions (at 30 fps). By doing this, disparity between the signal data due to discrepancy in the image capture conditions is reduced.

It should be understood that, for the second correction processing, it would also be acceptable to calculate the signal data for a frame image whose starting timing of acquisition is close to that of a frame image acquired under the first image capture conditions (i.e. at 30 fps) through interpolation based on a plurality of previous and subsequent frame images acquired under the second image capture conditions (i.e. at 60 fps).

Moreover, it should be noted that, as mentioned above, even if there are some moderate differences in the image capture conditions, still they are regarded as being the same image capture conditions.

Furthermore while, in the examples described above, explanation was made in which the second correction processing was performed upon the signal data that, among the signal data, was captured according to the second image capture conditions, it would also be acceptable to perform the second correction processing upon the signal data that, among the signal data, was captured according to the first image capture conditions.

Yet further, it would also be acceptable to arrange to reduce the difference between the two sets of signal data after the second correction processing, by performing the second correction processing upon, among the signal data, both the signal data that was captured under the first image capture conditions and also the signal data that was captured under the second image conditions.

Figure 25:
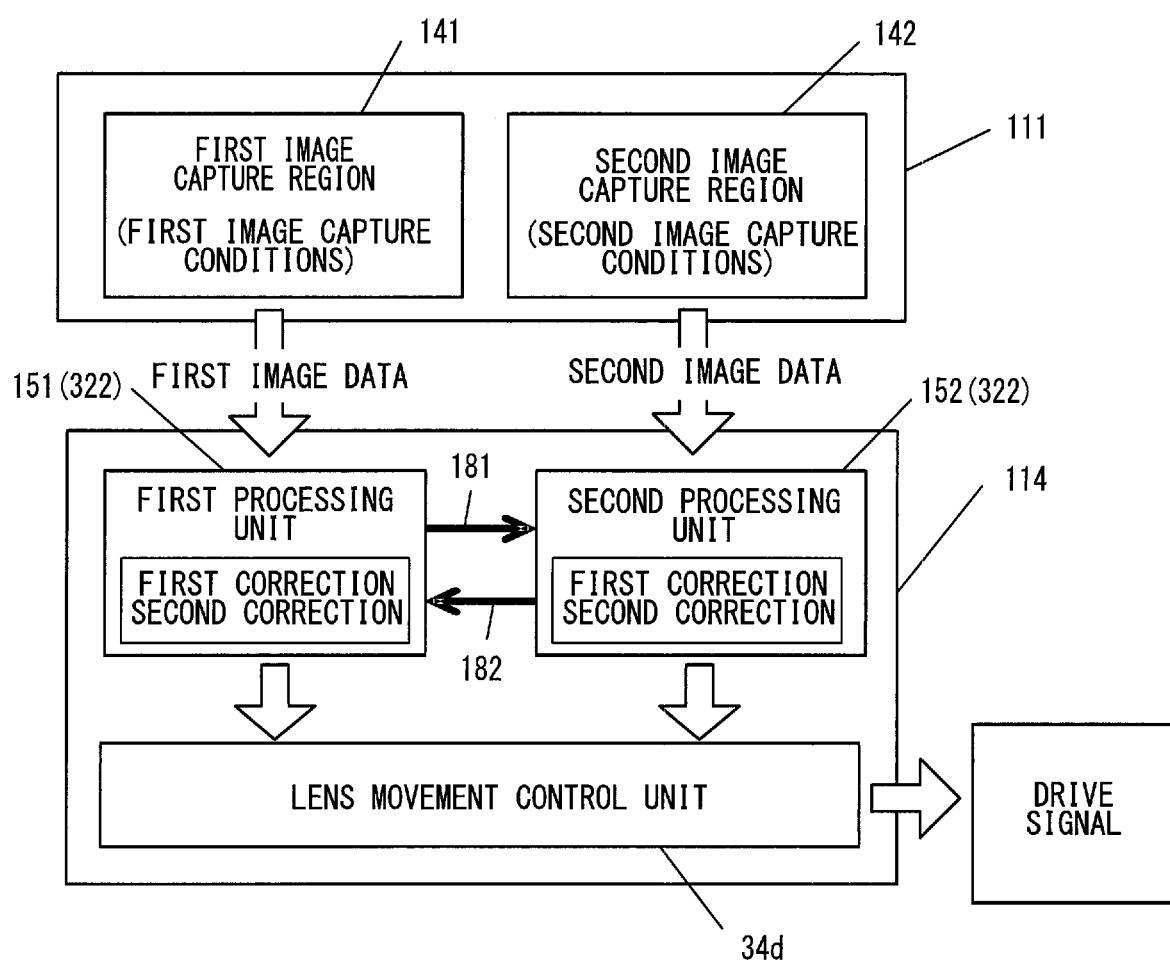
FIG. 25 is a figure relating to focus detection processing, schematically showing processing of first image data and second image data.

FIG. 25 is a figure relating to focus detection processing, schematically showing processing of the first signal data and the second signal data.

The first image data captured under the first image capture conditions is outputted from each of the pixels included in the first image capture region 141, and the second image data captured under the second image capture conditions is outputted from each of the pixels included in the second image capture region 142. The first signal data from the first image capture region 141 is outputted to the first processing unit 151. In a similar manner, the second signal data from the second image capture region 142 is outputted to the second processing unit 152.

According to requirements, the first processing unit 151 performs upon the first image data the first correction processing described above and also the second correction processing described above, or either the first correction processing described above or the second correction processing described above. And, according to requirements, the second processing unit 152 performs upon the second image data the first correction processing described above and also the second correction processing described above, or either the first correction processing described above or the second correction processing described above.

In the first correction processing described above, for example, when the block for attention is included in the first image capture region 141, then the first correction processing described above, in other words the replacement processing, is performed by the first processing unit 151, as shown in FIG. 25. Due to this, the first signal data within the block for attention with which clipped whites or black crush has occurred is replaced with the second image data from a reference block that is included in the second image capture region 142. For this, the first processing unit 151 receives the second image data from the reference block as, for example, information 182 from the second processing unit 152.

In the second correction processing described above, if the second correction processing is to be performed upon the signal data that, among the signal data, was captured under the second image capture conditions in order to reduce the difference between the signal data after the second correction processing and the signal data that was captured under the first image capture conditions is reduced, then the second processing unit 152 takes charge of the processing. The second processing unit 152 performs the second processing described above upon the second signal data from the pixels included in the second image capture region 142. It should be understood that, for example, the second processing unit 152 receives information 181 from the first processing unit 151 related to the first image capture conditions, required for reducing the disparity between the signal data due to discrepancy in the image capture conditions.

It should be understood that if the second correction processing is performed upon that signal data that, among the signal data, was captured under the second image capture conditions in order to reduce the difference between the signal data after the second correction processing and the signal data that was captured under the first image capture conditions, then the first processing unit 151 does not perform the second correction processing upon the first signal data.

Moreover if the second correction processing is to be performed upon the signal data that, among the signal data, was captured under the first image capture conditions in order to suppress the difference between the signal data after the second correction processing and the signal data that was captured under the first image capture conditions, then the first processing unit 151 takes charge of the processing. The first processing unit 151 performs the second correction processing described above upon the first signal data from the pixels that are included in the first image capture region 141. It should be understood that the first processing unit 151 receives information from the second processing unit 152 related to the second image capture conditions that is required for reducing disparity between the signal data due to discrepancy in the image capture conditions.

It should be understood if the second correction processing is performed upon the signal data that, among the signal data, was captured under the first image capture conditions in order to reduce the difference between the signal data after the second correction processing and the signal data that was captured under the first image capture conditions, then the second processing unit 152 does not perform the second correction processing upon the second signal data.

Even further when the second correction processing is performed both upon the signal data that, among the signal data, was captured under the first image capture conditions and also upon the signal data that was captured under the second image capture conditions in order to suppress the difference between both sets of signal data after the second correction processing, then the first processing unit 151 and the second processing unit 152 both perform the processing. The first processing unit 151 performs the second correction processing described above upon the first signal data from the pixels included in the first image capture region 141, and the second processing unit 151 performs the second correction processing described above upon the second signal data from the pixels included in the second image capture region 142.

The lens movement control unit 34d performs focus detection processing on the basis of the signal data from the first processing unit 151 and from the second processing unit 152, and outputs a drive signal for shifting the focusing lens of the image capture optical system 31 to its focusing position on the basis of the calculation result of the processing.

3. When Performing Photographic Subject Detection Processing

If different image capture conditions are set for the different subdivided regions and the search range 190 includes a boundary between the subdivided regions, then, in this embodiment, as explained in 3-2. below, the object detection unit 34a of the control unit 34 causes the correction unit 322 to perform the second correction processing upon the image data for at least one of the regions within the search range 190.

3-1. When Image Data to Which the First Image Capture Conditions Have Been Applied and Image Data to Which the Second Image Capture Conditions Have Been Applied Are Not Mixed Together in the Image Data for the Search Range 190

In this case, the correction unit 322 does not perform the second correction processing, and the object detection unit 34a of the control unit 34 performs photographic subject detection processing by employing the image data that constitutes the search range 190 just as it is without modification.

3-2. When Image Data to Which the First Image Capture Conditions Have Been Applied and Image Data to Which the Second Image Capture Conditions Have Been Applied Are Mixed Together in the Image Data for the Search Range 190

In this case, the object detection unit 34a of the control unit 34 causes the correction unit 322 corresponding to the block 111a of the pixels, in the image for the search range 190, to which the second image capture conditions have been applied to perform the second control processing as in Example 1 through Example 3 described above in association with the focus detection processing. And the object detection unit 34a of the control unit 34 performs photographic subject detection processing by employing the image data for the pixels to which the first conditions were applied, and the image data after the second correction processing.

Figure 26:
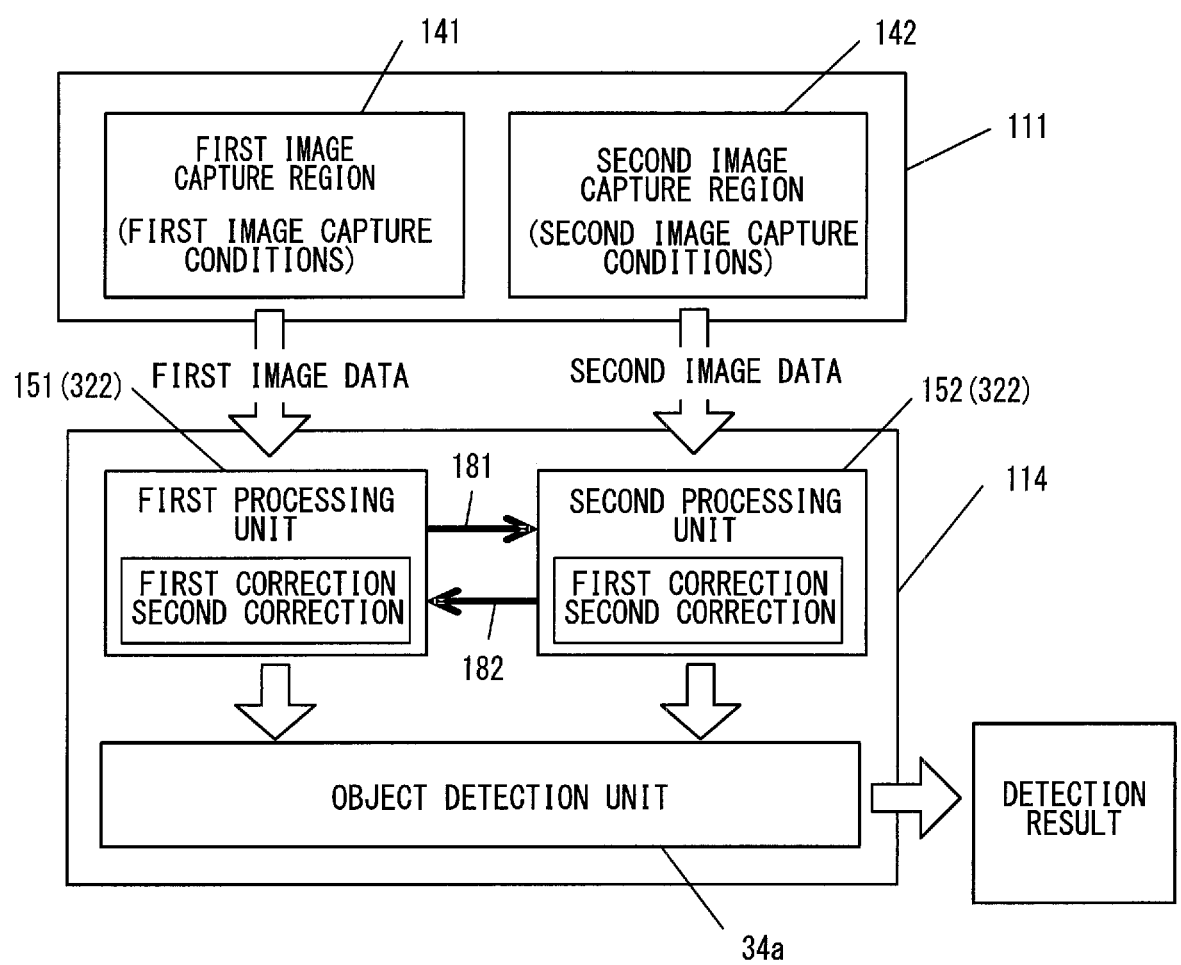
FIG. 26 is a figure relating to photographic subject detection processing, schematically showing processing of first image data and second image data.

FIG. 26 is a figure relating to photographic subject detection processing, schematically showing processing of the first image data and the second image data.

In the first correction processing described above, if for example the block for attention is included in the first image capture region 141, then the first correction processing, in other words the replacement processing, is performed by the first processing unit 151, as shown in FIG. 26. In this manner, the first image data in the block for attention with which clipped whites or black crush has occurred is replaced with the second image data from the reference block included in the second image capture region 142. For this, the first processing unit 151 receives the second image data from the reference block, for example as information 182 from the second processing unit 152.

And, in regard to the second correction processing, the second correction processing performed by the first processing unit 151 and/or the second processing unit 152 is the same as the second correction processing described above in FIG. 25 for the case of performing the focus detection processing.

The object detection unit 34 performs processing to detect the elements of the photographic subject on the basis of the image data from the first processing unit 151 and from the second processing units 152, and outputs the results of this detection.

4. When Performing Setting of the Image Capture Conditions

Cases will now be explained in which the imaging screen is subdivided into regions for which different image capture conditions are set, and exposure conditions are determined by newly performing photometry.

4-1. When Image Data to Which the First Image Capture Conditions Have Been Applied and Image Data to Which the Second Image Capture Conditions Have Been Applied Are Not Mixed Together in the Image Data for the Photometric Range In this case, the correction unit 322 does not perform the second correction processing, and the setting unit 34b of the control unit 34 performs the exposure calculation processing by employing the image data for the photometric range just as it is without alteration.

4-2. When Image Data to Which the First Image Capture Conditions Have Been Applied and Image Data to Which the Second Image Capture Conditions Have Been Applied Are Mixed Together in the Image Data for the Photometric Range In this case, the setting unit 34b of the control unit 34 instructs the correction unit 322 corresponding to the block 111a of the pixels, among the image data for the photometric range, to which the second image capture conditions have been applied to perform the second correction processing as described above in Example 1 through Example 3 in association with the focus detection processing. And the setting unit 34b of the control unit 34 performs the exposure calculation processing by employing the image data after this second correction processing.

Figure 27:
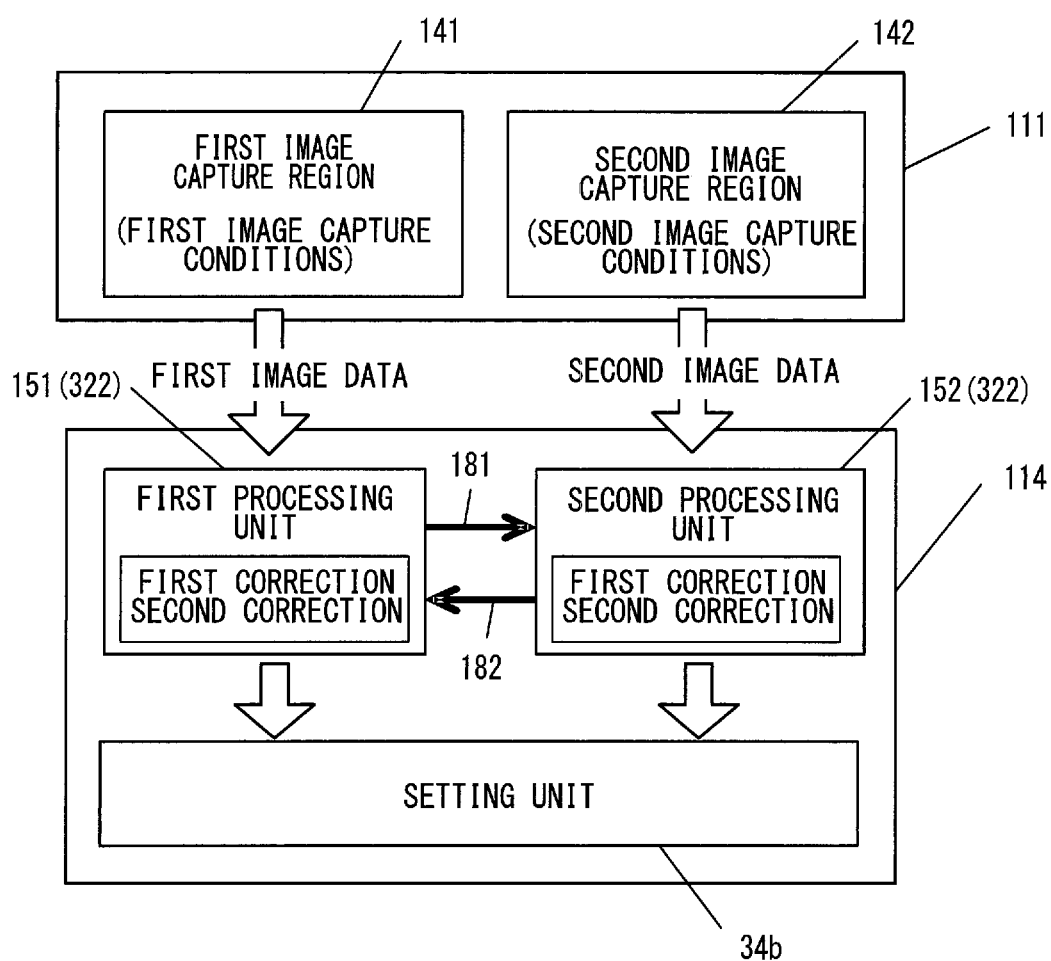
FIG. 27 is a figure relating to setting of image capture conditions such as exposure calculation processing and so on, schematically showing processing of first image data and second image data.

FIG. 27 is a figure relating to setting of image capture conditions such as exposure calculation processing and so on, schematically showing processing of the first image data and the second image data.

In the first correction processing described above, if for example the block for attention is included in the first image capture region 141, then, as shown in FIG. 27, the first correction processing described above, in other words the replacement processing, is performed by the first processing unit 151. In this manner, the first image data in the block for attention with which clipped whites or black crush had occurred is replaced by the second image data from the reference block included in the second image capture region 142. And, for this, the first processing unit 151 receives second image data from the reference block, for example as information 182 from the second processing unit 152.

In this second correction processing, the second correction processing that is performed by the first processing unit 151 and/or the second processing unit 152 is the same as the second correction processing for the case of performing the focus detection processing in FIG. 25 described above.

On the basis of the image data from the first processing unit 151 and from the second processing unit 152, the setting unit 34b performs calculation processing for image capture conditions, such as exposure calculation processing and so on, subdivides, on the basis of the result of this calculation, the imaging screen of the image capture unit 32 into a plurality of regions including elements of the photographic subject that have been detected, and re-sets the image capture conditions for this plurality of regions.

According to the second embodiment as explained above, the following advantageous operational effects are obtained.

(1) The image processing unit 32c comprises the first processing unit 151 that performs generation of image data for the photographic subject captured in the first image capture region 141, and the second processing unit 152 that performs generation of image data for the photographic subject captured in the second image capture region 142. And the first processing unit 151 generates image data for the photographic subject captured in the first image capture region 141 according to the image data for the photographic subject captured in the second image capture region 142. Since, in this manner, it is possible for pre-processing upon the image data (i.e. the first correction processing and the second correction processing) to be performed in parallel by processing by the plurality of correction units 322, accordingly it is possible to reduce the burden imposed by processing upon the correction units 322.

(2) The image processing unit 32c comprises the first processing unit 151 that performs generation of signals based upon the photographic subject incident upon the first image capture region 141, and the second processing unit 152 that performs generation of signals based upon the photographic subject incident upon the second image capture region 142. And the first processing unit 151 generates the signals based upon the image of the photographic subject captured in the first image capture region 141 according to the signals based upon the image of the photographic subject incident upon the second image capture region 142. Since, as a result, it is possible for the pre-processing upon the image data to be performed by parallel processing by the plurality of correction units 322, it is possible to alleviate the burden imposed upon the correction units 322 by the processing. Since moreover it is possible for the pre-processing to be performed by parallel processing by the plurality of correction units 322 in a short time period, accordingly it is possible to shorten the time period until the start of focus detection processing by the lens movement control unit 34d, and this contributes to raising the speed of the focus detection processing.

(3) The image processing unit 32c comprises the first processing unit 151 that performs generation of image data for the photographic subject incident upon the first image capture region 141, and the second processing unit 152 that performs generation of image data for the photographic subject incident upon the second image capture region 142. And the first processing unit 151 generates the image data for the photographic subject captured in the first image capture region 141 according to the image data for the photographic subject incident upon the second image capture region 142. Since, as a result, it is possible for the pre-processing upon the image data to be performed by parallel processing by the plurality of correction units 322, accordingly, it is possible to alleviate the burden imposed upon the correction units 322 by the processing. Since moreover it is possible for the pre-processing to be performed by parallel processing by the plurality of correction units 322 in a short time period, accordingly it is possible to shorten the time period until the start of processing for detection of the elements of the photographic subject, and this contributes to raising the speed of the processing for detecting the elements of the photographic subject.

(4) The image processing unit 32c comprises the first processing unit 151 that performs generation of signals on the basis of the photographic subject incident upon the first image capture region 141, and the second processing unit 152 that performs generation of signals on the basis of the photographic subject incident upon the second image capture region 142. And the first processing unit 151 generates the signals on the basis of the photographic subject captured in the first image capture region 141 according to the signals on the basis of the photographic subject incident upon the second image capture region 142. Since, as a result, it is possible for the pre-processing upon the image data to be performed by parallel processing by the plurality of correction units 322, accordingly, it is possible to alleviate the burden imposed upon the correction units 322 by the processing. Since moreover it is possible for the pre-processing to be performed by parallel processing by the plurality of correction units 322 in a short time period, accordingly it is possible to shorten the time period until the start of processing for setting the image capture conditions by the setting unit 34b, and this contributes to raising the speed of the processing for setting the image capture conditions.

Variants of Second Embodiment

The following modifications also come within the range of the present invention, and one or a plurality of the following variants could also be combined with the embodiments described above.

Variant 13

The processing of the first image data and the second image data when the first image capture region and the second image capture region are arranged upon the imaging surface of the imaging element 32a as shown in FIGS. 18A through 18C for Variant 1 of the first embodiment will now be explained.

In this variant embodiment as well, in a similar manner to the case with Variant 1, in each of the cases shown in FIGS. 18A through 18C, based on the pixel signals read out from the imaging element 32a that has performed capture of one frame image, a first image is generated on the basis of the image signals read out from the first image capture region and a second image is generated on the basis of the image signals read out from the second image capture region, respectively. And in this variant embodiment as well, in a similar manner to the case with Variant 1, the control unit 34 employs the first image for display, and employs the second image for detection.

The image capture conditions that are set for the first image capture region that captures the first image will be referred to as the "first image capture conditions", and the image capture conditions that are set for the second image capture region that captures the second image will be referred to as the "second image capture conditions". The control unit 34 may make the first image capture conditions and the second image capture conditions be different.

Figure 28:
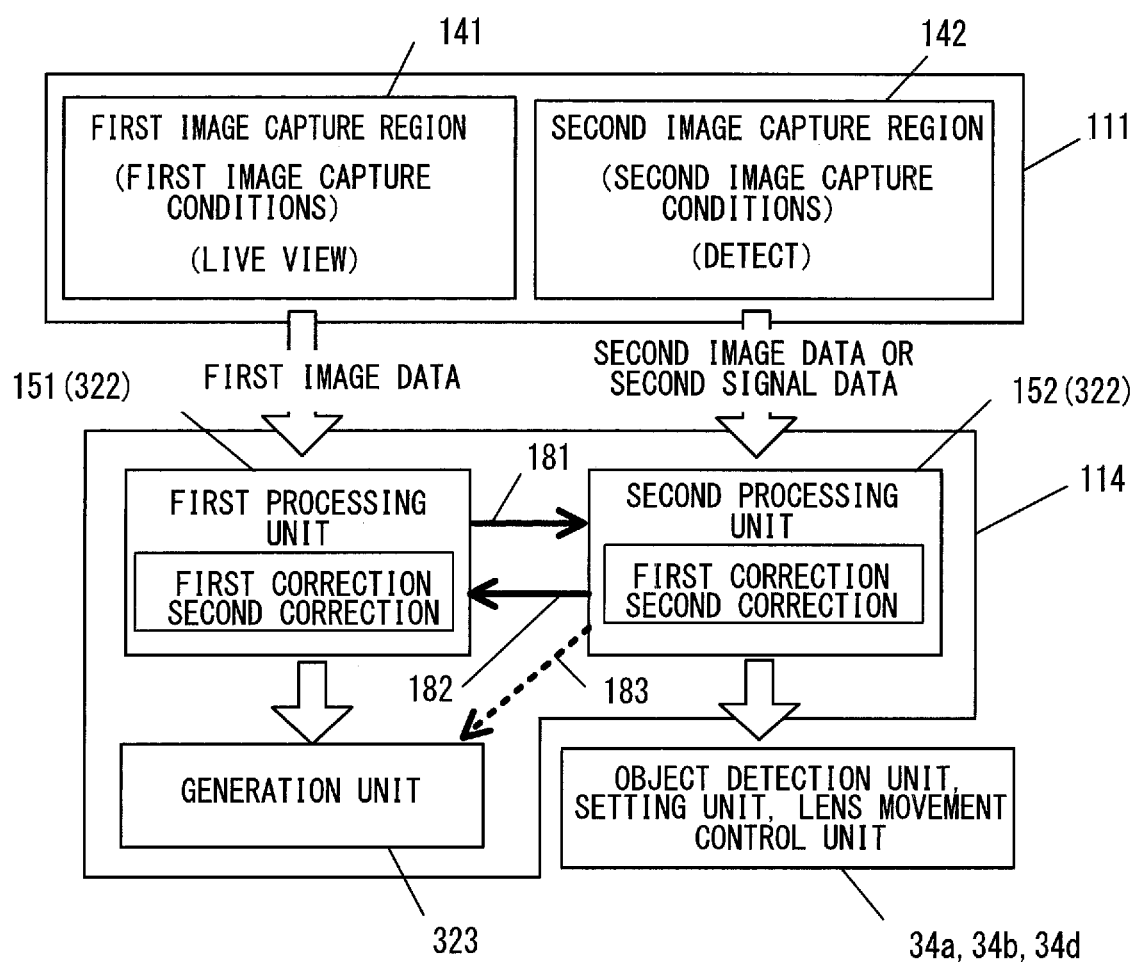
FIG. 28 is a figure schematically showing processing of first image data and second image data according to a thirteenth variant embodiment.

1. As one example, a case will now be explained with reference to FIG. 28 in which the first image capture conditions that are set for the first image capture region are set to be the same over the entire first image capture region of the imaging screen, and also the second image capture conditions that are set for the second image capture region are set to be the same over the entire second image capture region of the imaging screen. FIG. 28 is a figure schematically showing the processing of the first image data and the second image data.

The first image data captured under the first image capture conditions is outputted from the pixels included in the first image capture region 141, and the second image data captured under the second image capture conditions is outputted from the pixels included in the second image capture region 142. The first image data from the first image capture region 141 is outputted to the first processing unit 151. In a similar manner, the second image data from the second image capture region 142 is outputted to the second processing unit 152.

According to requirements, the first processing unit 151 performs both the first correction processing described above and also the second correction processing described above upon the first image data, or perform either the first correction processing or the second correction processing.

And, according to requirements, the second processing unit 152 performs both the first correction processing described above and also the second correction processing described above upon the second image data, or perform either the first correction processing or the second correction processing.

In this example, since the first image capture conditions are the same over the entire first image capture region of the imaging screen, accordingly the first processing unit 151 does not perform the second correction processing upon the first image data from the reference pixels Pr that are included in the first image capture region. Moreover, since the second image capture conditions are the same over the entire second image capture region of the imaging screen, accordingly the second processing unit 152 does not perform the second correction processing upon the second image data to be employed in focus detection processing, photographic subject detection processing, or exposure calculation processing. However, for the second image data that is to be employed for interpolation of the first image data, the second processing unit 152 does perform the second correction processing in order to reduce disparity between the image data due to discrepancy between the first image capture conditions and the second image capture conditions. The second processing unit 152 outputs the second image data after the second correction processing to the first processing unit 151, as shown by an arrow sign 182. It should be understood that it would also be acceptable for the second processing unit 152 to output the second image data after the second correction processing to the generation unit 323, as shown by a dashed line arrow sign 183.

For example, the second processing unit 152 receives information 181 from the first processing unit 151 related to the first image capture conditions that are necessary for reducing disparity between the image data due to discrepancy in the image capture conditions.

On the basis of the first image data from the first processing unit 151 and the second image data that has been subjected to the second correction processing by the second processing units 152, the generation unit 323 performs image processing such as pixel defect correction processing, color interpolation processing, contour enhancement processing, noise reduction processing, and so on, and outputs the image data after this image processing.

The object detection unit 34a performs processing for detecting the elements of the photographic subject on the basis of the second image data from the second processing unit 152, and outputs the results of this detection.

The setting unit 34b performs calculation processing for image capture conditions such as exposure calculation processing and the like on the basis of the second image data from the second processing unit 152, and, on the basis of the results of this calculation, along with subdividing the imaging screen of the image capture unit 32 into a plurality of regions including the photographic subject elements that have been detected, also re-sets the image capture conditions for this plurality of regions.

And the lens movement control unit 34d performs focus detection processing on the basis of the second signal data from the second processing unit 152, and outputs a drive signal for causing the focusing lens of the image capture optical system 31 to shift to a focusing position on the basis of the results of this calculation.

2. As another example, a case will now be explained with reference to FIG. 28 in which the first image capture conditions that are set for the first image capture region are different for different regions of the imaging screen, while the second image capture conditions that are set for the second image capture region are the same over the entire second capture region of the imaging screen.

First image data captured under the first image capture conditions, which are different for different regions of the imaging screen, is outputted from the pixels included in the first image capture region 141, and second image data that has been captured under the same second image capture conditions over the entire extent of the second image capture region of the imaging screen is outputted from each of the pixels of the second image capture region 142. The first image data from the first image capture region 141 is outputted to the first processing unit 151. In a similar manner, the second image data from the second image capture region 142 is outputted to the second processing unit 152.

According to requirements, the first processing unit 151 performs both the first correction processing described above and also the second correction processing described above upon the first image data, or performs either the first correction processing or the second correction processing.

And, according to requirements, the second processing unit 152 performs both the first correction processing described above and also the second correction processing described above upon the second image data, or performs either the first correction processing or the second correction processing.

As described above, in this example, the first image capture conditions that are set for the first image capture region 141 vary according to different parts of the imaging screen. In other words, the first image capture conditions vary depending upon a partial region within the first image capture region 141. When different first image capture conditions are set for the pixel for attention P and for reference pixels Pr that are positioned within the first image capture region 141, the first processing unit 151 performs the second correction processing upon the first image data from those reference pixels Pr, similar to the second correction processing that was described in 1-2. above. It should be understood that, if the same first image capture conditions are set for the pixel for attention P and the reference pixels Pr, then the first processing unit 151 does not perform the second correction processing upon the first image data from those reference pixels Pr.

In this example, since the second image capture conditions for the second image capture region 142 of the imaging screen are the same over the entire second image capture region, accordingly the second processing unit 152 does not perform the second correction processing upon the second image data that is used for the focus detection processing, the photographic subject detection processing, and the exposure calculation processing. And, for the second image data that is used for interpolation of the first image data, the second processing unit 152 performs the second correction processing in order to reduce the disparity in the image data due to discrepancy between the image capture conditions for the pixel for attention P that is included in the first image capture region 141 and the second image capture conditions. And the second processing unit 152 outputs the second image data after this second correction processing to the first processing unit 151 (as shown by the arrow sign 182). It should be understood that it would also be acceptable for the second processing unit 152 to output the second image data after this second correction processing to the generation unit 323 (as shown by the arrow 183).

The second processing unit 152, for example, receives from the first processing unit 151 the information 181 relating to the image capture conditions for the pixel for attention P included in the first image capture region that is required in order to reduce the disparity between the image data due to discrepancy in the image capture conditions.

On the basis of the first image data from the first processing unit 151 and the second image data that has been subjected to the second correction processing by the second processing unit 152, the generation unit 323 performs image processing such as pixel defect correction processing, color interpolation processing, contour enhancement processing, noise reduction processing, and so on, and outputs the image data after this image processing.

The object detection unit 34a performs processing for detecting the elements of the photographic subject on the basis of the second image data from the second processing unit 152, and outputs the results of this detection.

The setting unit 34b performs calculation processing for image capture conditions such as exposure calculation processing and the like on the basis of the second image data from the second processing unit 152, and, on the basis of the results of this calculation, along with subdividing the imaging screen at the image capture unit 32 into a plurality of regions including the photographic subject elements that have been detected, also re-sets the image capture conditions for this plurality of regions.

And the lens movement control unit 34*d* performs focus detection processing on the basis of the second signal data from the second processing unit 152, and outputs a drive signal for causing the focusing lens of the image capture optical system 31 to shift to a focusing position on the basis of the results of this calculation.

3. Furthermore, as another example, a case will now be explained with reference to FIG. 28 in which the first image capture conditions that are set for the first image capture region 141 of the imaging screen are the same over the entire extent of the first image capture region 141, while the second image capture conditions that are set for the second image capture region 142 are different for different regions of the imaging screen.

First image data captured under the same first image capture conditions for the whole of the first image capture region 141 of the imaging screen is outputted from respective pixels included within the first image capture region 141, and second image data captured under fourth image capture conditions that are different for different parts of the imaging screen is outputted from respective pixels included in the second image capture region 142. The first image data from the first image capture region 141 is outputted to the first processing unit 151. In a similar manner, the second image data from the first image capture region 142 is outputted to the second processing unit 152.

According to requirements, the first processing unit 151 performs both the first correction processing described above and also the second correction processing described above upon the first image data, or performs either the first correction processing described above or the second correction processing described above.

And, according to requirements, the second processing unit 152 performs both the first correction processing described above and also the second correction processing described above upon the second image data, or performs either the first correction processing described above or the second correction processing described above.

In this example, since the first image capture conditions that are set for the first image capture region 141 of the imaging screen are the same over the entire extent of the first image capture region 141, accordingly the first processing unit 151 does not perform the second correction processing upon the first image data from the reference pixels Pr that are included in the first image capture region 141.

Moreover, in this example, since the second image capture conditions that are set for the second image capture region 142 of the imaging screen are different for different regions of the imaging screen, accordingly the second processing unit 152 performs the second correction processing upon the second image data, as will now be described. For example, by performing the second correction processing upon some of the second image data, among the second image data, that was captured under certain image capture conditions, the second processing unit 152 is able to reduce the difference between the second image data after that second correction processing, and the second image data that was captured under image capture conditions different from the certain image capture conditions mentioned above.

In this example, for the second image data to be employed for interpolation of the first image data, the second processing unit 152 performs the second correction processing in order to reduce disparity in the image data due to discrepancy between the image capture conditions for the pixel for attention P included in the first image capture region 141 and the second image capture conditions. The second processing unit 152 outputs the second image data after this second correction processing to the first processing unit 151 (refer to the arrow sign 182). It should be understood that it would also be acceptable for the second processing unit 152 to output the second image data after the second correction processing to the generation unit 323 (refer to the arrow sign 183).

The second processing unit 152, for example, receives from the first processing unit 151 the information 181 relating to the image capture conditions for the pixel for attention P included in the first region, required in order to reduce disparity between the signal data due to discrepancy in the image capture conditions.

On the basis of the first image data from the first processing unit 151 and the second image data that has been subjected to the second correction processing by the second processing unit 152, the generation unit 323 performs image processing such as pixel defect correction processing, color interpolation processing, contour enhancement processing, noise reduction processing, and so on, and outputs the image data after this image processing.

And, on the basis of the second image data that was captured under the certain image capture conditions and that has been subjected to the second correction processing by the second processing unit 152 and the second image data that was captured under the other image capture conditions, the object detection unit 34*a* performs processing for detection of the elements of the photographic subject, and outputs the results of this detection.

The setting unit 34*b* performs calculation processing for image capture conditions, such as exposure calculation processing and so on, on the basis of the second image data that was captured under the certain image capture conditions and that has been subjected to the second correction processing by the second processing unit 152, and the second image data that was captured under the other image capture conditions. And, on the basis of the results of this calculation, the setting unit 34*b* subdivides the imaging screen of the image capture unit 32 into a plurality of regions including the photographic subject elements that have been detected, and re-sets the image capture conditions for this plurality of regions.

Moreover, the lens movement control unit 34*d* performs focus detection processing on the basis of the second image data that was captured under the certain image capture conditions and that has been subjected to the second correction processing by the second processing unit 152, and the second image data that was captured under the other image capture conditions. On the basis of the result of this calculation, the lens movement control unit 34*d* outputs a drive signal for shifting the focusing lens of the image capture optical system 31 to its focusing position.

4. Even further, as yet another example, a case will now be explained with reference to FIG. 28 in which the first image capture conditions that are set for the first image capture region 141 of the imaging screen are different for different parts of the imaging screen, and also the second image capture conditions that are set for the second image capture region 142 are different for different parts of the imaging screen.

First image data captured under the first image capture conditions that are different for different regions of the imaging screen is outputted from respective pixels included in the first image capture region 141, and second image data captured under the second image capture conditions that are different for different regions of the imaging screen is outputted from respective pixels included in the second image capture region 142. The first image data from the first image capture region 141 is outputted to the first processing unit 151. In a similar manner, the second image data from the second image capture region 142 is outputted to the second processing unit 152.

According to requirements, the first processing unit 151 performs both the first correction processing described above and also the second correction processing described above upon the first image data, or performs either the first correction processing described above or the second correction processing described above.

And, according to requirements, the second processing unit 152 performs both the first correction processing described above and also the second correction processing described above upon the second image data, or performs either the first correction processing described above or the second correction processing described above thereupon.

As described above, in this example, the first image capture conditions that are set for the first image capture region 141 of the imaging screen are different for different regions of the imaging screen. In other words, the first image capture conditions are different for different partial regions within the first image capture region 141. Accordingly, if different first image capture conditions are set for the pixel for attention P and for a reference pixel Pr which are both positioned in the first image capture region 141, then the first processing unit 151 performs the second correction processing upon the first image data from that reference pixel Pr, similar to the second correction processing described in 1-2. above. It should be understood that, if the same first image capture conditions are set for the pixel for attention P and for a reference pixel Pr, then the first processing unit 151 does not perform the second correction processing upon the first image data from that reference pixel Pr.

Moreover, in this example, since the second image capture conditions that are set for the second image capture region 142 of the imaging screen are different for different regions of the second image capture region 142, accordingly the second processing unit 152 performs the second correction processing upon the second image data, as in the example 3. described above.

On the basis of the first image data from the first processing unit 151 and the second image data that have been subjected to the second correction processing by the second processing unit 152, the generation unit 323 performs image processing such as pixel defect correction processing, color interpolation processing, contour enhancement processing, noise reduction processing, and so on, and outputs the image data after this image processing.

And, on the basis of the second image data that was captured under the certain image capture conditions and that was subjected to the second correction processing by the second processing unit 152 and the second image data that was captured under the other image capture conditions, the object detection unit 34a performs processing for detection of the elements of the photographic subject, and outputs the results of this detection.

The setting unit 34b performs calculation processing for image capture conditions, such as exposure calculation processing and so on, on the basis of the second image data that was captured under the certain image capture conditions and that was subjected to the second correction processing by the second processing unit 152, and the second image data that was captured under the other image capture conditions. And, on the basis of the results of this calculation, the setting unit 34b subdivides the imaging screen of the image capture unit 32 into a plurality of regions including the photographic subject elements that have been detected, and re-sets the image capture conditions for this plurality of regions.

Moreover, the lens movement control unit 34d performs focus detection processing on the basis of the second signal data that was captured under the certain image capture conditions and that was subjected to the second correction processing by the second processing unit 152, and the second signal data that was captured under the other image capture conditions, and, on the basis of the result of this calculation, the lens movement control unit 34d outputs a drive signal for shifting the focusing lens of the image capture optical system 31 to its focusing position.

Variant 14

In the second embodiment described above, it was arranged for each one of the correction units 322 to correspond to one of the blocks 111a (i.e. the unit subdivisions). However, it would also be acceptable to arrange for each one of the correction units 322 to correspond to one compound block (i.e. a compound subdivision) that includes a plurality of the blocks 111a (i.e. the unit subdivisions). In this case, the correction unit 322 corrects the image data from the pixels included in the plurality of blocks 111a that belong to one compound block sequentially. Even in a caser where a plurality of correction units 322 are provided to respectively correspond to compound blocks each of which include a plurality of the blocks 111a, since the second correction processing of the image data can be performed by the plurality of correction units 322 by parallel processing, accordingly it is possible to alleviate the burden of processing upon the correction units 322, and it is possible to generate an appropriate image in a short time period from the image data respectively generated by each of the regions whose image capture conditions are different.

Variant 15

In the second embodiment described above, the generation unit 323 was provided internally to the image capture unit 32A. However it would also be acceptable to provide the generation unit 323 externally to the image capture unit 32A. Even if the generation unit 323 is provided externally to the image capture unit 32A, it is still possible to obtain advantageous operational effects similar to the advantageous operational effects described above.

Variant 16

In the second embodiment described above, in addition to the backside illuminated type image capture chip 111, the signal processing chip 112, and the memory chip 113, the laminated type imaging element 100A also further included the image processing chip 114 that performed the pre-processing and the image processing described above. However, it would also be acceptable not to provide such an image processing chip 114 to the laminated type imaging element 100A, but instead to provide the image processing unit 32c to the signal processing chip 112.

Variant 17

In the second embodiment described above, the second processing unit 152 received information from the first processing unit 151 relating to the first image capture conditions, required in order to reduce disparity between the image data due to discrepancy in the image capture conditions. Moreover, the first processing unit 151 received information from the second processing unit 152 relating to the second image capture conditions, required in order to reduce disparity between the image data due to discrepancy in the image capture conditions. However, it would also be acceptable for the second processing unit 152 to receive information from the drive unit 32b and/or from the control unit 34 relating to the first image capture conditions, required in order to reduce disparity between the image data due to discrepancy in the image capture conditions. Moreover, in a similar manner, it would also be acceptable for the first processing unit 151 to receive information from the drive unit 32b and/or from the control unit 34 relating to the second image capture conditions, required in order to reduce disparity between the image data due to discrepancy in the image capture conditions.

The image capture optical system 31 described above may also include a zoom lens and/or a tilt-shift lens. The lens movement control unit 34d adjusts the angle of view by the image capture optical system 31 by shifting the zoom lens in the direction of the optical axis. In other words, by shifting the zoom lens, it is possible to perform adjustment of the image produced by the image capture optical system 31 so as to obtain an image of the photographic subject over a wide range, to obtain a large image for a faraway photographic subject, and the like.

Furthermore, the lens movement control unit 34d is able to adjust for distortion of the image due to the image capture optical system 31 by shifting the tilt-shift lens in the direction orthogonal to the optical axis.

The pre-processing described above is performed on the basis of the consideration that it is preferable to employ the image data after the pre-processing described above for adjusting the state of the image produced by the image capture optical system 31 (for example, the state of the angle of view, or the state of image distortion).

Third Embodiment

A digital camera will now be explained with reference to FIGS. 29A-B and 30, as one example of an electronic apparatus provided with an image processing device according to a third embodiment of the present invention. In the following explanation, the same reference symbols will be appended to structural elements that are the same as those of the first embodiment, and the explanation will principally concentrate upon the features of difference. Points which are not particularly explained are the same as in the first embodiment. In this embodiment, a case will be explained in which a boundary between subdivided regions is present within a block.

The First Correction Processing

In this third embodiment of the present invention, the correction unit 33b of the image processing unit 33 performs first correction processing, according to requirements, as one type of pre-processing performed before the image processing, the focus detection processing, the photographic subject detection processing (for detecting the elements of the photographic subject), and the processing for setting the image capture conditions.

In a similar manner to the case with the first embodiment, in this third embodiment it is made to be possible, after the imaging screen have been subdivided into regions by the setting unit 34b, to set (i.e. to change) the image capture conditions for a region selected by the user, or for a region determined by the control unit 34.

For example, it will be supposed that regions 61 through 66 after subdivision are a first region 61 through a sixth region 66 (refer to FIG. 29A), and that first image capture conditions through sixth image capture conditions, all different, are respectively set for the first region 61 through the sixth region 66. In such a case, blocks are present that include boundaries between the first region 61 through the sixth region 66. As described above, blocks are the minimum units upon the imaging element 32a for which image capture conditions can be set individually.

Figure 29A:
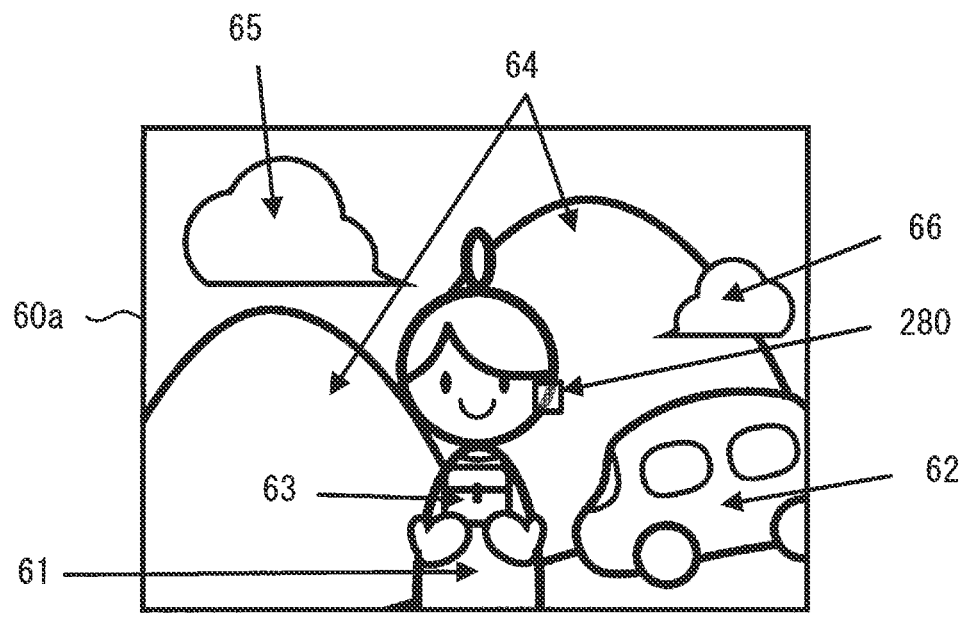
FIG. 29A is a figure showing an example of a predetermined range in a live view image.

FIG. 29A is a figure showing an example of a predetermined range 280 in the live view image 60a that includes a boundary between the first region 61 that corresponds to a person and the fourth region 64 that corresponds to a mountain. And FIG. 29B is an enlarged view of that predetermined range 280 of FIG. 29A. In FIG. 29B, a plurality of blocks 281 through 289 are included in the predetermined range 280.

Figure 29B:
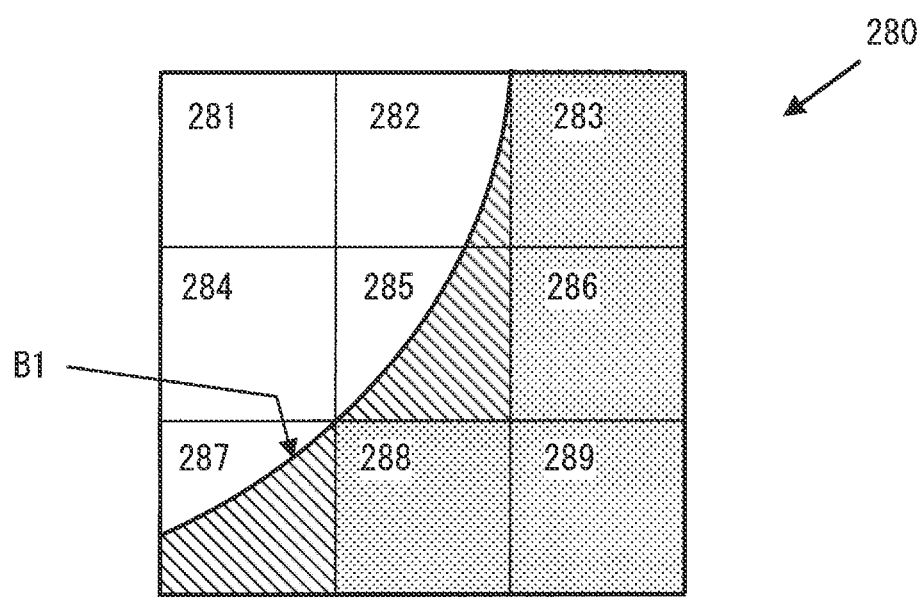
FIG. 29B is an enlarged view of that predetermined range.

The white portion in FIG. 29B represents the portion corresponding to the person. Furthermore, the hatched portion and the stippled portion in FIG. 29B represent the portion corresponding to a mountain. The boundary B1 between the first region 61 and the fourth region 64 is included in a block 282, in a block 285, and in a block 287. In other words, among the portions that correspond to the mountain, the portions that correspond to the mountain in the blocks 82, 85, and 87 in FIG. 29B where the boundary B1 is present are shown as hatched.

In the following explanation, among the blocks that relate to the same photographic subject element (i.e., the same region), the blocks that include a boundary from an adjacent region will be referred to as "boundary blocks", while the blocks that do not include a boundary will be referred to as "main blocks". In other words, in the FIG. 29B example, the blocks 282, 285, and 287 are boundary blocks, while the remaining blocks 281, 283, 284, 286, 288, and 289 are main blocks.

In this embodiment, the first region 61 corresponding to the person is set to first image conditions, while the fourth region 64 corresponding to the mountain is set to fourth image capture conditions. And, in this embodiment, since a block is the minimum unit for which image capture conditions can be set, accordingly the same image capture conditions are set for the entire area of a single block. Therefore the setting unit 34b sets the image capture conditions for the main blocks 281 and 284 in which an image of the person is captured to the first image capture conditions, and also sets the image capture conditions for the boundary blocks 282, 285, and 287 in which images of both the person and the mountain are captured to the first image capture conditions. On the other hand, the setting unit 34b sets the image capture conditions for the main blocks 283, 286, 288, and 289 in which only an image of the mountain is captured to the fourth image capture conditions.

Since the first image capture conditions are set for the boundary blocks 282, 285, and 287 which include the boundary B1 between the first region 61 and the fourth region 64, accordingly the first image capture conditions are also set for the hatched portions of these boundary blocks 282, 285, and 287, i.e. for their portions that correspond to the mountain. In other words, in the hatched portions within the boundary block 282, the boundary block 285, and the boundary block 287, image capture conditions are set that are different from the fourth image capture conditions that are set for the main blocks 283, 286, 288, and 289 in which an image of the mountain is captured.

As described above, in the fourth region 64, when the hatched portions of the boundary blocks 282, 285, and 287 are set to the first image capture conditions and the stippled main blocks 283, 286, 288, and 289 are set to the fourth image capture conditions, there may be a discrepancy in image brightness, contrast, hue or the like between the hatched portions and the stippled portions. In other words, even in the same fourth region 64, discontinuity may occur in the image after image processing, since there is a discrepancy in image capture conditions between the boundary blocks and the main blocks.

Accordingly in this embodiment, by performing correction processing as described below upon the signals from the pixels that belong to the boundary blocks, it is possible to obtain signals that are similar to what they would be if image capture had been performed under the same image capture conditions as the image capture conditions for the main blocks. This correction processing is referred to as "first correction processing". The first correction processing is performed in order to reduce discontinuity occurring in the image after image processing, originating in the fact that, within the same region, portions are present for which the image capture conditions are different.

Figure 30:
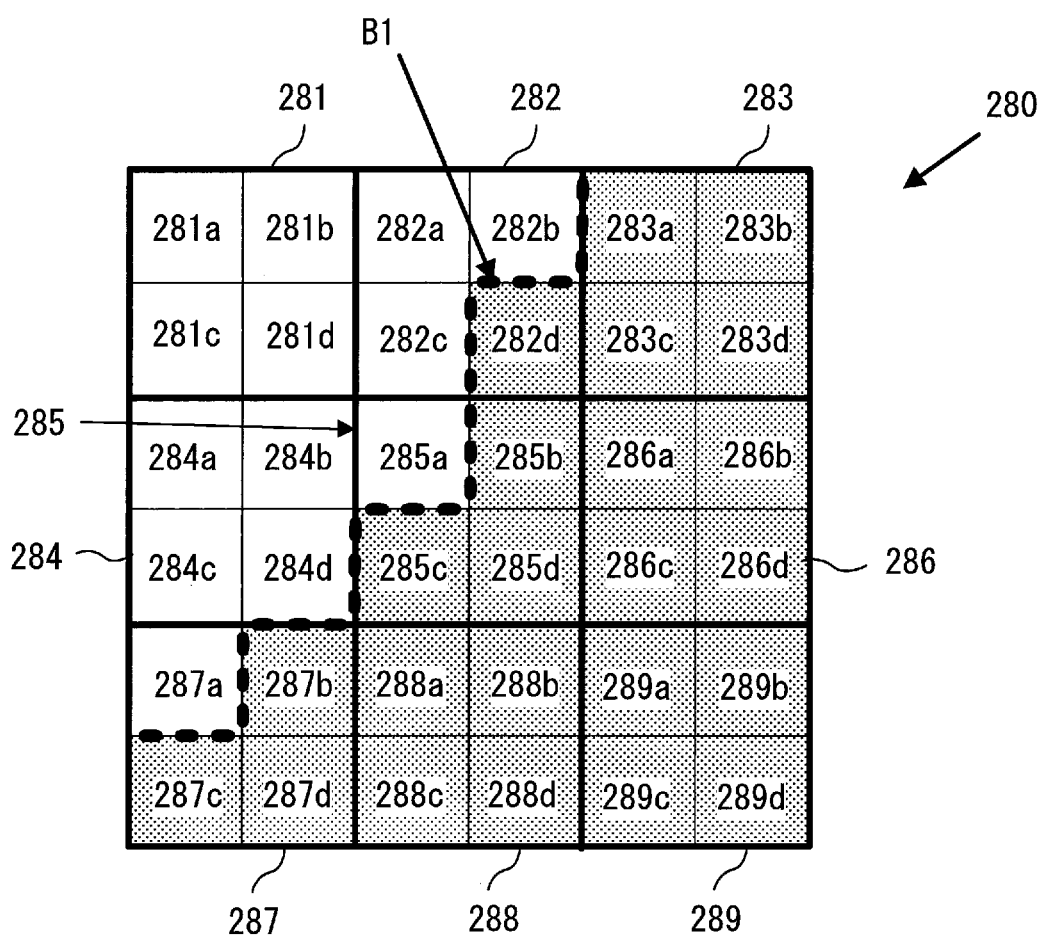
FIG. 30 is a figure showing an example of image data corresponding to FIG. 29B.

FIG. 30 is a figure showing an example of image data corresponding to FIG. 29B. In FIG. 30, it will be supposed that each of the blocks 281 through 289 is composed of four pixels which are arranged in 2×2 pixels. In FIG. 30, the boundary B1 is shown by a thick broken line. And it will be supposed that, among the pixels shown in FIG. 30, the photographic subject light from the person 61a (refer to FIG. 5) is incident upon the pixels 281a through 281d, 282a through 282c, 284a through 284d, 285a, and 287a that are shown as white, while the photographic subject light from the mountain 64a (refer to FIG. 5) is incident upon the pixels 282d, 283a through 283d, 285b through 285d, 286a through 286d, 287b through 287d, 288a through 288d, and 289a through 289d that are shown as stippled.

For each pixel belonging to a boundary block, the correction unit 33b determines from which photographic subject element light is incident thereupon. In concrete terms, the correction unit 33b calculates the position of the boundary upon the imaging surface of the imaging element 32a from the results of photographic subject element detection by the object detection unit 34a. And the correction unit 33b extracts the boundary blocks on the basis of the position of the boundary that has thus been calculated, and calculates from which photographic subject element, light is incident upon each of the pixels belonging to that extracted boundary block.

Referring to FIGS. 29A-B and 30 as an example, the correction unit 33b calculates the position of the boundary B1 between the first region 61 and the fourth region 64 from the results of detection of photographic subject elements by the object detection unit 34a. And the correction unit 33b extracts the blocks 282, 285, and 287 as being the boundary blocks based on the position of the boundary B1 that has thus been calculated. Then, on the basis of the position of the boundary B1 that has been calculated, the correction unit 33b calculates that photographic subject light is incident from the person 61a upon the pixels 282a, 282b, and 282c of the boundary block 282, upon the pixel 285a of the boundary block 285, and upon the pixel 287a of the boundary block 287. Moreover, on the basis of the position of the boundary B1 that has been calculated, the correction unit 33b also calculates that photographic subject light is incident from the mountain 64a upon the pixel 282d of the boundary block 282, upon the pixels 285b, 285c, and 285d of the boundary block 285, and upon the pixels 287b, 287c, and 287d of the boundary block 287.

As described above, the main blocks 283, 286, 288, and 289 for the fourth region 64 perform capture of photographic subject light from the mountain 64a according to the fourth image capture conditions. However, since the first image capture conditions are set for the boundary blocks 282, 285, and 287, accordingly the pixel 282d of the boundary block 282, the pixels 285b through 285d of the boundary block 285, and the pixels 287b through 287d of the boundary block 287 perform capture of photographic subject light from the mountain 64a according to the first image capture conditions.

Thus, the correction unit 33b performs the first correction processing upon the pixel 282d of the boundary block 282, upon the pixels 285b through 285d of the boundary block 285, and upon the pixels 287b through 287d of the boundary block 287, so as to obtain similar signals to those that would have been obtained if the photographic subject light from the mountain 64a had been captured under the fourth image capture conditions. It should be understood that, in this embodiment, the correction processing is performed under the same conditions for the plurality of pixels that are to be subjects of correction processing within one boundary block. Although the boundary block 285 has been cited as an example, according to requirements, similar correction processing is performed for the other boundary blocks as well, as explained below.

Description of Examples of First Correction Processing

1. First Correction Processing Performed on the Basis of the Image Capture Conditions As one version of the first correction processing, correction processing is performed on the basis of the difference between the image capture conditions set for each of two regions related to the boundary blocks (i.e. the first region 61 and the fourth region 64), as explained below.

EXAMPLE 1

For example, if the fourth image capture conditions and the first image capture conditions only differ by ISO sensitivity, with the ISO sensitivity of the fourth image capture conditions being 800 while the ISO sensitivity of the first image capture conditions is 100, then, as the first correction processing, the correction unit 33b multiplies the signals from the pixels 285b through 285d of the boundary block 285 by 800/100=8. In this case, the correction coefficient α for multiplication to the pixel values of the signals from the pixels 285b through 285d is calculated as being 8 on the basis of discrepancy in the image capture conditions that are set for each of the two adjacent regions as described above.

The signals from the pixels 285b through 285d of the boundary block 285 that have been corrected by this first correction processing become the same as the signals that would have been obtained by capturing the light incident upon these pixels 285b through 285d under the fourth image capture conditions (with ISO sensitivity 800).

EXAMPLE 2

For example, if the fourth image capture conditions and the first image capture conditions only differ by shutter speed, with the shutter speed of the fourth image capture conditions being 1/100 second while the shutter speed of the first image capture conditions is 1/1000 second, then, as the first correction processing, the correction unit 33b multiplies the signals from the pixels 285b through 285d of the boundary block 285 by (1/100)/(1/1000)=10. In this case, the correction coefficient α multiplied to the pixel values of the signals from the pixels 285b through 285d is, as described above, calculated as being 10 on the basis of discrepancy in the image capture conditions that are set for each of the two regions that are adjacent.

The signals from the pixels 285b through 285d of the boundary block 285 that have been corrected by this first correction processing become the same as the signals that would have been obtained by capturing the light incident upon these pixels 285b through 285d under the fourth image capture conditions (with shutter speed 1/100 second).

EXAMPLE 3

And, for example, if the fourth image capture conditions and the first image capture conditions only differ by frame rate, with the frame rate of the fourth image capture conditions being 60 fps while the frame rate of the first image capture conditions is 30 fps, the correction unit 33b employs, from the signals of a plurality of frame images at the frame rate of 30 fps from the pixels 285b through 285d of the boundary block 285, the signal of the frame image whose starting timing of acquisition is close to that of the frame image that was acquired under the fourth image capture conditions (at 60 fps). By doing this, the correction unit 33b makes conversion from the frame rate of 30 fps to the frame rate of 60 fps. This conversion of frame rate, for example, may be achieved by storing the signals from the pixels 285b through 285d of the boundary block 285 in a memory, and by reading out the same signals from this memory twice.

It should be understood that the conversion from the frame rate of 30 fps to the frame rate of 60 fps by this first correction processing may also be achieved by generating a combined signal by adding and combining together signals from a plurality of frame images acquired sequentially at the frame rate of 30 fps, and supplementing the frame images at the frame rate of 30 fps with this combined signal.

In this manner, the correction unit 33b performs the first correction processing upon the signals from the pixels of all the boundary blocks, according to requirements. In other words, the correction unit 33b performs the first correction processing for a signal from a given pixel that belongs to a boundary block, if the image capture conditions that have been applied to the main blocks for the same photographic subject element as the given pixel and the image capture conditions that have been applied to the boundary block are different. However, if the image capture conditions that have been applied to the main blocks for the same photographic subject element as the given pixel and the image capture conditions that have been applied to the boundary block are the same, then the correction unit 33b does not perform the first correction processing, since there is no need to perform the first correction processing in that case.

As described above, even if there are some moderate differences in the image capture conditions, still they are regarded as being the same image capture conditions.

It should be noted that it would be acceptable not to perform the first correction processing, if it is possible to reduce the discontinuity generated in the image by performing image processing so as to reduce the sharpness or the contrast in the image data obtained by image capture in the boundary block, or in a main block in the near vicinity of the boundary block.

2. First Correction Processing Performed on the Basis of the Pixel Values

As another version of the first correction processing, as explained below, correction processing may be performed on the basis of the pixel values of the signals outputted from the pixels of a boundary block and the pixel values of the signals outputted from the pixels of a main block.

EXAMPLE 1

The correction unit 33b calculates a correction coefficient $\alpha$ on the basis of the average value of the pixel values of the signals from the pixels of a boundary block in which photographic subject light from the mountain 64a has been captured under the first image capture conditions, and the average value of the pixel values of the signals from the pixels of a block which is a main block in which photographic subject light from the mountain 64a has been captured under the fourth image capture conditions, and which is adjacent to that boundary block. And the correction unit 33b multiplies the pixel value of each of the pixels of the boundary block in which photographic subject light from the mountain 64a has been captured by the correction coefficient $\alpha$.

For example, suppose that the average value of the pixel values of the signals from the pixels 285b through 285d of the boundary block 285 that has captured photographic subject light from the mountain 64a is Vave1, and that the average value of the pixel values of the signals from the pixels 286a through 286d of the main block adjacent to the boundary block 285 is Vave2. In this case, the correction unit 33b calculates the correction coefficient $\alpha$ for the pixel values of the signals from the pixels 285b through 285d of the boundary block 285 as being $\alpha$=Vave2/Vave1.

And then the correction unit 33b takes the value obtained by multiplying the pixel value of the signal from the pixel 285b of the boundary block 285 by the correction coefficient $\alpha$ as being the pixel value of the signal from the pixel 285b after the first correction processing. In a similar manner, the correction unit 33b takes the value obtained by multiplying the pixel value of the signal from the pixel 285c of the boundary block 285 by the correction coefficient $\alpha$ as being the pixel value of the signal from the pixel 285c after the first correction processing, and takes the value obtained by multiplying the pixel value of the signal from the pixel 285d by the correction coefficient $\alpha$ as being the pixel value of the signal from the pixel 285d after the first correction processing.

As described above, the disparity between the pixel values of the signals from the pixels 285b through 285d of the boundary block 285 and the pixel values of the signals from the pixels of the main block that is adjacent to that boundary block is principally based upon the discrepancy between the first and the fourth image capture conditions. Accordingly, by determining the correction coefficient $\alpha$ on the basis of the disparity in the pixel values, and by correcting the signals from the pixels 285b through 285d with this correction coefficient $\alpha$, the signals from the pixels 285b through 285d are made to be substantially the same as the signals which would be obtained if light incident upon the pixels 285b through 285d were to be captured under the fourth image capture conditions.

In this manner, according to requirements, the correction unit 33b performs the first correction processing upon the signals from the pixels of all the boundary blocks.

In the above explanation, the first correction processing according to two different versions has been described. The control unit 34 may determine which of these versions of the first correction processing should be performed on the basis of, for example, the state of setting of the operation members 36 (including the operation menu settings).

It should be understood that it would also be acceptable to arrange for the control unit 34 to determine which of the above versions of the first correction processing is to be performed, according to the scene imaging mode set for the camera 1, or according to the type of photographic subject element that has been detected.

The Second Correction Processing

Before performing image processing, focus detection processing, photographic subject detection processing (i.e. detection of the elements of the photographic subject), and processing for setting of the image capture conditions, the correction unit 33b of the image processing unit 33 may also, according to requirements, perform correction processing that is the same as the correction processing of the first embodiment. In the following explanation, this correction processing that is the same as the correction processing of the first embodiment will also be referred to as "second correction processing". According to requirements, as described above, the correction unit 33b performs the second correction processing after having performed the first correction processing.

It should be understood that, in this second correction processing, the signals from the pixels of the boundary block that have been subjected to the first correction processing are processed as signals obtained by image capture, not under the image capture conditions that are set for the boundary block, but rather under the image capture conditions that are set for the main block. For example, when performing the second correction processing, the signal from the pixel 282d of the boundary block 282 that has been subjected to the first correction processing is processed by the correction unit 33b as a signal that has been obtained by image capture with the fourth image capture conditions being applied, and not with the first image capture conditions being applied.

According to the third embodiment as explained above, in addition to the advantageous operational effects of the first and second embodiments, the following advantageous operational effects are obtained.

(1) It is possible to perform processing in an appropriate manner for each of several regions for which the image capture conditions are different. In other words, it is possible to generate an image in an appropriate manner according to the image data that are respectively generated by each region. Thus, for example, it is possible to suppress any discontinuity or sense of strangeness appearing in the generated image due to difference between the image capture conditions for each of the regions.

Furthermore, since it is possible to correct the signals from the pixels in a boundary block in an appropriate manner, accordingly it is possible to generate the image data in an appropriate manner.

Moreover, it is possible to detect the amount of defocusing in an appropriate manner, on the basis of the signal data for focus detection generated for each of the regions. For example, it is possible to suppress deterioration in the accuracy of focus detection due to difference in the image capture conditions between the various regions.

Yet further, it is also possible to perform detection of the elements of the photographic subject in an appropriate manner, on the basis of the image data generated for each of the regions. For example, it is possible to suppress degradation in the accuracy of detection due to difference in the image capture conditions between the various regions.

Even further, it is possible to perform setting of the image capture conditions in an appropriate manner, on the basis of the image data generated for each of the regions. For example, it is possible to suppress deterioration of the accuracy of setting the exposure conditions due to difference in the image capture conditions between the various regions.

(2) Since it is possible to correct the signals from the boundary block in an appropriate manner, accordingly it is possible to generate the image data in an appropriate manner.

Moreover, it is possible to detect the amount of defocusing in an appropriate manner, on the basis of the signal data for focus detection generated for each of the regions.

Yet further, it is also possible to perform detection of the elements of the photographic subject in an appropriate manner, on the basis of the image data generated for each of the regions.

Even further, it is possible to perform setting of the image capture conditions in an appropriate manner, on the basis of the image data generated for each of the regions.

(3) A part of the image data for the first region 61 is obtained by capturing light incident upon a part of the first region 61 which is adjacent to the fourth region 64. And, since the correction unit 33b of the image processing unit 33 corrects the part of the image data for the first region 61 according to the fourth image capture conditions, accordingly it is possible to correct the signals from the pixels in a boundary block in an appropriate manner, and it is possible to generate the image data in an appropriate manner.

Moreover, it is possible to detect the amount of defocusing in an appropriate manner, on the basis of the signal data for focus detection generated for each of the regions.

Yet further, it is also possible to perform detection of the elements of the photographic subject in an appropriate manner, on the basis of the image data generated for each of the regions.

Even further, it is possible to perform setting of the image capture conditions in an appropriate manner, on the basis of the image data generated for each of the regions.

(4) Since the correction unit 33b of the image processing unit 33 corrects a part of the image data for the first region 61 according to the fourth image capture conditions, accordingly it is possible to correct the signals from the pixel of the boundary block in an appropriate manner, so that it is possible to generate image data in an appropriate manner.

Moreover, it is possible to detect the amount of defocusing in an appropriate manner, on the basis of the signal data for focus detection generated for each of the regions.

Yet further, it is also possible to perform detection of the elements of the photographic subject in an appropriate manner, on the basis of the image data generated for each of the regions.

Even further, it is possible to perform setting of the image capture conditions in an appropriate manner, on the basis of the image data generated for each of the regions.

(5) Among the pixels in a boundary block, it is possible to correct the signals from the pixels upon which light from the mountain 64a is incident, and accordingly it is possible to generate image data in an appropriate manner.

Moreover, it is possible to detect the amount of defocusing in an appropriate manner, on the basis of the signal data for focus detection generated for each of the regions.

Yet further, it is also possible to perform detection of the elements of the photographic subject in an appropriate manner, on the basis of the image data generated for each of the regions.

Even further, it is possible to perform setting of the image capture conditions in an appropriate manner, on the basis of the image data generated for each of the regions.

Variants of Third Embodiment

In the third embodiment described above, when performing the first correction processing for the boundary blocks related to the first region 61 and the fourth region 64 on the basis of the image capture conditions, the ratio between the first image capture conditions and the fourth image capture conditions was taken as being the correction coefficient α. However, in this variant embodiment, even when performing the first correction processing for the boundary blocks related to the first region 61 and the fourth region 64 on the basis of the image capture conditions, a value closer to 1 than the ratio between the first image capture conditions and the fourth image capture conditions is taken as being the correction coefficient α.

EXAMPLE 1

For example, if the fourth image capture conditions and the first image capture conditions only differ by ISO sensitivity, with the ISO sensitivity of the fourth image capture conditions being 800 while the ISO sensitivity of the first image capture conditions is 100, then, as the value of the correction coefficient α, the correction unit 33b adopts a value that is closer to 1 from the ratio between the first image capture conditions and the fourth image capture conditions, i.e. 800/100=8, for example a value such as 7 or 6.5 or the like which is closer to 1 than the ratio is. It should be understood that the value of the correction coefficient α cited here is only a value given for purposes of illustration; the value of the correction coefficient α is not to be considered as being limited to this value.

EXAMPLE 2

For example, if the fourth image capture conditions and the first image capture conditions only differ by shutter speed, with the shutter speed of the fourth image capture conditions being $1/100$ second while the shutter speed of the first image capture conditions is $1/1000$ second, then, as the value of the correction coefficient α, the correction unit 33b adopts a value that is closer to 1 than the ratio between the first image capture conditions and the fourth image capture conditions, i.e. $(1/100)/(1/1000)=10$, for example a value such as 8.5 or 7 or the like which is closer to 1 than the ratio is. It should be understood that the value of the correction coefficient α cited here is only a value given for purposes of illustration; the value of the correction coefficient α is not to be considered as being limited to this value.

In other words, by correcting the values of the signals from the pixels 285b through 285d of the boundary block 285 for which the first image capture conditions are set, the differences between the value of the signals after correction and the values of the signals of the pixels of the block for which the fourth image capture conditions were set may be reduced to be less than the differences between the value of the signals before correction and the values of the signals of the pixels of the block for which the fourth image capture conditions were set (this is smoothing). If, in this manner, it is possible to reduce the discontinuity occurring in the image after image processing originating in the existence of portions within the same region for which the image capture conditions are different, then it will be acceptable to arrange to calculate the correction coefficient α as in this variant embodiment.

For example, if the region where pixels to be corrected are present is small, or if the difference between the first image capture conditions and the fourth image capture conditions is small, then it will be acceptable for the first correction processing such as that of this variant embodiment to be performed.

Fourth Embodiment

Figure 31:
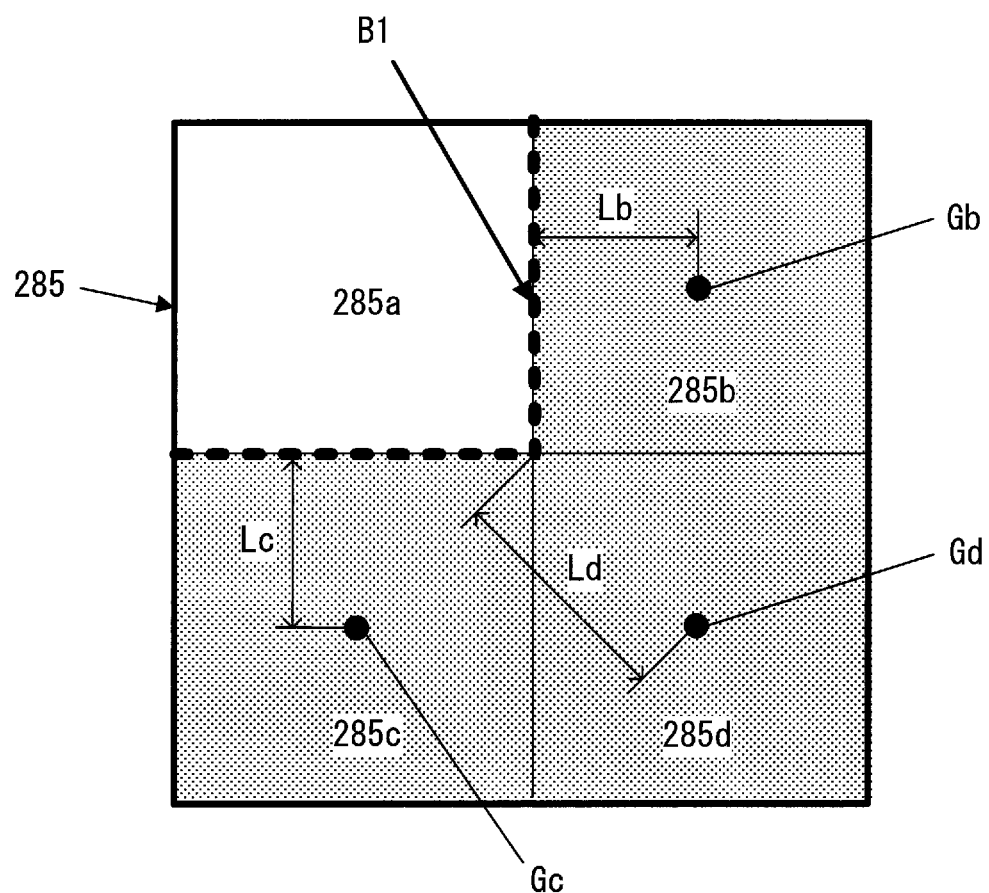
FIG. 31 is an enlarged view of a boundary block.

A digital camera will now be explained with reference to FIGS. 29A-B and 31, as one example of an electronic apparatus provided with an image processing device according to a fourth embodiment of the present invention. In the following explanation, points which are not particularly explained are the same as in the third embodiment. In the third embodiment, the pixel values of the signals from the plurality of pixels within the boundary block which were the subjects of correction processing were all multiplied by the same correction coefficient α. By contrast, in this embodiment, the pixel values of the signals from the plurality of pixels within a single boundary block which are the subjects of correction processing are multiplied by correction coefficients having different values, according to the positions thereof.

The First Correction Processing
Description of Examples of the First Correction Processing
1. The First Correction Processing is Performed on the Basis of the Image Capture Conditions As one version of the first correction processing of this embodiment, as will be explained below, the correction processing is performed on the basis of the difference between the image capture conditions that are set for two regions belonging to the boundary block (i.e. the first region 61 and the fourth region 64).

In concrete terms, if the image capture conditions that are applied to pixels within the boundary block are different from the image capture conditions applied to pixels in the main block even though they are pixels within the same region, then weighting is performed upon the correction coefficient α of the third embodiment, according to the positions of the pixels within the boundary block.

In a similar manner to the cases of Example 1 and Example 2 of the third embodiment, the correction unit 33b calculates a correction coefficient α on the basis of the image capture conditions. And the correction unit 33b then modifies the correction coefficient α to a different value depending upon the distance from the boundary of the region. For example, the correction unit 33b may change the value of the correction coefficient α so that its value becomes closer to 1 as the distance from the boundary of the region decreases. In other words, the correction unit 33b changes the value of the correction coefficient α so that the effect of the correction becomes smaller, the closer the position of the pixel to be corrected within the boundary block is to the boundary of the region. The correction coefficient α after having been changed in this way will be referred to as the "correction coefficient β". The correction unit 33b multiplies the pixel value of the signal from the pixel to be corrected by this correction coefficient β.

EXAMPLE 1

For example, if the fourth image capture conditions and the first image capture conditions only differ by ISO sensitivity, with the ISO sensitivity of the fourth image capture conditions being 800 while the ISO sensitivity of the first image capture conditions is 100, then, in a similar manner to the case in the third embodiment, the correction unit 33b calculates the correction coefficient α as being 800/100=8. And the correction unit 33b modifies the value of the correction coefficient α so that its value approaches 1 as the distance from the boundary of the region decreases.

For example, the correction unit 33b may set the correction coefficient β for the signals from the pixels 285b through 285d of the boundary block 285 in the following manner. FIG. 31 is an enlarged view of the boundary block 285, in which the centroid Gb of the pixel 285b, the centroid Gc of the pixel 285c, and the centroid Gd of the pixel 285d are indicated by black dots. As shown in FIG. 31, the distances Lb and Lc between the positions Gb and Gc of the centroids of the pixel 285b and 285c respectively and the boundary B1 are smaller than the distance Ld between the position Gd of the centroid of the pixel 285d and the boundary B1. Accordingly, for example, the correction unit 33b sets the value of the correction coefficient β for the pixel 285d to 8 which is the same value as the correction coefficient α, or closer to 1 than the value of the correction coefficient α is, for example to 6, and sets the values of the correction coefficients β for the pixel 285b and the pixel 285c yet closer to 1, for example to 4. It should be understood that the values of the correction coefficient β cited here are only values given for purposes of illustration; the value of the correction coefficient β is not to be considered as being limited to this values.

And the correction unit 33b sets a value obtained by multiplying the pixel value of the signal from the pixel 285b of the boundary block 285 by the correction coefficient β=4 as the pixel value of the signal from the pixel 285b after the first correction processing. In a similar manner, the correction unit 33b sets a value obtained by multiplying the pixel value of the signal from the pixel 285c of the boundary block 285 by the correction coefficient β=4 as the pixel value of the signal from the pixel 285c after the first correction processing, and sets a value obtained by multiplying the pixel value of the signal from the pixel 285d by the correction coefficient β=6 or 8 as the pixel value of the signal from the pixel 285d after the first correction processing.

The signals of the pixels 285b through 285d of the boundary block 285 corrected by this first correction processing become closer to the signals which would have been obtained by capturing under the fourth image capture conditions (with ISO sensitivity 800), as the distance from the boundary B1 increases.

EXAMPLE 2

For example, if the fourth image capture conditions and the first image capture conditions only differ by shutter speed, with the shutter speed of the fourth image capture conditions being 1/100 second while the shutter speed of the first image capture conditions is 1/1000 second, then, in a similar manner to the case in the third embodiment, the correction coefficient α is calculated as being (1/100)/(1/1000) =10. And the correction unit 33b modifies the value of the correction coefficient α so that its value approaches 1 as the distance from the boundary of the region decreases.

For example, the correction unit 33b may set the correction coefficient β for the signals from the pixels 285b through 285d of the boundary block 285 in the following manner. As described above, the distances Lb and Lc between the positions Gb and Gc of the centroids of the pixel 285b and 285c respectively and the boundary B1 are smaller than the distance Ld between the position Gd of the centroid of the pixel 285d and the boundary B1. Accordingly, for example, the correction unit 33b sets the value of the correction coefficient β for the pixel 285d to 10 which is the same value as the correction coefficient α, or closer to 1 than the value of the correction coefficient α is, for example to 7, and sets the values of the correction coefficients β for the pixel 285b and the pixel 285c yet closer to 1, for example to 5. It should be understood that the values of the correction coefficient β cited here are only values given for purposes of illustration; the value of the correction coefficient β is not to be considered as being limited to this values.

And the correction unit 33b sets a value obtained by multiplying the pixel value of the signal from the pixel 285b of the boundary block 285 by the correction coefficient β=5 as the pixel value of the signal from the pixel 285b after the first correction processing. In a similar manner, the correction unit 33b sets a value obtained by multiplying the pixel value of the signal from the pixel 285c of the boundary block 285 by the correction coefficient β=5 as the pixel value of the signal from the pixel 285c after the first correction processing, and sets a value obtained by multiplying the pixel value of the signal from the pixel 285d by the correction coefficient β=7 or 10 as the pixel value of the signal from the pixel 285d after the first correction processing.

The signals of the pixels 285b through 285d of the boundary block 285 corrected by this first correction processing become closer to the signals which would have been obtained by capturing under the fourth image capture conditions (with shutter speed 1/100 second), as the distance from the boundary B1 increases.

In this manner, according to requirements, the correction unit 33b performs first correction processing upon the signals from all of the pixels of the boundary blocks.

2. The First Correction Processing is Performed on the Basis of the Pixel Values As another version of the first correction processing of this embodiment, as will be explained below, the correction processing is performed on the basis of the values of the signals (i.e. the pixel values) outputted from the pixels of the boundary block and the values of the signals (i.e. the pixel values) outputted from the pixels of the main block.

In concrete terms if, for pixels even within the same region, the image capture conditions that have been applied to the pixels of the boundary block and the image capture conditions that have been applied to the pixels of the main block are different, then weighting of the correction coefficient α of the third embodiment is performed according to the position of the pixel in the boundary block.

As in Example 1 of the third embodiment, the correction unit 33b calculates the correction coefficient α on the basis of the image capture conditions. And then the correction unit 33b modifies the correction coefficient α that has been calculated to a different value according to the distance from the boundary of the region. For example, the correction unit 33b may change the value of the correction coefficient α so as to become closer to 1 as the distance from the boundary of the region becomes smaller. In other words, the correction unit 33b changes the value of the correction coefficient α so as to reduce the effect of correction, as the position of the pixel to be corrected within the boundary block is closer to the boundary of the region. After it has been changed in this manner, the correction coefficient α is referred to as the correction coefficient β, in a similar manner to the case described above. The correction unit 33b multiplies the pixel value of the signal from the pixel to be corrected by this correction coefficient β.

EXAMPLE 1

For example, suppose that the average value of the pixel values of the signals from the pixels 285b through 285d of the boundary block 285 that has captured photographic subject light from the mountain 64a is Vave1, and that the average value of the pixel values of the signals from the pixels 286a through 286d of the main block adjacent to the boundary block 285 is Vave2. In this case, the correction unit 33b calculates the correction coefficient α for the pixel values of the signals from the pixels 285b through 285d of the boundary block 285 as being α=Vave2/Vave1. And the correction unit 33b modifies the value of the correction coefficient α so that it approaches 1 as the distance from the boundary of the region decreases.

For example, the correction unit 33b may set the correction coefficient β for the signals from the pixels 285b through 285d of the boundary block 285 in the following manner. As described above, the distances Lb and Lc between the positions Gb and Gc of the centroids of the pixel 285b and 285c respectively and the boundary B1 are smaller than the distance Ld between the position Gd of the centroid of the pixel 285d and the boundary B1. Accordingly the correction unit 33b sets the value of the correction coefficient β for the pixel 285d to, for example, the same value as the correction coefficient α (in other words, Vave2/Vave1), or for example to β=β1 which is closer to 1 than the correction coefficient α is, and sets the values of the correction coefficients β for the pixel 285b and the pixel 285c to, for example, β=β2 which is even closer to 1 than the value of the correction coefficient β is.

It should be understood that, when α (=Vave2/Vave1) is greater than 1, then $1 \leq \beta 2 < \beta 1 < \alpha$, and, when α is smaller than 1, then $\alpha < \beta 1 < \beta 2 \leq 1$.

The correction unit 33b takes a value obtained by multiplying the pixel value of the signal from the pixel 285b of the boundary block 285 by the correction coefficient β=β2 as being the pixel value for the signal from the pixel 285b after the first correction processing. In a similar manner, the correction unit 33b takes a value obtained by multiplying the pixel value of the signal from the pixel 285c of the boundary block 285 by the correction coefficient β=β2 as being the pixel value for the signal from the pixel 285c after the first correction processing, and takes a value obtained by multiplying the pixel value of the signal from the pixel 285d by the correction coefficient β=β2 or by Vave2/Vave1 as being the pixel value for the signal from the pixel 285d after the first correction processing By doing this, according to requirements, the correction unit 33b performs the first correction processing for the signals from all of the boundary blocks.

In the above explanation, the first correction processing according to two different versions has been described. The control unit 34 may determine which of these versions of the first correction processing should be performed on the basis of, for example, the state of setting of the operation members 36 (including the operation menu settings).

It should be understood that it would also be acceptable for the control unit 34 to determine which of the above versions of the first correction processing is to be performed, according to the scene imaging mode set for the camera 1, or according to the type of photographic subject element that has been detected.

The Second Correction Processing

Before performing image processing, focus detection processing, photographic subject detection processing (i.e. detection of the elements of the photographic subject), and processing for setting of the image capture conditions, the correction unit 33b of the image processing unit 33 may also, according to requirements, perform correction processing that is the same as the correction processing of the first embodiment. In the following explanation, this correction processing that is the same as the correction processing of the first embodiment will also be referred to as "second correction processing". According to requirements, as described above, the correction unit 33b performs the second correction processing after having performed the first correction processing.

As explained in the first through the fourth embodiments described above, according to the image data of the block 85 (i.e. the values of its pixel signals), the control unit 34 determines whether or not to employ, for the image data of the block 85, the values of the pixels of a block captured under image capture conditions that were different from the image capture conditions that were set for the block 85. In other words, if clipped whites or black crush has occurred in the image data for the block 85, then the control unit 34 selects the pixels of a block that was captured under image capture conditions that are different from the image capture conditions that were set for the block 85, and replaces the image data in which clipped whites or black crush occurred with the image data of the selected pixels (i.e. the values of the pixel signals). It should be understood that it would be acceptable to stipulate, as a condition for employing the values of the pixels of the block that was captured under image capture conditions that were different from the image capture conditions for the block 85, that the image data of the block 85 (i.e. the values of the pixel signals) are greater than or equal to a first threshold value or less than or equal to a second threshold value. Furthermore, if there is no image data in the block 85 with which clipped whites or black crush has occurred, then the control unit 34 employs the image data of the block 85 (i.e. the values of the pixel signals). In this case, the first correction processing of the third embodiment or the fourth embodiment described above is performed. Moreover, even if no clipped whites or black crush has occurred in the image data of the block 85, it will still be acceptable for the control unit 34 to select the pixels of a block that was captured under image capture conditions that were different from the image capture conditions for the block 85, and to replace the image data with which clipped whites or black crush has occurred with the image data of the selected pixels (i.e. with the values of their pixel signals). Moreover, it will also be acceptable to arrange for the control unit 34 to perform photographic subject recognition, and to perform the first correction processing on the basis of the result of this recognition. For example, the setting unit 34b may set image capture conditions that are different from the first image capture conditions, and the object detection unit 34a may perform photographic subject recognition before the actual photography. And then image capture under the first image capture conditions is performed so as to employ the values of the signals of the pixels that captured an image of the same photographic subject as the region where correction is to be performed (for example, the pixels 85b and 85d). In this manner, as explained in connection with the first embodiment through the fourth embodiment, the photographic subject that was captured under the first image capture conditions is corrected by the first correction processing so that as if it was captured under the fourth image capture conditions.

It should be understood that, in the explanation described above, detection of the elements of the photographic subject was performed by employing a per se known photographic subject recognition technique. For example, labeling processing or template matching or the like may be proposed as such a per se known photographic subject recognition technique.

Moreover, in the explanation given above, the control unit 34 performed detection of the elements of the photographic subject and subdivision of the regions by employing the live view image that was obtained by image capture by the imaging element 32a. However, in the case of a camera equipped with a photometric sensor that is capable of capturing an image of the photographic subject, such as for example a single lens reflex camera, it would also be acceptable for the control unit 34 to perform detection of the elements of the photographic subject and subdivision of the regions by employing a live view image that is captured by the photometric sensor.

It should be understood that the embodiments and variants described above could also be combined in various combinations.

In the above description various embodiments and variants have been explained, but the present invention is not to be considered as being limited by the details thereof. Other aspects that are considered to come within the range of the technical concept of the present invention are also included within its scope.

The content of the disclosure of the following application, upon which priority is claimed, is hereby incorporated herein by reference:

Japanese Patent Application No. 2016-71970 (filed on Mar. 31, 2016).

REFERENCE SIGNS LIST 1, 1C: cameras
1B: image capturing system
31: image capture optical system
32: image capture unit
32a, 100: imaging elements
33: image processing unit
33a, 321: input units
33b, 322: correction units
33c, 323: generation units
34: control unit
34a: object detection unit
34b: setting unit
34c: image capture control unit
34d: lens movement control unit
35: display unit
80: predetermined range
90: region for attention
1001: imaging device
1002: display device
P: pixel for attention

The invention claimed is:

1. An electronic apparatus comprising:
an imaging element having a plurality of image capture regions, each of the image capture regions having a plurality of pixels for generating an image signal;
a setting unit that sets different image capture conditions for the plurality of image capture regions; and
a control unit that corrects a portion of an image signal of a photographic subject captured under first image capture conditions in an image capture region among the plurality of image capture regions so that it is as if the portion of the image signal was captured under second image capture conditions.

2. The electronic apparatus according to claim 1, wherein:
the control unit generates an image by correcting the portion of the image signal of the photographic subject captured under the first image capture conditions in the image capture region among the plurality of image capture regions so that it is as if the portion of the image signal was captured under the second image capture conditions.

3. The electronic apparatus according to claim 1, wherein;
each of the image capture regions of the imaging element captures a photographic subject image through a lens that is movable in an optical axis direction of an optical system; and
the control unit moves the lens according to a signal obtained by correcting the portion of the image signal of the photographic subject captured under the first image capture conditions in the image capture region among the plurality of image capture regions so that it is as if the portion of the image signal was captured under the second image capture conditions.

4. The electronic apparatus according to claim 1, wherein;
each of the image capture regions of the imaging element captures a photographic subject image through a lens that is movable in an optical axis direction of an optical system; and
the control unit generates a signal to move the lens according to a signal obtained by correcting the portion of the image signal of the photographic subject captured under the first image capture conditions in the image capture region among the plurality of image capture regions so that it is as if the portion of the image signal was captured under the second image capture conditions.

5. The electronic apparatus according to claim 1, wherein;
the control unit detects a photographic subject by correcting the portion of the image signal of the photographic subject captured under the first image capture conditions in the image capture region among the plurality of image capture regions so that it is as if the portion of the image signal was captured under the second image capture conditions.

6. The electronic apparatus according to claim 1, wherein;
according to a signal obtained by correcting the portion of the image signal of the photographic subject captured under the first image capture conditions in the image capture region among the plurality of image capture regions so that it is as if the portion of the image signal was captured under the second image capture conditions, the control unit controls setting of image capture conditions of the image capture region.

7. An electronic apparatus comprising:
an imaging element having a plurality of image capture regions, each of the image capture regions having a plurality of pixels for generating an image signal;
a setting unit that sets for a first image capture region image capture conditions different from the image capture conditions for a second image capture region among the plurality of image capture regions; and
a control unit that corrects an image signal of a photographic subject captured in the first image capture region so that it is as if the image was captured according to first image capture conditions and second image capture conditions.

8. The electronic apparatus according to claim 7, wherein:
the control unit generates an image by correcting the image signal of the photographic subject captured in the first image capture region so that it is as if the image was captured according to the first image capture conditions and the second image capture conditions.

9. The electronic apparatus according to claim 7, wherein;
the plurality of pixels for generating an image signal arranged in each of the image capture regions of the imaging element capture a photographic subject image through a lens that is movable in an optical axis direction of an optical system; and the control unit moves the lens according to a signal obtained by correcting the image signal of the photographic subject captured in the first image capture region so that it is as if the image was captured according to the first image capture conditions and the second image capture conditions.

10. The electronic apparatus according to claim 7, wherein;
the plurality of pixels for generating an image signal arranged in each of the image capture regions of the imaging element capture a photographic subject image through a lens that is movable in an optical axis direction of an optical system; and
the control unit generates a signal to move the lens according to a signal obtained by correcting the image signal of the photographic subject captured in the first image capture region so that it is as if the image was captured according to the first image capture conditions and the second image capture conditions.

11. The electronic apparatus according to claim 7, wherein;
the control unit detects a photographic subject by correcting the image signal of the photographic subject captured in the first image capture region so that it is as if the image was captured according to the first image capture conditions and the second image capture conditions.

12. The electronic apparatus according to claim 7, wherein;
according to a signal obtained by correcting the image signal of the photographic subject captured in the first image capture region so that it is as if the image was captured according to the first image capture conditions and the second image capture conditions, the control unit controls setting of image capture conditions of an image capture region.

13. An electronic apparatus comprising:
an imaging element having a first image capture region, in which a plurality of first pixels for generating an image signal are arranged, that captures a photographic subject, and a second image capture region, in which a plurality of second pixels for generating an image signal are arranged, that captures a photographic subject;
a setting unit that sets image capture conditions for the first image capture region that are different from image capture conditions for the second image capture region; and
a control unit that performs control relating to the photographic subject captured in the first image capture region according to a signal from a pixel selected from the first pixel and the second pixel by using a signal from the first pixel.

14. The electronic apparatus according to claim 13, wherein:
the control unit generates an image of the photographic subject captured in the first image capture region according to the signal from the pixel selected from the first pixel and the second pixel by using the signal from the first pixel.

15. The electronic apparatus according to claim 13, wherein;
in the imaging element, the plurality of first pixels for generating an image signal arranged in the first image capture region and the plurality of second pixels for generating an image signal arranged in the second image capture region capture a photographic subject image through a lens that is movable in an optical axis direction of an optical system; and
the control unit controls movement of the lens according to the signal from the pixel selected from the first pixel and the second pixel by using the signal from the first pixel.

16. The electronic apparatus according to claim 13, wherein;
in the imaging element, the plurality of first pixels for generating an image signal arranged in the first image capture region and the plurality of second pixels for generating an image signal arranged in the second image capture region capture a photographic subject image through a lens that is movable in an optical axis direction of an optical system; and
the control unit generates a signal to move the lens according to the signal from the pixel selected from the first pixel and the second pixel by using the signal from the first pixel.

17. The electronic apparatus according to claim 13, wherein;
the control unit detects a photographic subject captured in the first image capture region according to the signal from the pixel selected from the first pixel and the second pixel by using the signal from the first pixel.

18. The electronic apparatus according to claim 13, wherein;
the control unit controls setting of image capture conditions at at least one of the first image capture region and the second image capture region according to the signal from the pixel selected from the first pixel and the second pixel by using the signal from the first pixel.

\* \* \* \* \*